(12) United States Patent
Nagai et al.

(10) Patent No.: US 11,636,087 B2
(45) Date of Patent: Apr. 25, 2023

(54) MOBILE TERMINAL, INFORMATION MANAGEMENT DEVICE, COMMUNICATION DEVICE, AND RELAY DEVICE

(71) Applicant: KDDI CORPORATION, Tokyo (JP)

(72) Inventors: Yuuki Nagai, Tokyo (JP); Hideyuki Kotou, Tokyo (JP); Akira Kozawa, Tokyo (JP); Atsushi Mikasa, Tokyo (JP)

(73) Assignee: KDDI Corporation, Tokyo (JP)

( * ) Notice: Subject to any disclaimer, the term of this patent is extended or adjusted under 35 U.S.C. 154(b) by 143 days.

(21) Appl. No.: 17/269,385

(22) PCT Filed: Sep. 27, 2019

(86) PCT No.: PCT/JP2019/038063
§ 371 (c)(1),
(2) Date: Feb. 18, 2021

(87) PCT Pub. No.: WO2020/067387
PCT Pub. Date: Apr. 2, 2020

(65) Prior Publication Data
US 2021/0209090 A1    Jul. 8, 2021

(30) Foreign Application Priority Data

Sep. 28, 2018 (JP) .............................. JP2018-183505
Sep. 28, 2018 (JP) .............................. JP2018-183527

(Continued)

(51) Int. Cl.
*G06F 16/23*     (2019.01)
*G06Q 50/10*     (2012.01)
(Continued)

(52) U.S. Cl.
CPC ............. *G06F 16/23* (2019.01); *G06Q 50/10* (2013.01); *H04W 4/14* (2013.01); *H04W 8/205* (2013.01)

(58) Field of Classification Search
CPC ............ H04W 84/12; A06B 5/48; H04M 1/72
(Continued)

(56) References Cited

U.S. PATENT DOCUMENTS

2010/0151879 A1*   6/2010   Morrill .................. H04W 4/02
                                                                    455/456.1

FOREIGN PATENT DOCUMENTS

CN      101312436 A      11/2008
JP      2007-334481 A    12/2007
(Continued)

OTHER PUBLICATIONS

Office Action issued in corresponding Japanese Patent Application No. 2021-097073 dated Aug. 3, 2021 with English translation.
Office Action issued in corresponding Japanese Patent Application No. 2021-126649 dated Oct. 19, 2021 with English translation.
(Continued)

*Primary Examiner* — Kiet M Doan
(74) *Attorney, Agent, or Firm* — Foley & Lardner LLP

(57) ABSTRACT

A mobile terminal includes an identification unit that identifies a telecommunications carrier with which the mobile terminal is subscribed; an input unit that receives an input of an access request to a link destination, including information regarding multiple access destinations, selected by the user of the mobile terminal; a selection unit that, based on information regarding the telecommunications carrier identified by the identification unit, selects an access destination indicating, among the multiple access destinations, an access destination in a server corresponding to the telecommuni-
(Continued)

cations carrier; and a communication unit that accesses the access destination selected by the selection unit.

5 Claims, 37 Drawing Sheets

(30) Foreign Application Priority Data

| Nov. 28, 2018 | (JP) | ............................ | JP2018-222087 |
| Nov. 28, 2018 | (JP) | ............................ | JP2018-222088 |
| Dec. 11, 2018 | (JP) | ............................ | JP2018-231364 |

(51) Int. Cl.
*H04W 4/14* (2009.01)
*H04W 8/20* (2009.01)

(58) Field of Classification Search
USPC ...... 382/115; 455/519, 67.2, 456.1; 370/329
See application file for complete search history.

(56) References Cited

FOREIGN PATENT DOCUMENTS

| JP | 2009-159573 A | 7/2009 |
| JP | 2010-278867 A | 12/2010 |
| JP | 2012-137893 A | 7/2012 |
| JP | 2016-085676 A | 5/2016 |
| JP | 2017-500625 A | 1/2017 |
| JP | 2017-062850 A | 3/2017 |
| JP | 2018-121099 A | 8/2018 |
| KR | 10-2015-0097081 A | 8/2015 |
| WO | WO-2012/046670 A1 | 4/2012 |
| WO | WO-2017/222032 A1 | 12/2017 |

OTHER PUBLICATIONS

International Search Report issued in corresponding application No. PCT/JP2019/038063 dated Dec. 10, 2019, with English translation.

* cited by examiner

FIG. 6

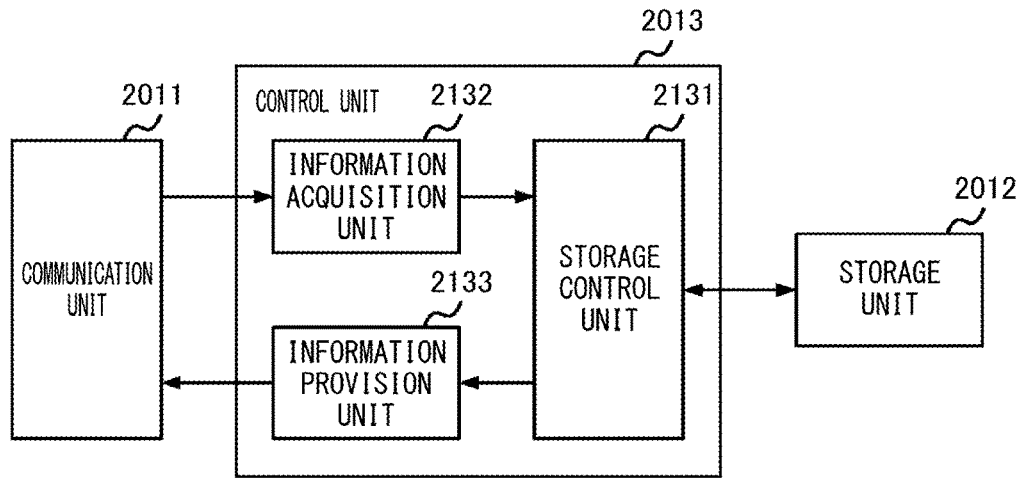

FIG. 7

|  | PERSONAL INFORMATION OF ID0001 | REGISTERED COMPANIES |
|---|---|---|
| ADDRESS | 1-2-3 ___ STREET, ___ CITY | COMPANY ABC, COMPANY BCD, COMPANY DEF☺ |
| TELEPHONE NUMBER | 03-1111-1111 | COMPANY ABC, COMPANY BCD, COMPANY DEF☺ |
| BANK ACCOUNT | ___ BANK, ___ BRANCH 0123456789 | COMPANY ABC |
| CREDIT CARD NUMBER | ABCD987654 | COMPANY ABC, COMPANY BCD |
| EMAIL ADDRESS | ････@･････.com | COMPANY ABC, COMPANY BCD, COMPANY DEF☺ |

FIG. 8A

| USER NAME | USER ID | TELEPHONE NUMBER |
|---|---|---|
| KAZUO YAMAKAWA | 0001 | 09011112222 |
| TAKESHI TANAKA | 0002 | 09022334455 |

FIG. 8B

| USER ID | REGISTERED COMPANY 1 | REGISTERED COMPANY 2 | REGISTERED COMPANY 3 |
|---|---|---|---|
| 0001 | Y DELIVERY | KDDI | AA SALES |
| 0002 | Z DELIVERY | C LIFE INSURANCE | BB SALES |

FIG. 17A

| TERMINAL ID | NAME | TELEPHONE NUMBER | EMAIL ADDRESS | RESIDENTIAL ADDRESS | VERIFICATION |
|---|---|---|---|---|---|
| 100001 | NICKNAME B | 080-XXXX-XXXX | yyy@yyy.yyy | Z-Z-Z MARUNOUCHI, CHIYODA-KU, TOKYO | NO |

| TERMINAL ID | NAME | TELEPHONE NUMBER | EMAIL ADDRESS | RESIDENTIAL ADDRESS | VERIFICATION |
|---|---|---|---|---|---|
| 100001 | B_____ A_____ | 080-XXXX-XXXX | yyy@yyy.yyy | Z-Z-Z MARUNOUCHI, CHIYODA-KU, TOKYO | YES |

P2

| USER ID | COMPANY ID | NON-ANONYMOUS ID | ANONYMOUS ID |
|---|---|---|---|
| A111 | ABC | 080-XXXX-XXXX | – |
| A222 | XYZ | – | X123 |
| ⋮ | | | |

D41

| COMPANY ID | NON-ANONYMOUS ID | ANONYMOUS ID |
|---|---|---|
| ABC | 080-XXXX-XXXX | – |

D42

| COMPANY ID | NON-ANONYMOUS ID | ANONYMOUS ID |
|---|---|---|
| XYZ | – | X123 |

| COMMUNICATION DEVICE ID | NON-ANONYMOUS ID | OLD ANONYMOUS ID | NEW ANONYMOUS ID |
|---|---|---|---|
| C555 | 080-XXXX-XXXX | – | – |

| COMMUNICATION DEVICE ID | NON-ANONYMOUS ID | OLD ANONYMOUS ID | NEW ANONYMOUS ID |
|---|---|---|---|
| C555 | – | Y987 | X123 |

| COMMUNICATION DEVICE ID | NON-ANONYMOUS ID | ANONYMOUS ID |
|---|---|---|
| C555 | 080-XXXX-XXXX | – |
| C666 | – | X123 |

| USER ID | COMPANY ID |
|---|---|
| 080-XXXX-XXXX | ABC |
| X123 | XYZ |
| ⋮ | |

| USER ID | COMMUNICATION DEVICE ID |
|---|---|
| 080-XXXX-XXXX | C555 |
| X123 | C666 |
| ⋮ | |

| USER ID | TELEPHONE NUMBER | NAME | SEX | AGE | RESIDENTIAL ADDRESS | OCCUPATION |
|---|---|---|---|---|---|---|
| 080-XXXX-XXXX | 080-XXXX-XXXX | B___ A___ | M | 28 | X-X-X MARUNOUCHI, CHIYODA-KU, TOKYO | OFFICE WORKER |
| X123 | 080-YYYY-YYYY | D___ C___ | F | 34 | Y-Y-Y SHINJUKU, SHINUKU-KU, TOKYO | HOMEMAKER |
| ⋮ | | | | | | |

D53

MOBILE TERMINAL, INFORMATION MANAGEMENT DEVICE, COMMUNICATION DEVICE, AND RELAY DEVICE

TECHNICAL FIELD

The present invention relates to a mobile terminal, an information management device, a communication device, and a relay device.

Priority is claimed on Japanese Patent Application No. 2018-183527 and Japanese Patent Application No. 2018-183505, filed Sep. 28, 2018, Japanese Patent Application No. 2018-222087 and Japanese Patent Application No. 2018-222088, filed Nov. 28, 2018, and Japanese Patent Application No. 2018-231364, filed Dec. 11, 2018, the contents of which are incorporated herein by reference.

BACKGROUND ART

Conventionally, there are messaging services for exchanging messages. Users perform user registration with companies on user terminals. Systems in which various services can be received from the companies are known. Personal information that has been input by user registration is stored in a database or the like.

CITATION LIST

Patent Literature

[Patent Document 1] Japanese Unexamined Patent Application, First Publication No. 2012-137893
[Patent Document 2] Japanese Unexamined Patent Application, First Publication No. 2017-500625
[Patent Document 3] Japanese Unexamined Patent Application, First Publication No. 2017-62850

SUMMARY OF THE INVENTION

Problems to be Solved by the Invention

However, messaging services are provided by multiple carriers, and there have been cases in which efficient services cannot be provided. Additionally, the processes for registering and changing personal information, determining the correctness of personal information and the like were troublesome.

Therefore, the present invention was made in consideration of these points and has the purpose of more efficiently providing messaging services.

Means for Solving the Problem

A first exemplary aspect of the present invention provides a mobile terminal having an identification unit configured to identify a telecommunications carrier with which the mobile terminal is subscribed; an input unit configured to receive an input of an access request to a link destination, including information regarding multiple access destinations, selected by the user of the mobile terminal; a selection unit configured to select, based on information regarding the telecommunications carrier identified by the identification unit, an access destination indicating, among the multiple access destinations, a destination of an access in a server corresponding to the telecommunications carrier, and a communication unit configured to access the access destination selected by the selection unit.

An information management device that is a second exemplary aspect of the present invention has a storage control unit configured to store in a storage unit, in association with user identification information for identifying a user, personal information of the user and company identification information for identifying a company with which the personal information is registered; an information acquisition unit configured to acquire, from an information terminal associated with user identification information, changed information, which is personal information that was changed after the storage control unit stored the personal information in the storage unit; and an information provision unit configured to transmit, when the changed information has been acquired by the information acquisition unit, the changed information to a server of the company with which the personal information is registered.

A communication device that is a third exemplary aspect of the present invention has a reception unit configured to receive, from a first terminal, identification information for the first terminal and notification permission information indicating whether or not a second terminal different from the first terminal is permitted to be notified of registered information of the user of the first terminal registered by a carrier; an acquisition unit configured to acquire, when the notification permission information received by the reception unit indicates that the notification of the registered information is permitted, the registered information associated with the identification information of the first terminal received by the reception unit; and a notification unit configured to notify the second terminal of the registered information acquired by the acquisition unit and verified-status information indicating that the registered information has been verified by the carrier.

A communication device that is a fourth exemplary aspect of the present invention is a communication device that provides a messaging service for exchanging messages between a user terminal owned by a user and a company server managed by a company, the communication device having a reception unit configured to receive, from an external communication device, which provides the messaging service, different from the communication device, first associated information, in which identification information of the user is associated, in the external communication device, with identification information of the company; a generation unit configured to generate, based on the first associated information received by the reception unit, second associated information, in which identification information of the user is associated, in the communication device, with identification information of the company; and a transmission unit configured to transmit, to the company server, the second associated information that has been generated by the generation unit.

A relay device that is a fifth exemplary aspect of the present invention is a relay device that relays messages in a communication system for exchanging messages between user terminals owned by users and a company server managed by a company, via communication devices of carriers, among multiple carriers, with which the users are subscribed, the relay device having a first storage unit configured to store identification information of the users in association with identification information of the company with which the users are registered; a second storage unit configured to store the identification information of the users in association with identification information of the communication devices of the carriers with which the users are registered; a reception unit configured to receive the messages from the company server; an extraction unit configured to extract the identification information of the users associated, in the first storage unit, with the identification information of the company managing the company server that is the transmission source of the messages received by the reception unit; an identification unit configured to identify, based on the identification information of the communication devices associated, in the second storage unit, with the identification information of the users extracted by the extraction unit, as forwarding destinations, the communication devices of the carriers, among the multiple carriers, with which the users are subscribed; and a forwarding unit configured to forward the messages received by the reception unit to the communication devices at the forwarding destinations identified by the identification unit.

Advantageous Effects of Invention

According to the present invention, a messaging service can be efficiently provided to users.

BRIEF DESCRIPTION OF THE DRAWINGS

FIG. 6 is a diagram illustrating the functional configuration of an information management device.

FIG. 7 is a diagram illustrating an example of a record in a personal information database in which a user ID is associated with personal information.

FIG. 8A is a first diagram illustrating another example of a record in the personal information database.

FIG. 8B is a second diagram illustrating another example of a record in the personal information database.

FIG. 17A is a first schematic diagram of profile information stored in a profile information storage unit.

FIG. 17B is a second schematic diagram of profile information stored in the profile information storage unit.

FIG. 30A is a first schematic diagram of second associated information.

FIG. 30B is a second schematic diagram of second associated information.

FIG. 31 is a schematic diagram of transmission destination information.

FIG. 38A is a first schematic diagram of company information, carrier information and personal information.

FIG. 38B is a second schematic diagram of company information, carrier information and personal information.

FIG. 38C is a third schematic diagram of company information, carrier information and personal information.

DESCRIPTION OF EMBODIMENTS

First Embodiment

Conventionally, SMSs (Short Message Services) are known as being services that transmit messages by using telephone numbers. Additionally, RCSs (Rich Communication Services), in which the functions of SMS are enriched, for exchanging data such as images, code, addresses, files and the like by using telephone numbers as IDs are also known.

In such RCSs, servers are provided so as to respectively correspond to telecommunications carriers for mobile terminals with which users are subscribed, for operating and managing link destination information and the like in response to access requests or the like from users. In other words, the link destinations that can be accessed by users may be different depending on the telecommunications carrier with which the user is subscribed. If a provider of information to be accessed by a user knows the telecommunications carrier with which the user is subscribed, it is possible to notify an appropriate link destination for the user. However, it is difficult for an information provider to know the telecommunications carriers with which users are subscribed, making it difficult to provide notification of link destinations that can be accessed by the users.

According to the first embodiment, even if a provider of information to be accessed by a user provides a link destination to said information without knowing information regarding the telecommunications carrier with which the user is subscribed, the user can appropriately access the link destination.

<Example of Configuration of System 1010>

Figure 1:
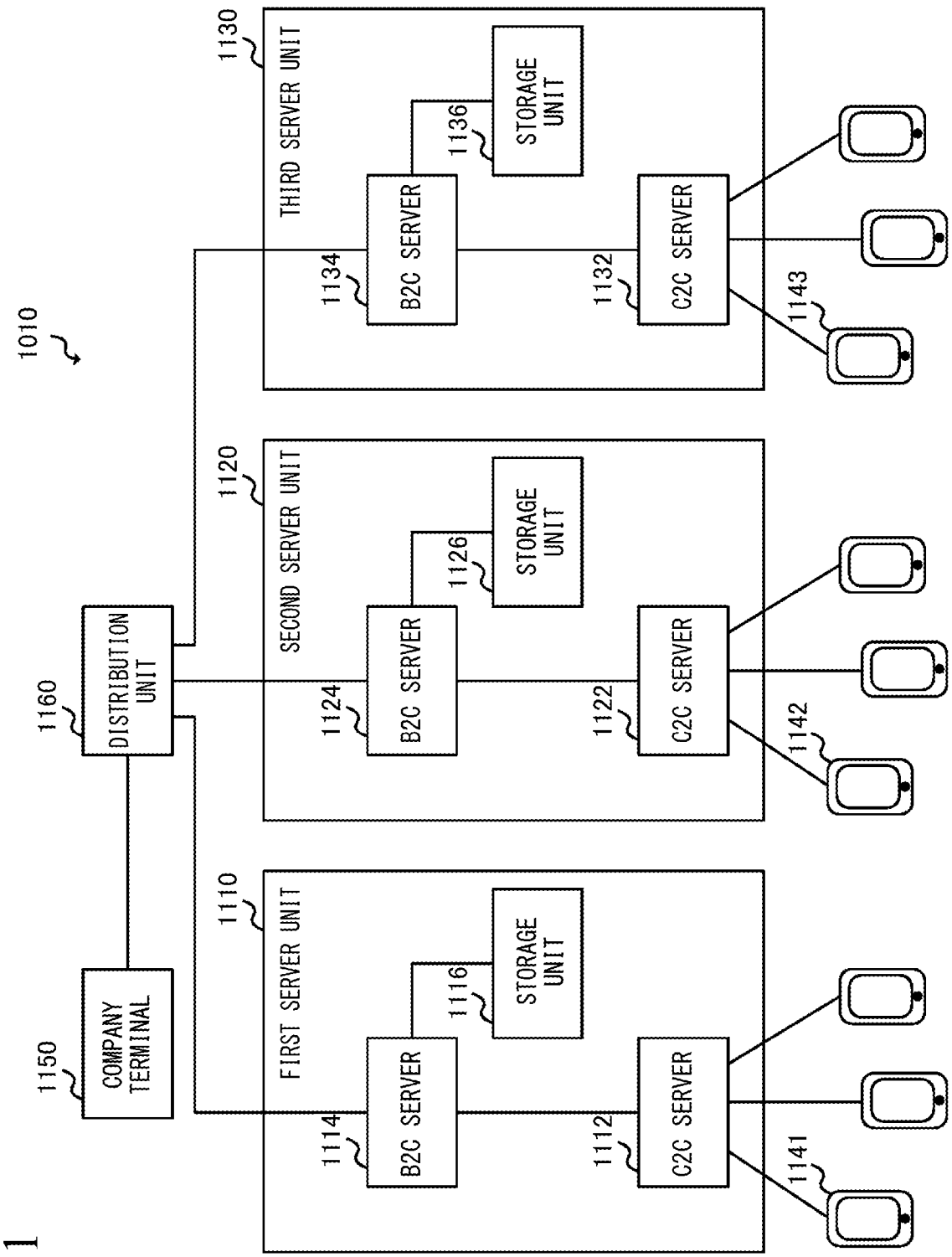
FIG. 1 illustrates an example of the configuration of a system 1010 according to a first embodiment.

FIG. 1 illustrates an example of the configuration of a system 1010 according to a first embodiment. The system 1010 is an example of a system providing an RCS that uses telephone numbers to implement communication between users (C2C), between companies and users (B2C), and the like. The system 1010 is configured to be able to be utilized not only between multiple users subscribed with a single telecommunications carrier, but also between users respectively subscribed with different telecommunication carriers. The system 1010 is provided with a first server unit 1110, a second server unit 1120, a third server unit 1130, a first user terminal 1141, a second user terminal 1142, a third user terminal 1143, a company terminal 1150, and a distribution unit 1160.

The first server unit 1110 is communicably connected with multiple terminals and controls communication between the terminals. The first server unit 1110 is, for example, connected with multiple first user terminals 1141, and controls communication between different first user terminals 1141. Additionally, the first server unit 1110 is connected with multiple company terminals 1150, and controls communication between the company terminals 1150 and the first user terminals 1141.

The first server unit 1110 is operated, for example, by a single telecommunications carrier. When a user subscribes with the telecommunications carrier operating the first server unit 1110, a mobile terminal owned by said user can be communicably connected with the first server unit 1110. In this way, the mobile terminal owned by the user functions as a first user terminal 1141 by the user subscribing with the telecommunications carrier operating the first server unit 1110.

The first server unit 1110 can also be operated by a group including multiple companies. In this case, when a user subscribes with one of the companies belonging to the group, the mobile terminal owned by said user can be communicably connected with the first server unit 1110. As a result thereof, the user can exchange messages and the like with other first user terminals 1141, company terminals 1150, and the like by operating the first user terminal 1141. The first server unit 1110 has a C2C server 1112, a B2C server 1114, and a storage unit 1116.

The C2C server 1112 is connected with the first user terminal 1141 and exchanges data including messages and the like with said first user terminal 1141. The C2C server 1112, for example, receives a message transmitted from the first user terminal 1141, and transmits said message to a first user terminal 1141, which is a transmission destination contained in said message. Additionally, the C2C server 1112 may receive a message addressed to a company transmitted from the first user terminal 1141, and may transmit said message to the B2C server 1114. Additionally, the C2C server 1112 may receive an access request from the first user terminal 1141, and may transmit said access request to the B2C server 1114.

The B2C server 1114 connects with the company terminal 1150 and exchanges data including messages and the like with said company terminal 1150. The B2C server 1114, for example, receives a message transmitted from the company terminal 1150, and transmits said message to the C2C server 1112. In this case, the C2C server 1112 transmits said message to the first user terminal 1141, which is a transmission destination contained in said message. Additionally, the B2C server 1114 receives a message from the C2C server 1112 and transmits said message to a company terminal 1150, which is a transmission destination contained in said message.

The storage unit 1116 stores information to be provided to users and the like. The storage unit 1116, as one example, connects with the B2C server 1114. The storage unit 1116, for example, stores data that the B2C server 1114 has received from company terminals 1150 so as to correspond to access destinations. Additionally, the storage unit 1116 may read out access destination data in response to access requests, and may transmit the data to the access sources.

The storage unit 1116, for example, reads out access destination data in response to having received an access request from the first user terminal 1141 via the C2C server 1112 and the B2C server 1114. Additionally, the storage unit 1116 transmits read-out data, via the B2C server 1114 and the C2C server 1112, to the first user terminal 1141 that is the request source. The storage unit 1116 may store data and the like used to operate the C2C server 1112 and the B2C server 1114.

As mentioned above, the first server unit 1110 connects with multiple first user terminals 1141 and multiple company terminals 1150, and controls the exchange of messages and data therebetween. Furthermore, the first server unit 1110 sets addresses of transmission and reception destination as addresses that are based on terminal telephone numbers. For example, by transmitting, from a company terminal 1150 to the first server unit 1110, a message addressed to the telephone number of a user, the company can transmit said message to a corresponding first user terminal 1141 from the first server unit 1110.

Additionally, by operating a first user terminal 1141 to transmit, to the first server unit 1110, a message addressed to a telephone number of a friend or the like, a user can transmit said message to a corresponding first user terminal 1141 from the first server unit 1110. The message may contain information such as image data, audio data, a data access destination, or the like.

The second server unit 1120, like the first server unit 1110, is communicably connected with multiple terminals and controls communication between the terminals. The second server unit 1120 is, for example, connected with multiple second user terminals 1142, and controls communication between different second user terminals 1142. Additionally, the second server unit 1120 is connected with multiple company terminals 1150, and controls communication between the company terminals 1150 and the second user terminals 1142.

The second server unit 1120 is operated by a telecommunications carrier different from the telecommunications carrier operating the first server unit 1110. When a user subscribes with the telecommunications carrier operating the second server unit 1120, a mobile terminal owned by said user can be communicably connected with the second server unit 1120. By operating a second user terminal 1142, a user can exchange messages and the like with other second user terminals 1142, company terminals 1150, and the like. The second server unit 1120 has a C2C server 1122, a B2C server 1124, and a storage unit 1126.

The operations of the C2C server 1122, the B2C server 1124 and the storage unit 1126 are substantially the same as the operations of the C2C server 1112, the B2C server 1114, and the storage unit 1116 in the first server unit 1110, and thus, the explanations thereof will be omitted. Since the first server unit 1110 and the second server unit 1120 are respectively operated by different telecommunications carriers, the format of the data being handled, the processing procedures, and the like may be determined by each telecommunications carrier.

Similarly, the third server unit 1130 is communicably connected with multiple terminals and controls communication between the terminals. The third server unit 1130 is, for example, connected with multiple third user terminals 1143, and controls communication between different third user terminals 1143. Additionally, the third server unit 1130 is connected with multiple company terminals 1150, and controls communication between the company terminals 1150 and the third user terminals 1143.

The third server unit 1130 is operated by a telecommunications carrier different from the telecommunications carriers that operate the first server unit 1110 and the second server unit 1120. When a user subscribes with the telecommunications carrier operating the third server unit 1130, a mobile terminal owned by said user can be communicably connected with the third server unit 1130. By operating a third user terminal 1143, a user can exchange messages and the like with other third user terminals 1143, company terminals 1150, and the like. The third server unit 1130 has a C2C server 1132, a B2C server 1134, and a storage unit 1136. The operations of the C2C server 1132, the B2C server 1134, and the storage unit 1136 are substantially the same as the operations of the C2C server 1112, the B2C server 1114, and the storage unit 1116 in the first server unit 1110, and thus, the explanations thereof will be omitted.

As has already been explained, the first user terminal 1141, the second user terminal 1142, and the third user terminal 1143 are connected with respectively corresponding server units. The first user terminal 1141, the second user terminal 1142, and the third user terminal 1143 are, for example, mobile terminals such as mobile telephones, smartphones, game devices, tablet PCs, compact PCs, notebook PCs, or the like.

The company terminals 1150 are terminals used by companies, which transmit messages and the like to the mobile terminals of users. The company terminals 1150 transmit the messages by using the telephone numbers of users. The company terminals 1150 transmit said messages to a distribution unit 1160. Additionally, the company terminals 1150 transmit data including information and the like to the server units of the telecommunications carriers, and stores the data in the storage units in the server units.

The distribution unit 1160 receives messages from the company terminals 1150 and distributes said messages to the server units corresponding to the telephone numbers contained in said messages. The distribution unit 1160, for example, sequentially confirms whether or not a subscription corresponding to a telephone number has been made, for all of the server units in the system 1010. The distribution unit 1160 may confirm by transmitting a confirmation message to each of the multiple server units. Upon confirming the server unit with which said telephone number is subscribed, the distribution unit 1160 transmits messages received from the company terminals 1150 to said server unit.

Additionally, the distribution unit 1160 may store confirmed telephone numbers and the subscribed server units in a storage unit or the like. In this case, when messages to the same telephone number have been received, the distribution unit 1160 reads out information regarding the corresponding server unit from the storage unit and transmits the messages to that server unit. As a result thereof, the company terminals 1150 can transmit messages to users by using only telephone number information, without information regarding the telecommunications carriers with which the users are subscribed.

In this case, each server unit connects with the other server units and controls communication with terminals connected with the other server units. For example, the C2C server 1112 in the first server unit 1110, the C2C server 1122 in the second server unit 1120, and the C2C server 1132 in the third server unit 1130 are connected to each other. The server units are, for example, each connected by an NNI (Network-Network Interface).

For example, when a message is transmitted from a first user terminal 1141 to a third user terminal 1143, the C2C server 1112 in the first server unit 1110 receives said message from the first user terminal 1141. Furthermore, the C2C server 1112 transmits said message to the C2C server 1132 in the corresponding third server unit 1130 in accordance with the transmission destination contained in said message. As a result thereof, users can transmit messages without being aware of the telecommunications carrier with which the user who is the transmission destination is subscribed.

As described above, the system 1010 is provided with multiple server units respectively corresponding to multiple telecommunications carriers. Although an example in which three server units operated by three telecommunications carriers is provided in the system 1010 was explained in illustrated in FIG. 1, there is no such limitation. The system 1010 may be provided with four or more server units operated by four or more telecommunications carriers. Additionally, the system 1010 may be provided with multiple company terminals 1150 that are respectively used by multiple companies. The company terminals 1150 and the distribution unit 1160 are, for example, respectively composed of servers or the like. Additionally, the multiple server units, the company terminals 1150, and the distribution unit 1160 are connected by a network.

The system 1010 above is preferably able to provide users with functions such as messaging, voice messaging, voice calls, video calls, one-to-one chats, group chats, file exchange, content sharing, position information sharing, and the like. For example, it is preferable for the companies to be able to provide users with image-attached coupons, alert messages containing detailed information, access to information sites using specific codes, and the like.

However, since the system 1010 is a system based on server units operated respectively by multiple telecommunications carriers, it is difficult to manage the same data or the like and perform the same actions. For example, although the first user terminals 1141 can access the storage unit 1116 in the first server unit 1110, they are not subscribed with the telecommunications carriers operating the other server units, and thus cannot access the storage unit 1126 in the second server unit 1120 or the storage unit 1136 in the third server unit 1130. Similarly, the second user terminals 1142 cannot access the storage unit 1116 and the storage unit 1136. Additionally, the third user terminals 1143 cannot access the storage unit 1116 and the storage unit 1126.

In other words, it is difficult to have the first user terminal 1141, the second user terminal 1142, and the third user terminal 1143 access the same storage unit and reference the same data. Thus, since the mobile terminals of users have different access destinations for each subscribed telecommunication carrier, even if the information is the same, different access destinations are accessed for each telecommunications carrier. Therefore, when presenting access destinations to users and providing information from the access destinations, companies utilizing the system 1010 must supply access destinations in accordance with the carriers with which those users are subscribed.

However, since the companies utilize the system 1010 based on the telephone numbers of the users, they are rarely aware of the carriers with which the users are subscribed. Therefore, even though telephone numbers can be used to supply access destinations to users by means of messages, specific codes, or the like, it is difficult to supply a different access destination for each of the carriers with which the users are subscribed. Additionally, since users sometimes change just the subscribed carrier without changing the telephone number, tremendous effort would be required to comprehensively manage subscribed carrier information. Therefore, the mobile terminal according to the present embodiment allows an appropriate access destination to be selected in accordance with the subscribed carrier, and information to be received from the corresponding access destination. Such a mobile terminal will be explained next.

<Example of Configuration of Mobile Terminal 1200>

Figure 2:
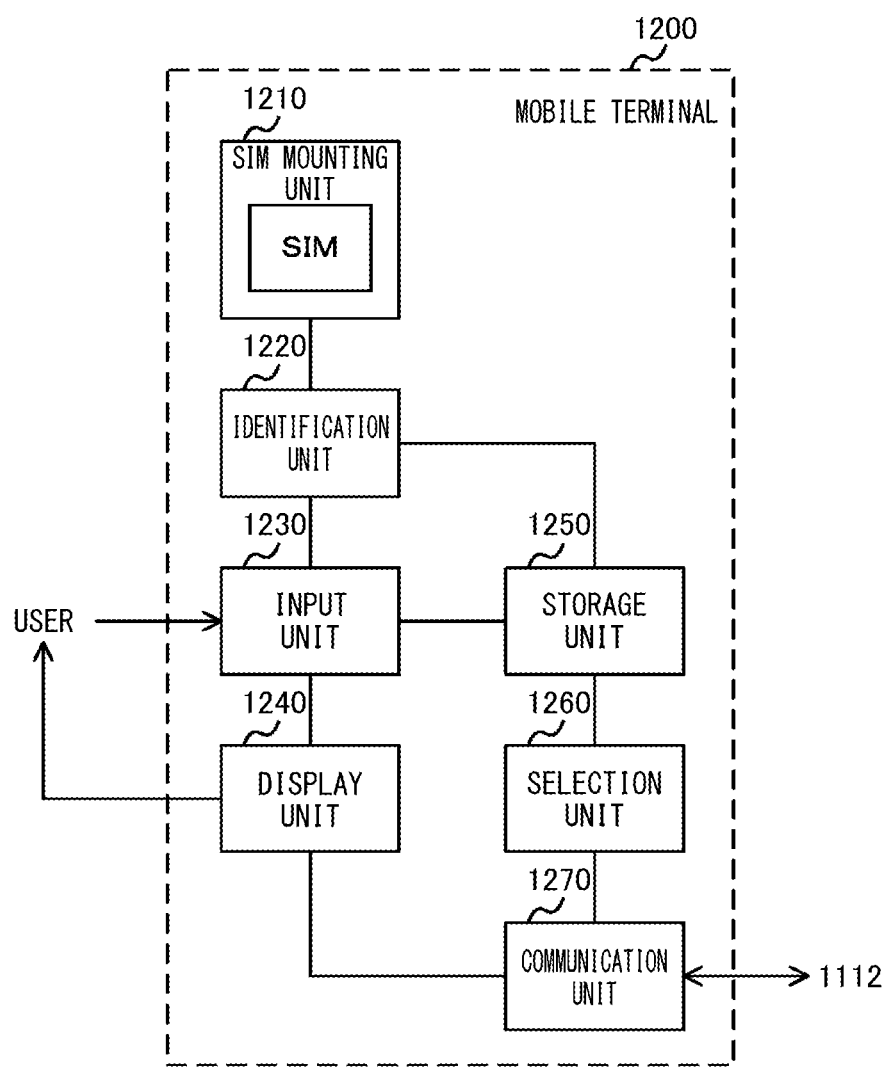
FIG. 2 illustrates an example of the configuration of a mobile terminal 1200 according to the first embodiment.

FIG. 2 illustrates an example of the configuration of a mobile terminal 1200 according to the present embodiment. The mobile terminal 1200 is used, for example, as any of a first user terminal 1141, a second user terminal 1142, and a third user terminal 1143 as explained in FIG. 1. The mobile terminal 1200 is provided with a SIM mounting unit 1210, an identification unit 1220, an input unit 1230, a display unit 1240, a storage unit 1250, a selection unit 1260, and a communication unit 1270.

The SIM mounting unit 1210 is for mounting a SIM (Subscriber Identity Module). The SIM stores information based on a subscription with a telecommunications carrier. The SIM stores, for example, information such as telecommunications carrier subscription information, a user ID, a card-specific number, a telephone number, and the like. The SIM mounting unit 1210 reads the information in the SIM when the mobile terminal 1200 is started or the like. The mobile terminal 120 is able to connect with a server unit of the subscribed carrier based on the information in the SIM card.

The identification unit 1220 identifies the telecommunications carrier with which the mobile terminal 1200 is subscribed. The identification unit 1220 acquires subscription information from the SIM mounted in the mobile terminal 1200 and identifies the subscribed carrier corresponding to the acquired subscription information. The identification unit 1220 further identifies a server corresponding to the identified telecommunications carrier. The identification unit 1220, for example, identifies one of the server units among the first server unit 1110, the second server unit 1120, and the third server unit 1130 illustrated in FIG. 1 as the connection destination of the mobile terminal 1200.

The input unit 1230 receives an input of an access request to a link destination, including information regarding multiple access destinations, selected by the user of the mobile terminal 1200. The link destination is, for example, information provided by a company or the like. The link destination may be a specific code, or instead, may be included in a message distributed by the company. Additionally, the link destination includes multiple access destinations respectively corresponding to the multiple telecommunications carriers operating the server units.

The input unit 1230 receives operations from a user or the like. The input unit 1230, for example, receives operations for executing application software installed on the mobile terminal 1200, accessing external databases or the like via a network, executing external software, and the like. The input unit 1230 has, for example, an input device such as a touch panel, a speech input device, a gesture input device, a mouse, a camera, a keyboard, and the like, and functions as a user interface for receiving inputs from a user or the like.

The display unit 1240 displays images or the like in response to the execution of application software, an OS, utility software, and the like. The display unit 1240 has a display panel or the like, and displays numerical data, character data, still images, moving images, operation states of software or the mobile terminal 1200, communication states, pages being browsed, and the like. The display unit 1240 may be a touch panel or the like, and in that case, a portion thereof may function as an input unit 1230.

The storage unit 1250 stores information and the like input to the input unit 1230. Additionally, the storage unit 1250 may store information regarding the telecommunications carrier. Additionally, the storage unit 1250 may store information such as settings values for the mobile terminal 1200. Additionally, the storage unit 1250 may store, respectively, intermediary data, computation results, threshold values, parameters, and the like generated (or used) in the process of operation of the mobile terminal 1200. The storage unit 1250 may, in response to requests from units within the mobile terminal 1200, supply stored data to the request sources.

The selection unit 1260 selects, from among multiple access destinations, an access destination indicating an access destination in a server corresponding to the telecommunications carrier with which the user is subscribed, based on the information regarding the telecommunications carrier identified by the identification unit 1220. The selection unit 1260 selects an access destination in a server operated by the telecommunications server with which the user is subscribed. The selection unit 1260 notifies the communication unit 1270 of information regarding the selected access destination.

The communication unit 1270 communicates with the server unit of the subscribed carrier based on information in the SIM card. In this case, the communication unit 1270 may be capable of communicating with multiple communication lines. The communication unit 1270 communicates, for example, with network lines and the like using telephone lines and WiFi. The communication unit 1270 uses such communication lines to exchange messages and the like. Additionally, the communication unit 1270 accesses an access destination selected by the selection unit 1260. The communication unit 1270, for example, causes the display unit 1240 to display received messages, accessed information, and the like.

<Operational Flow of Mobile Terminal 1200>

Figure 3:
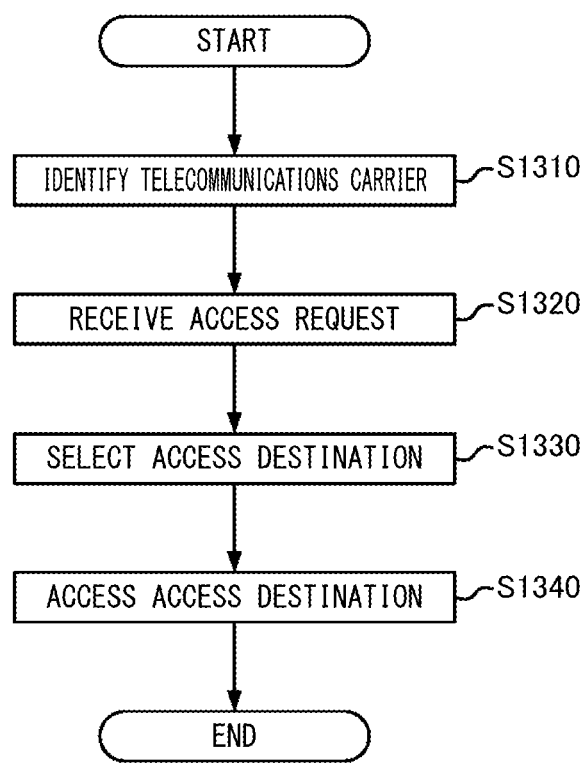
FIG. 3 illustrates an example of the operational flow in the mobile terminal 1200 according to the first embodiment.

The operations of the mobile terminal 1200 according to the present embodiment above will be explained next. FIG. 3 illustrates an example of the operational flow in the mobile terminal 1200 according to the present embodiment. The mobile terminal 1200, by executing the operations from S1310 to S1340 in FIG. 3, reads telecommunications carrier information from the information in the SIM card, then selects and accesses an appropriate access destination.

First, in S1310, the identification unit 1220 acquires subscription information from the SIM and identifies the telecommunications carrier with which the mobile terminal 1200 is subscribed. The identification unit 1220, for example, reads and acquires the subscription information from the SIM when the mobile terminal 1200 is started. As one example, when the user is subscribed with the telecommunications carrier operating the second server unit 1120, the mobile terminal 1200 operates as a second user terminal 1142 and connects with the second server unit 1120. In this case, the mobile terminal 1200 has, stored in the SIM, information based on the subscription with the telecommunications carrier operating the second server unit 1120. The identification unit 1220 acquires such information from the SIM and identifies the telecommunications carrier operating the second server unit 1120.

Next, in S1320, the input unit 1230 receives, from the user of the mobile terminal 1200, an input of a request to access a link destination. For example, the input unit 1230 reads a QR code (registered trademark) and displays, on the display unit 1240, the read-out QR code, a link destination converted from the QR code, or the like. The input unit 1230 receives a request to access the link destination contained in the QR code in response to a user touching the QR code or the like displayed on the display unit 1240. Additionally, the mobile terminal 1200 may receive a message, and in response to the user touching a link destination contained in the message displayed on the display unit 1240, the input unit 1230 may receive the request to access the link destination.

In this case, the link destination includes, for example, information in an access destination in the storage unit 1116 in the first server unit 1110, the storage unit 1126 in the second server unit 1120, and the storage unit 1136 in the third server unit 1130. In this case, among the access destinations, it is preferable to preset the access destinations so that part of the information, such as the domain name, differs in accordance with the server unit, and the part other than that part of the information is the same information.

Next, in S1330, the selection unit 1260 selects, from among the multiple access destinations included among the link destinations, an access destination corresponding to the telecommunications carrier identified by the identification unit 1220. For example, when the identification unit 1220 has identified the telecommunications carrier operating the second server unit 1120, the selection unit 1260 selects an access destination in the storage unit 1126 in the second server unit 1120. As one example, the selection unit 1260 selects an access destination having a domain name indicating the telecommunications carrier that operates the second server unit 1120.

Next, in S1340, the communication unit 1270 accesses the access destination selected by the selection unit 1260. In other words, the communication unit 1270 accesses an access destination in the storage unit 1126 in the second server unit 1120. In this way, based on the subscription information in the SIM, the mobile terminal 1200 can access an appropriate access destination in the server unit operated by the subscribed telecommunications carrier. Additionally, companies can prepare an access destination and corresponding data for each server unit and include information regarding all access destinations in the link destination, thereby allowing a user to select an appropriate access destination. In other words, companies can allow appropriate access destinations to be selected without acquiring personal information of users other than telephone numbers.

Therefore, according to the mobile terminal 1200 of the first embodiment, even if a provider of a link destination is not aware of information regarding the telecommunications carrier with which the user is subscribed, the user can appropriately access the link destination in response to the provided link destination. Thus, the functions of an SMS can be expanded to easily provide an RCS having more functions.

In the example of the mobile terminal 1200 according to the first embodiment described above, the identification unit 1220 acquires subscription information from a SIM to identify the telecommunications carrier with which the mobile terminal 1200 is subscribed. However, there is no such limitation. In addition thereto, the identification unit 1220 may request the telecommunications carrier to verify the line. For example, the identification unit 1220 identifies the telecommunications carrier in accordance with transmitting an SMS message to a server corresponding to the subscribed telecommunications carrier and having the line verified.

The user may cancel a subscription or change the subscription, or may use the terminal after switching the SIM therein. In such a case, the information in the SIM may differ from the actual subscription. Thus, by verifying the line, the identification unit 1220 can more reliably identify the subscribed telecommunications carrier. Additionally, as an alternative thereto, the identification unit 1220 may request line verification sequentially from multiple telecommunications carriers without acquiring subscription information from the SIM, and may identify the telecommunications carrier of the verified line as the subscribed carrier.

There are cases in which the communication unit 1270 can communicate externally via a second communication line different from the first communication line used for transmitting SMS messages. In this case, if the communication unit 1270 transmits an SMS message by using the second communication line, then the subscribed telecommunications carrier will not be able to verify the line. Therefore, the identification unit 1220 switches off the connection of the communication unit 1270 with the second communication line before verifying the line. As a result thereof, the communication unit 1270 uses the first communication line to transmit the SMS message, and thus can have the subscribed telecommunications carrier verify the line.

For the mobile terminal 1200 in the first embodiment above, an example in which the identification unit 1220 identifies the telecommunications carrier at the time the mobile terminal 1200 is started was described. However, there is no such limitation. The identification unit 1220 may identify the telecommunications carrier in response to a predetermined application being executed. Additionally, the identification unit 1220 may identify the telecommunications carrier in response to an access destination having been input to the input unit 1230.

Additionally, the identification unit 1220 may reuse identified information regarding the subscribed telecommunications carrier. For example, the identification unit 1220 has the storage unit 1250 store information regarding the identified telecommunications carrier. Furthermore, based on information regarding a telecommunications carrier that has been identified in the past being stored in the storage unit 1250, the identification unit 1220 identifies the telecommunications carrier stored in the storage unit 1250 as the subscribed carrier without verifying the line. As a result thereof, the identification unit 1220 can identify the subscribed telecommunications carrier without always accessing the SIM.

<Modified Example of Mobile Terminal 1200>

In the example of the mobile terminal 1200 according to the first embodiment described above, a link destination including multiple access destinations is input and an appropriate access destination is selected based on information regarding the subscribed telecommunication carrier. However, there is no such limitation. The mobile terminal 1200 may be input a link destination not including the access destination of the subscribed telecommunications carrier.

For example, there are cases in which a first user subscribed with a first telecommunications carrier transmits, to a second user, a message including, as the link destination, an access destination in a first server operated by a first telecommunications carrier. In such a case, the first user may manually include the link destination in the message, and only the access destination of the first telecommunications carrier may be included in the link destination. In this case, if the second user is subscribed with the first telecommunications carrier, then the access destination in the first server can be accessed. However, if the second user is subscribed with a second telecommunications carrier different from the first telecommunications carrier, then the second user cannot access the access destination in the first server.

Additionally, there are cases in which a company is insufficiently prepared, and the access destinations of all telecommunications carriers are not included in the link destination. Additionally, the access destinations of newly started telecommunications carriers will not be included in old links. Therefore, a mobile terminal 1200 that can access the appropriate access destination even if such a link destination is input is desired. Therefore, a mobile terminal 1200 that can even handle such a link destination will be described next.

Figure 4:
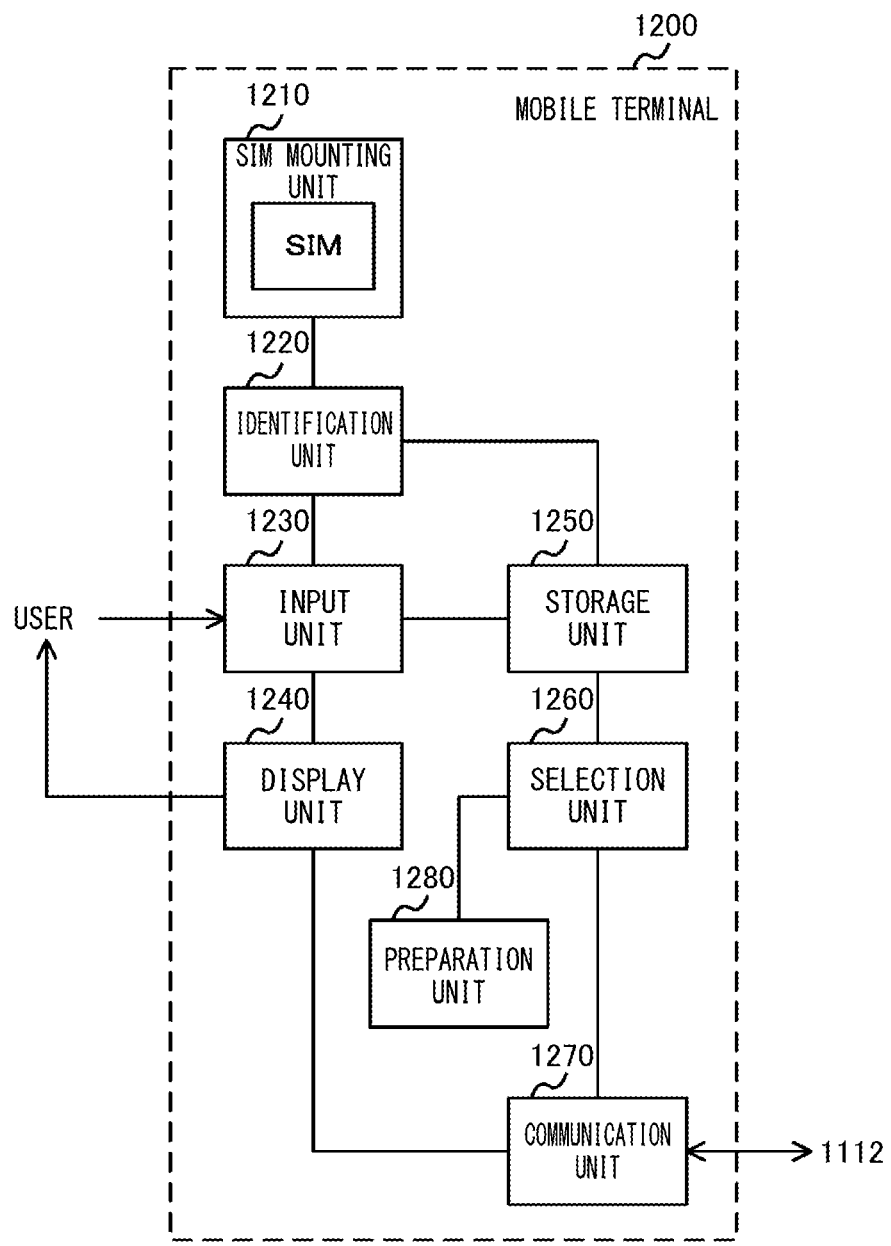
FIG. 4 illustrates a modified example of the mobile terminal 1200 according to the first embodiment.

FIG. 4 illustrates a modified example of a mobile terminal 1200 according to the first embodiment. In the mobile terminal 120 of the present modified example illustrated in FIG. 4, the same reference numbers are assigned to elements having substantially the same functions as those in the mobile terminal 1200 illustrated in FIG. 2, and the descriptions thereof will be omitted. The mobile terminal 1200 in the present modified example is further provided with a preparation unit 1280. Additionally, when the multiple access destinations included in the link destination do not include an access destination corresponding to the telecommunications carrier identified by the identification unit 1220, then the selection unit 1260 in the present modified example notifies the preparation unit 1280 of information regarding the identified telecommunications carrier and the fact that there is no access destination.

The preparation unit 1280 generates the access destination information, based on the information regarding the telecommunications carrier identified by the identification unit 1220, by replacing a part of the access destination corresponding to another telecommunications carrier with information corresponding to the identified telecommunications carrier. The access destinations of the respective server units often have a portion corresponding to the telecommunications carrier, with the remaining portion being the same text. For example, in an access address, the portion corresponding to the telecommunications carrier is set to be a company account. In that case, the remaining portion would be the same URL which, together with the company account, would form the full access destination. Therefore, by replacing a company account corresponding to a first telecommunications carrier with a company account corresponding to a second telecommunications carrier, a second user subscribed with the second telecommunications carrier can access an access destination in the second server.

Therefore, when an access destination corresponding to an identified telecommunications carrier is not included among the multiple access destinations included in an access request, the preparation unit 1280 generates an access destination corresponding to the identified telecommunications carrier by replacing part of the access destination corresponding to other telecommunications carrier. Furthermore, the preparation unit 1280 supplies the generated access destination to the selection units 1260. As a result thereof, the selection unit 1260 can select the access destination generated by the preparation unit 1280, and therefore, the communication unit 1270 can access the access destination selected by the selection unit 1260.

As described above, even when a link destination not including an access destination of a subscribed telecommunications carrier is input, the mobile terminal 1200 according to the present embodiment can generate and access an appropriate access destination. Therefore, a company can easily provide an access address, needing only to include one access destination as the link destination, or as an alternative, to include an access address leaving the company account blank.

In the system 1010 according to the present embodiment described above, an example was described in which the system 1010 is provided with a mobile terminal 1200 and multiple server units that respectively correspond to multiple telecommunications carriers and that can be accessed by the communication unit 1270 in the mobile terminal 1200, and the mobile terminal 1200 generates appropriate access destinations. However, the system 1010 is not limited thereto. For example, the server units may prepare appropriate access destinations instead of the mobile terminal 1200.

In this case, each server unit is further provided with a conversion server that replaces a part of an access destination corresponding to another telecommunications carrier to prepare an access destination for itself, and that supplies the converted access destination to the mobile terminal 1200. Furthermore, if an access destination in the subscribed telecommunications carrier is not included in a link destination, the mobile terminal 1200 notifies the subscribed server unit that an access destination is not included, together with the link destination. The conversion server, in response to said notification, prepares an access destination for itself and supplies the access destination to the mobile terminal 1200. As a result thereof, the mobile terminal 1200 can receive an appropriate access destination from the conversion server, and can access an access destination corresponding to the subscribed telecommunications carrier.

As one example, at least a portion of the mobile terminal 1200 according to the present embodiment above is a computer. The computer, for example, by executing a program or the like, functions as at least some of the SIM mounting unit 1210, the identification unit 1220, the input 1230, the display unit 1240, the storage unit 1250, the selection unit 1260, and the communication unit 1270 according to the present embodiment.

The storage unit 1250 stores information regarding an OS (Operating System) for the mobile terminal 1200 to function as a terminal, and application software. Additionally, the storage unit 1250 may store various types of information including databases that are referenced when executing said application software. The storage unit 1250, for example, includes a ROM (Read-Only Memory) storing a computer BIOS (Basic Input/Output System) or the like, and a RAM (Random Access Memory) that serves as a work area. Additionally, the storage unit 1250 may include a high-capacity storage device such as an HDD (Hard Disk Drive) and/or an SSD (Solid State Drive).

The computer is provided with a processor such as a CPU, and functions as at least some of the SIM mounting unit 1210, the identification unit 1220, the input unit 1230, the display unit 1240, the storage unit 1250, the selection unit 1260, and the communication unit 1270 by executing a program stored in the storage unit 1250. The computer may be further provided with a GPU (Graphics Processing Unit) or the like.

Second Embodiment

Conventionally, personal information such as residential addresses and telephone numbers are managed by using databases. For example, a system in which a residential address registered in the database of a financial institution can be changed has been disclosed.

In a conventional system, a user who wishes to change a residential address can change the residential address by transmitting, to a residential address change server, an image capturing the residential address on a driver's license or a basic resident registration card. However, personal information such as residential addresses, telephone numbers, email addresses and the like is registered in many databases such as those of financial institutions, telecommunications carriers, online merchants, and home delivery companies. If personal information is registered in many databases, then when there is a change in the personal information, a process for changing the personal information registered in each database must be repeated, making the process of changing personal information troublesome.

According to the second embodiment, the personal information registered in databases can be easily changed.

[Summary of Information Management System S]

Figure 5:
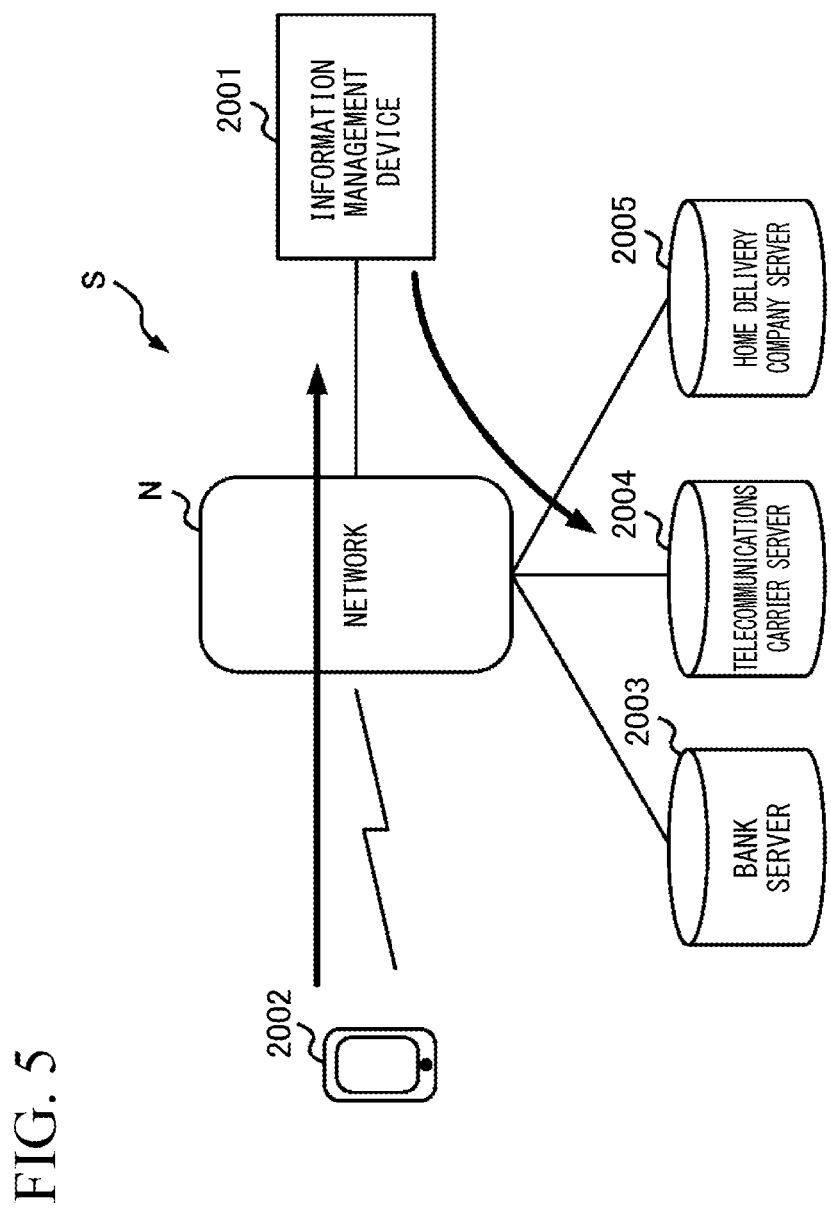
FIG. 5 is a diagram schematically illustrating an information management system according to a second embodiment.

FIG. 5 is a diagram schematically illustrating an information management system S according to the second embodiment. The information management system S is provided with an information management device 2001 and an information terminal 2002. The information management system S is a system for managing personal information of a user who is using the information terminal 2002. The information management device 2001 and the information terminal 2002 can exchange data via a network N. The network N includes, for example, the internet and mobile telephone networks.

The information management device 2001 is a server for providing personal information of the user of the information terminal 2002 to databases managed by various companies (hereinafter referred to as company databases). The databases managed by the companies are stored, for example, in the bank server 2003, the telecommunications carrier server 2004, the carrier server 2004, the home delivery company server 2005, and the company server 2005 illustrated in FIG. 1. The databases store information such as customer names, residential addresses, telephone numbers, email addresses, bank account numbers, credit card numbers, and the like so as to be associated with customer identification information.

Personal information such as residential addresses, telephone numbers, email addresses, and the like change when a user moves, changes a subscribed telecommunications carrier, or the like. When a user has personal information registered with many company databases, it is troublesome to notify the managers of the many company databases of the changed personal information each time the personal information changes.

In order to solve such problems, upon acquiring changed personal information from the information terminal 2002, the information management device 2001 notifies the bank server 2003, the telecommunications server 2004, and the home delivery company server 2005 with which the personal information of the user of the information terminal 2002 is registered. When the bank server 2003, the telecommunications carrier 2004, and the home delivery company server 2005 receive the changed personal information, the servers respectively update the personal information stored therein with the changed personal information. Due to the information management system S being configured in this way, when there is a change in the personal information, the user of the information management device 2001 can update the personal information registered with multiple companies by performing a simple process.

The information terminal 2002 is, for example, a smartphone, a tablet, or a personal computer, having an input reception unit (not illustrated) for receiving inputs of changed personal information, and an information transmission unit (not illustrated) for transmitting, to the information management device 2001, the changed personal information received by the input reception unit. Additionally, the information terminal 2002 has a display for displaying the various types of data received from the information management device 2001.

Hereinafter, the processing flow in the case in which personal information has changed will be briefly described with reference to FIG. 5. When a user inputs changed personal information to the information terminal 2002, the information terminal 2002 transmits changed information, which indicates the changed personal information, to the information management device 2001. The information terminal 2002 transmits the changed information, for example, as a short message addressed to the information management device 2001. The address is, for example, a telephone number or an account in a message exchange application. The information management device 2001, upon receiving the changed information, identifies companies with which personal information of the user of the information terminal 2002 is registered.

Next, the information management device 2001 transmits the changed information to the servers containing the databases of the identified companies. For example, when the personal information of the user of the information terminal 2002 is identified as being registered in a database contained in the telecommunications carrier server 2004, the information management device 2001 transmits the changed information to the telecommunications carrier server 2004.

Upon receiving the changed information from the information management device 2001, the company server updates the stored personal information to the changed personal information indicated by the changed information. In the case of the example indicated in FIG. 5, the telecommunications carrier server 2004 updates the personal information of the user of the information terminal 2002 in the database in which it is stored. After updating the personal information, the company server notifies the information management device 2001 that the update has been completed. The information management device 2001, in association with the personal information, stores the time and date at which the personal information was updated, in association with the company.

The user accesses the information management device 2001 via the information terminal 2002, and updates (adds, changes or deletes) the personal information stored in the information management device 2001. At this time, the user, for example, transmits the information necessary for updating the personal information to the information management device 2001 in the form of a message that can be transmitted by means of the message transmission function of the information terminal 2002. The information management device 2001 transmits the updated personal information to the company server in which the personal information that has been updated is registered. Upon receiving a notification that the personal information has been updated from the company server, the information management device 2001 stores the time and date of the update in association with the company, and notifies the user that the update has been completed. The information management device 2001, for example, transmits to the information terminal 2002 that the update has been completed in the form of a message that can be received by the information terminal 2002 by using a message transmission function.

The user may request the deletion of some or all of the personal information stored in association with the company for which the personal information was updated. In this case, the information management device 2001 stores the date on which the personal information was deleted in association with the company.

Hereinafter, the configuration and operations of the information management device 2001 will be explained in detail.

[Configuration of Information Management Device 2001]

FIG. 6 is a diagram illustrating the functional configuration of the information management device 2001. The information management device 2001 has a communication unit 2011, a storage unit 2012, and a control unit 2013. The control unit 2013 has a storage control unit 2131, an information acquisition unit 2132, and an information provision unit 2133.

The communication unit 2011 includes a communication interface for exchanging data with the information terminal 2002, the bank server 2003, the telecommunications carrier server 2004, and the home delivery company server 2005 via the network N. The communication unit 2011 inputs the received data to the information acquisition unit 2132. Additionally, the communication unit 2011 transmits the data input from the information provision unit 2133 to an address in said data.

The storage unit 2012 includes a storage medium such as a ROM (Read-Only Memory), a RAM (Random Access Memory), a hard disk, and the like. The storage unit 2012 stores programs to be executed by the control unit 2013. Additionally, the storage unit 2012 stores personal information in association with user identification information (hereinafter referred to as user IDs) for identifying the users of the information terminals 2002.

FIG. 7 is a diagram illustrating an example of a record in a personal information database in which user IDs are associated with personal information. In the record for the user having the user ID 0001 illustrated in FIG. 7, a residential address, a telephone number, a bank account number, a credit card number, and an email address are included as personal information. Additionally, information (such as company names) for identifying the companies with which each item of personal information is registered is also included. In the example illustrated in FIG. 7, the record also includes image information indicating that a company is highly reliable. Highly reliable companies are, for example, companies complying with standards relating to the handling of personal information. The image information indicating that a company is highly reliable is transmitted to the information terminal 2002 together with the company name.

FIG. 8 is a diagram illustrating another example of a record in a personal information database. In the record indicated in FIG. 8A, telephone numbers are registered in association with user IDs, and in the record indicated in FIG. 8B, company names, with which telephone numbers are registered, are registered in association with user IDs. As illustrated in FIG. 7 and FIG. 8, the personal information database may be a database in any format as long as it is a database containing, in associated form, user IDs, personal information, and companies with which personal information is registered.

The control unit 2013 is, for example, a CPU (Central Processing Unit). The control unit 2013 functions as the storage control unit 2131, the information acquisition unit 2132, and the information provision unit 2133 by performing a program stored in the storage unit 2012.

In response to a request from the information acquisition unit 2132, the storage control unit 2131 stores, in the storage unit 2012, in association with a user ID, personal information for the user of the information terminal 2002, and company identification information (hereinafter referred to as a company ID) for identifying companies with which the personal information is registered. Additionally, in response to a request from the information provision unit 2133, the storage control unit 2131 reads out personal information stored in the storage unit 2012.

The storage control unit 2131 stores, in the storage unit 2012, company IDs associated respectively with multiple types of personal information. Specifically, the storage control unit 2131 constructs the personal information database indicated in FIG. 7.

The information acquisition unit 2132 acquires personal information of users via the network N. The information acquisition unit 2132, for example, from the information terminal 2002 associated with the user ID, acquires changed information which is personal information that has been changed after the personal information was stored in the storage unit 2012 by the storage control unit 2131. The information acquisition unit 2132 notifies the storage control unit 2131 of the changed information that has been acquired. Upon being notified of the changed information, the storage control unit 2131 updates the personal information that is stored in association with the user ID corresponding to the changed information to personal information contained in the changed information.

The information acquisition unit 2132, for example, acquires changed information included in a short message transmitted to an address associated with the information management device 2001. Since the information acquisition unit 2132 can acquire changed information included in a short message, the user can use the short message transmission function standardly provided in the information terminal 2002 to transmit the changed personal information.

When the information acquisition unit 2132 has acquired the changed information, the information provision unit 2133 transmits the changed information to the company servers in which the personal information is registered. The information provision unit 2133 accesses the personal information database stored in the storage unit 2012 via the storage control unit 2131, identifies company identification information (for example, company names or company IDs) associated with the user ID of the user who transmitted the changed information acquired by the information acquisition unit 2132, and transmits the changed information to the identified company server.

More specifically, for example, the information provision unit 2133 transmits, to the servers of companies corresponding to company IDs identified by referring to the personal information database, personal information of the type stored in the storage unit 2012 in association with the company IDs. For example, in the case in which the personal information database record indicated in FIG. 7 is stored in the storage unit 2012, and the information acquisition unit 2132 has acquired, from the information terminal 2002, changed information indicating that the telephone number has changed, the information provision unit 2133 transmits the changed information indicating the changed telephone number to the servers of company ABC, company BCD, and company DEF associated with the telephone number.

Due to the information provision unit 2133 operating in this way, in the case in which the user has changed some of the personal information among the multiple types of personal information, the changed information is not transmitted to the servers of companies for which the personal information that was changed is not registered. Thus, the databases of companies in which personal information needing to be updated is registered can be updated without the information provision unit 2133 transmitting unneeded data.

[Designation of Companies to Update Personal Information]

In the above example, when the user input the changed personal information to the information terminal 2002, the information provision unit 2133 transmitted the changed personal information to the servers of companies in which that personal information is registered. However, there are likely to be cases in which a user does not want specific companies to be notified of the changed personal information. Therefore, the user may be allowed to designate companies for which the personal information is to be updated.

When the user designates companies for which the personal information is to be updated in the information terminal 2002, the information terminal 2002 transmits company designation information indicating the designated companies to the information management device 2001. The information terminal 2002 transmits, to the information management device 2001, the user ID, the company IDs of companies for which the personal information is to be updated, a request to change the personal information, and the changed personal information. Ater a user performs operations on the information terminal 2002 to read out the user's own personal information registered with a company, the user may transmit the changed personal information by selecting an icon for an operation to change the personal information.

The information acquisition unit 2132 acquires, from the information terminal 2002, company designation information for designating companies to which the changed information is to be transmitted, and notifies the information provision unit 2133 of the acquired company designation information. The information provision unit 2133 transmits the changed information to the company servers corresponding to the company designation information. Specifically, the information provision unit 2133 acquires, from the storage unit 2012, changed information registered in the personal information database in association with the companies indicated by the company designation information, and transmits the changed information that has been acquired to the servers of the companies corresponding to the company designation information.

[Provision of Registration Status to User]

There are cases in which a user wishes to check which personal information is registered with which companies. Therefore, the information terminal 2002 may receive an operation for checking the registration status of personal information. Upon receiving said operation, the information terminal 2002 transmits, to the information management device 2001, a transmission request for requesting the transmission of the personal information.

Upon receiving a transmission request from the information terminal 2002, the information management device 2001 provides the information terminal 2002 with information indicating which personal information of the user of the information terminal 2002 is registered with which companies. Specifically, first, the information acquisition unit 2132 acquires, from the information terminal 2002, a transmission request for personal information and company identification information stored in the storage unit 2012. Furthermore, in response to the information acquisition unit 2132 having acquired the transmission request, the information provision unit 2133 transmits the personal information and company identification information (such as company names), in associated form, to the information terminal 2002. Specifically, the information provision unit 2133 transmits, to the information terminal 2002, the content of the multiple items of personal information indicated in FIG. 7, and the company names registered in association with the respective items of personal information.

The information terminal 2002 may transmit a transmission request including, among the multiple types of personal information, information for designating personal information that is to be checked. For example, if the user wishes to check which residential address is registered with company ABC, then the information terminal 2002 transmits, to the information management device 2001, a transmission request requesting to check the residential address registered with company ABC. When the information acquisition unit 2132 acquires said transmission request, the information provision unit 2133 provides the information terminal 2002 with the residential address registered in the personal information database in association with company ABC. For example, when the user inputs a message inquiring "With which companies is my residential address registered?" in the information terminal 2002, the information terminal 2002 transmits said message to the information management device 2001. In response to having received said message, the information provision unit 2133 transmits, to the information terminal 2002, a message providing notification of the companies with which the personal information is registered, the content of the personal information that is registered, and the day on which the personal information was registered, for each company with which the personal information is registered.

In response to the information acquisition unit 2132 having acquired a transmission request requesting registered personal information, the information provision unit 2133 may acquire, from the servers of companies in which personal information associated with the user ID corresponding to the information terminal 2002 is registered, the personal information stored in said servers, and may transmit the acquired personal information to the information terminal 2002. Due to the information provision unit 2133 operating in this way, even in cases in which personal information registered in the personal information database stored in the storage unit 2012 is different from the personal information registered in company servers, the user can check the personal information actually registered in the company servers.

[Examples of Messages for Updating Personal Information]

Figure 9:
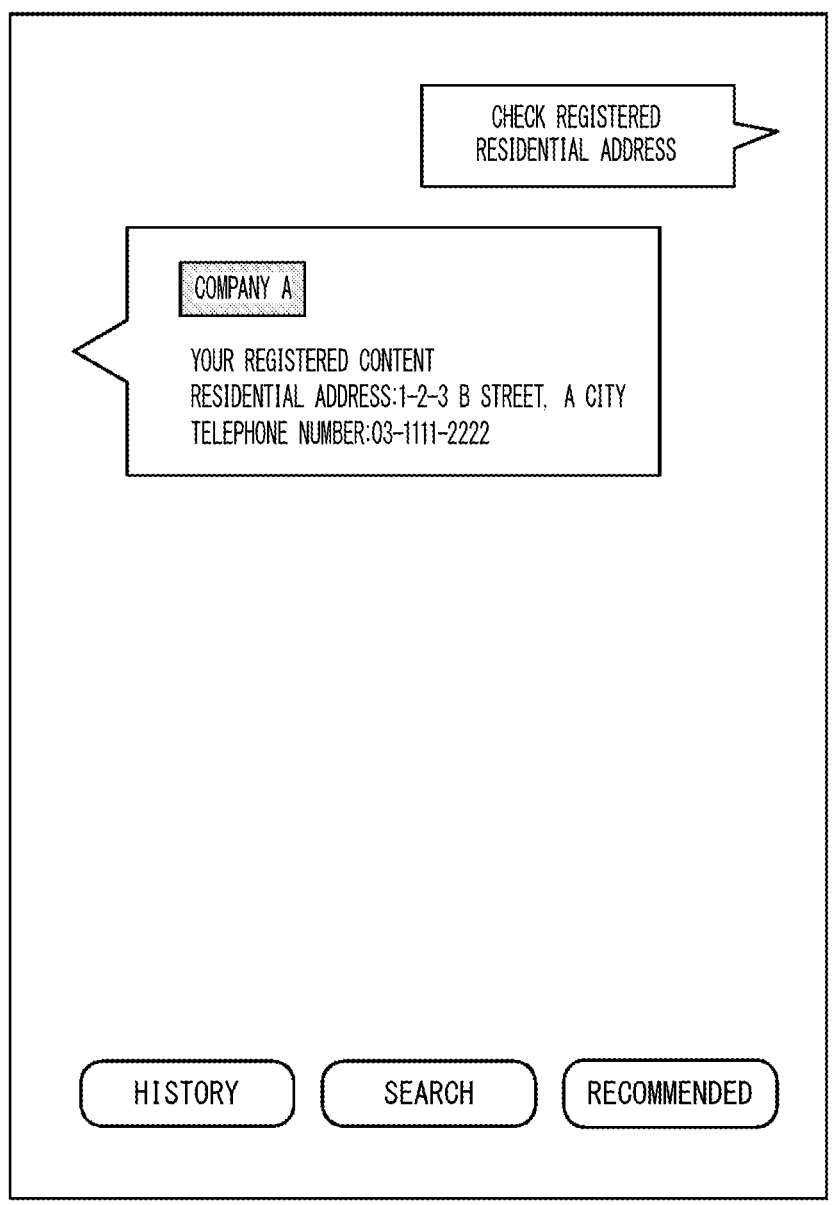
FIG. 9 is a diagram illustrating an example of a screen displayed on an information terminal when a user updates personal information.
Figure 10:
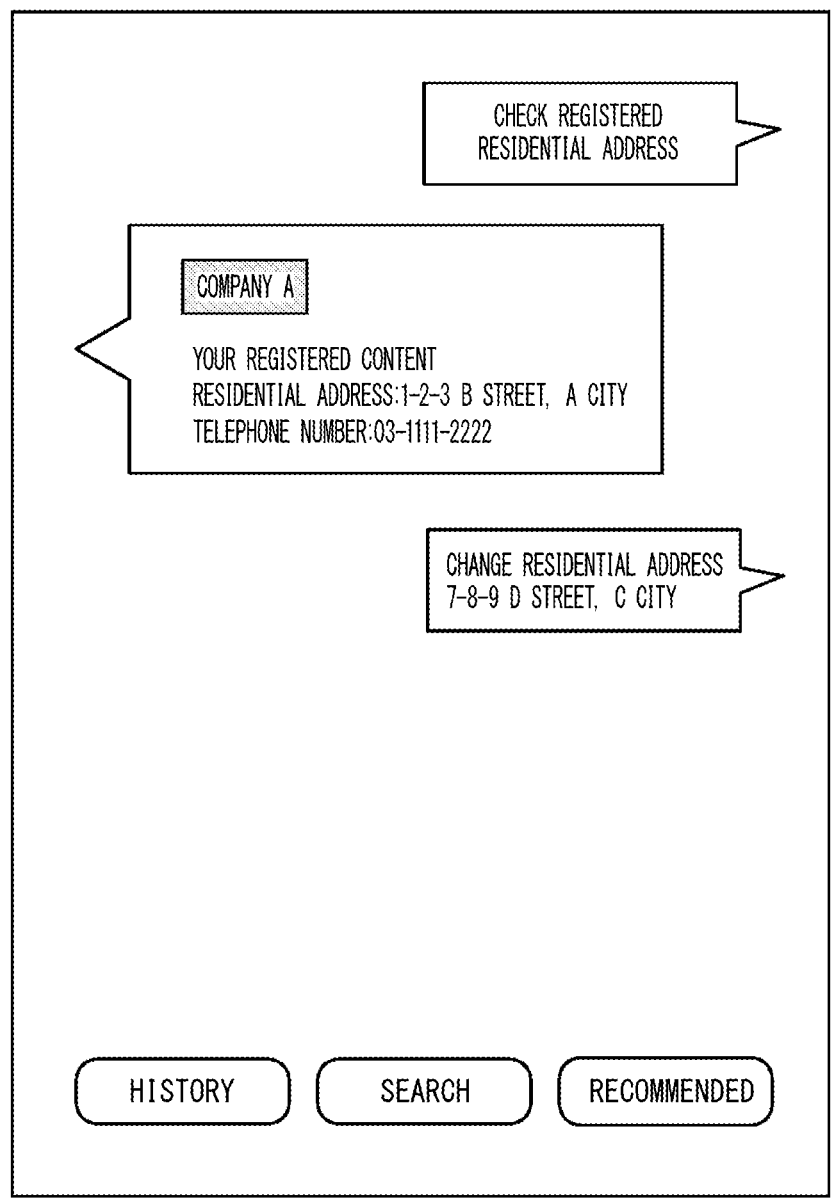
FIG. 10 is a diagram illustrating an example of a screen displayed on an information terminal when a user updates personal information.
Figure 11:
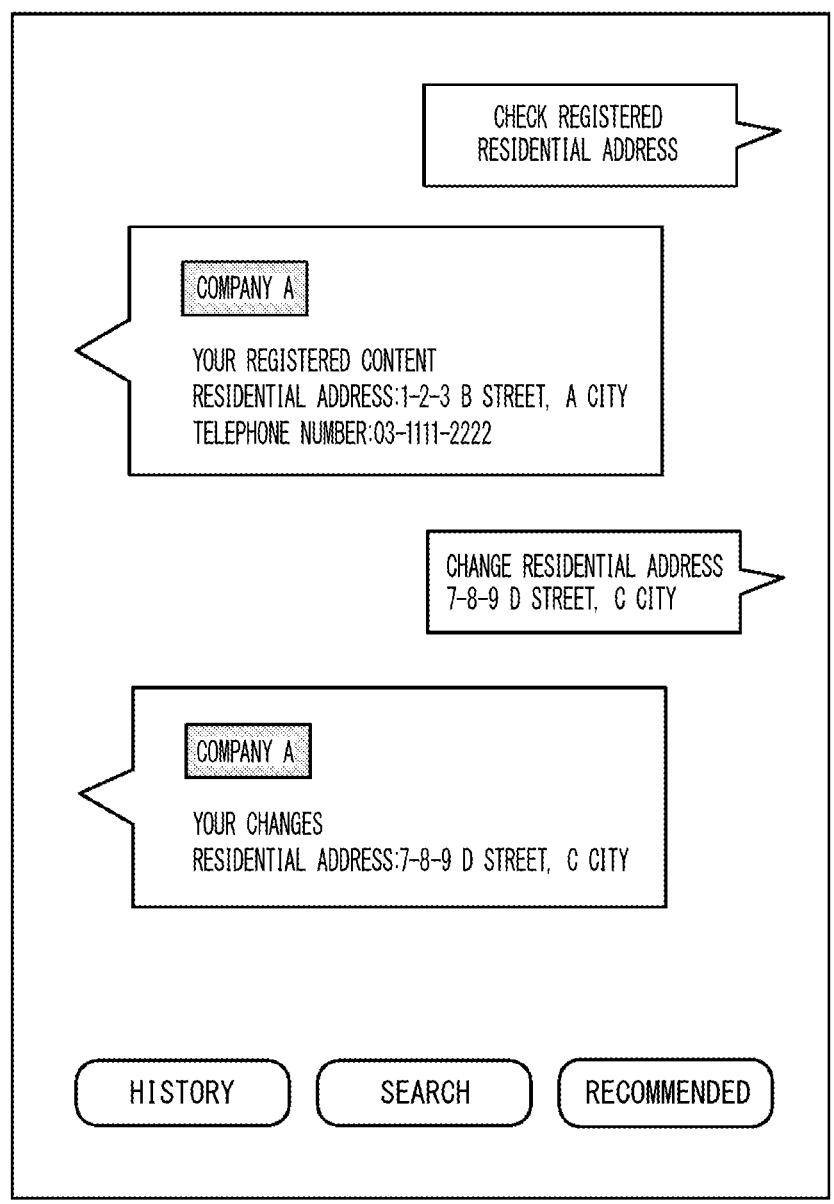
FIG. 11 is a diagram illustrating an example of a screen displayed on an information terminal when a user updates personal information.

FIG. 9 to FIG. 11 are diagrams illustrating examples of screens displayed on the information terminal 2002 when the user updates personal information. In the examples illustrated in FIG. 9 to FIG. 11, short messages are displayed in chronological order on the screen of the information terminal 2002. The short messages are, for example, SMS (Short Message Service) messages or chat messages sent through the internet.

FIG. 9 shows a message that is displayed when the user has transmitted, with the information terminal 2002, a message to "Check registered information" to the information management device 2001. On the screen of the information terminal 2002, the personal information registered in the information management device 2001 is displayed in association with the name of a company with which the information is registered.

FIG. 10 shows a message that is displayed when, while the screen in FIG. 9 is displayed, the user has transmitted, to the information management device 2001, a message including the text "Change residential address" together with the changed residential address.

FIG. 11 shows a message that is transmitted from the information management device 2001 after the message requesting the residential address change has been transmitted. In FIG. 11, a message including the changed residential address and the name of the company with which the changed residential address is registered, transmitted from the information management device 2001 that received the message regarding the residential address change, is displayed.

At the time a message requesting a change in personal information is received from an information terminal 2002, the information management device 2001 may transmit, to the information terminal 2002, a message including the changed residential address shown in FIG. 11, before receiving a notification that the registration has been completed from the server of the company at which the personal information is registered, and may further transmit, to the information terminal 2002, a message providing notification that the residential address change has been completed after receiving a notification that the registration has been completed form the server of the company at which the personal information is registered. Due to the information management device 2001 operating in this way, even if a lot of time is required for a residential address change procedure at the company with which the personal information is registered, the user can recognize that the residential address change procedure has been received.

In this way, by making use of services provided by utilizing the information management system S, the user can use the message exchange function of the information terminal 2002 to check the content of the personal information registered with each company, and can easily perform a process for changing some of the personal information.

The information terminal 2002 may receive not only requests to change contact information such as residential addresses and telephone numbers, but also requests to check or change various type of information relating to the companies at which the personal information is registered, and may transmit the received requests to the information management device 2001. For example, the information terminal 2002 transmits, to the information management device 2001, requests to check the content (for example, subscription term, used fees, and options) of services for which the user is subscribed from a company with which personal information is registered. Upon receiving said request, the information provision unit 2133 of the information management device 2001 references the personal information database stored in the storage unit 2012, acquires service content information indicating the content of subscribed services from the server of the company stored in association with the user, and transmits the acquired service content information to the information terminal 2002. The information terminal 2002 displays the received service content information.

When wishing to change the content of the subscribed services, the user can change the content of the subscribed services by a procedure similar to the procedure for changing the residential address indicated in FIG. 9 to FIG. 11. Due to the information management device 2001 and the information terminal 2002 operating in this way, the user can easily check or change the content of subscribed services without separately querying the companies providing the services.

Additionally, if the user has subscribed to use a service (for example, an online merchant site) of a company on a yearly basis, the information terminal 2002 may receive a message regarding whether or not the subscription is to be renewed from the company, and display the received message. The user may perform a subscription renewal procedure by replying to the received message with a message indicating the intention to renew the subscription. When doing so, the information terminal 2002 may display the subscription content. When a user selects, for example, an icon displayed on the outer side of the message, the information terminal 2002 splits the screen and displays a web screen and the agreed subscription content. Thereafter, if the user completes the renewal procedure, then the information terminal 2002 receives a message including a URL link and indicating that the renewal procedure has been completed. By the user selecting the URL link, the information terminal 2002 can display the details of the subscription content.

Additionally, the information terminal 2002 may provide other functions in the message exchange screens illustrated in FIG. 9 to FIG. 11. The message exchange screens in FIG. 9 to FIG. 11 display a "history" icon, a "search" icon, and a "recommended" icon that are to be operated by a user. When the user selects the "history" icon, the information terminal 2002 acquires, from the information management device 2001, the history of messages exchanged with the information management device 2001 in the past, and displays the acquired history. Due to the information management device 2001 and the information terminal 2002 performing these operations, the user can easily check the content of past personal information.

When the user selects the "search" icon, a search window for entering terms to be searched is displayed. When the user enters a company name in the search window, the information terminal 2002 transmits the company name to the information management device 2001, acquires a history of messages exchanged with the entered company in the past, and displays the acquired history. Due to the information management device 2001 and the information terminal 2002 operating in this way, the user can easily check what kinds of messages have been exchanged with specific companies.

When the user selects the "recommended" icon, the information terminal 2002 transmits, to the information management device 2001, that the "recommended" icon has been selected. When the information acquisition unit 2132 receives, from the information terminal 2002, a notification that the "recommended" icon has been selected, the information provision unit 2133 identifies the companies with which personal information of the user is registered in the personal information database, and acquires information regarding services recommended for users with respect to the servers of the identified companies. The information provision unit 2133 transmits the acquired information to the information terminal 2002. Due to the information management device 2001 and the information terminal 2002 operating in this way, the user can easily understand the content of services provided from companies with which personal information is already registered. If the user wishes to newly commence using a service, there is no need to newly register personal information. Thus, the user can easily commence using the new service.

[Operational Sequence in Information Management System S]

Figure 12:
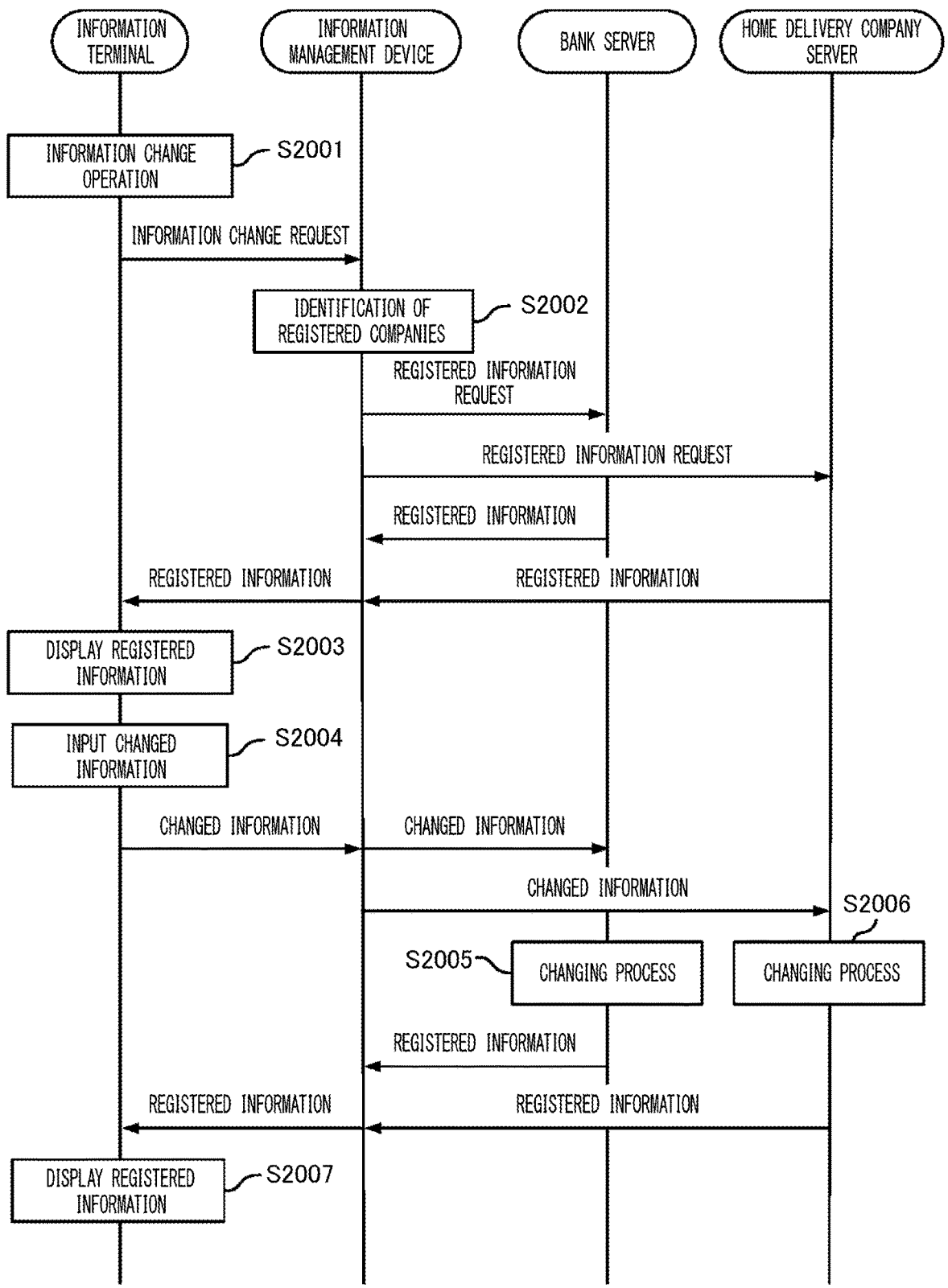
FIG. 12 is a diagram illustrating an operational sequence in the information management system according to the second embodiment.

FIG. 12 is a diagram illustrating the operational sequence in the information management system S in the second embodiment. When the user performs an operation for changing personal information (for example, by inputting a chat message including a request to change personal information) (S2001), the information terminal 2002 transmits the request to change the personal information to the information management device 2001. In the information management device 201, the information provision unit 2133 identifies companies with which the personal information is registered (S2002), and requests each of the servers of the identified companies (in the example in FIG. 12, a bank server and a home delivery company server) for information registered in association with the user of the information terminal 2002.

Upon receiving registered information from the servers of the respective companies, the information provision unit 2133 transmits the registered information that has been received to the information terminal 2002. The information provision unit 2133 may transmit the registered information of the respective companies to the information terminal 2002 separately, or may transmit registered information of the multiple companies to the information terminal 2002 at the same time.

The information terminal 2002 displays the registered information that has been received (S2003). Thereafter, upon receiving operations to change some or all of the personal information from the user and the changed residential address (S2004), the information terminal 2002 transmits the changed personal information to the information management device 2001. The information provision unit 2133 transmits the changed personal information to the servers of companies in which the personal information to be changed is registered. The company servers change the stored personal information based on the changed personal information that has been received (S2005, S6). The information provision unit 2133 acquires the newly registered personal information from the servers to which the changed personal information was transmitted, and transmits the acquired personal information to the information terminal 2002. The information terminal 2002 displays the registered personal information (S2007). Due thereto, the user can check that the personal information has been appropriately updated.

The information provision unit 2133 may have the function of a chatbot, and the information management device 2001 may automatically exchange chat-type messages with the user using the information terminal 2002. Upon receiving a chat message including, for example, a request to change the residential address, the information provision unit 2133 transmits the message "Change residential address?" to the information terminal 2002. Due to the information provision unit 2133 operating in this way, the user can easily change personal information in a chat-like manner.

Modified Example of Second Embodiment

In the above description, an example in which the information provision unit 2133 acquires the changed personal information from a personal information database stored in the storage unit 2012 was indicated. However, the information provision unit 2133 may acquire the changed personal information from the information acquisition unit 2132, which has acquired the changed information from the information terminal 2002.

[Effects of Information Management Device 2001 of Second Embodiment]

As described above, the storage control unit 2131 stores, in the storage unit 2012, in association with the user ID for identifying the user using the information terminal 2002, personal information of the user and company IDs for identifying companies with which the personal information is registered. Furthermore, when the information acquisition unit 2132 acquires, from the information terminal 2002 associated with the user ID, changed information which is personal information that has been changed after personal information was stored in the storage unit 2012 by the storage control unit 2131, the information provision unit 2133 transmits the changed information to the servers of companies with which the personal information is registered. Since the information management device 2001 has such a configuration, the user can perform an operation to change the personal information by using the information terminal 2002 without accessing the companies with which the personal information is registered.

Third Embodiment

In messaging services for exchanging messages, a system in which a user can set the user's own profile information and make the profile information public to other users is known. The system can easily identify each user by displaying a name or a nickname as the profile information rather than displaying a user ID or a telephone number.

In general systems, profile information set by the user is displayed. For this reason, a user can impersonate another person by setting the other person's information as the profile information. Other users cannot discriminate whether or not displayed profile information correctly indicates information regarding the actual user.

According to the third embodiment, information indicating whether or not profile information is correct can be provided in a messaging service.

[Summary of Communication System S]

Figure 13:
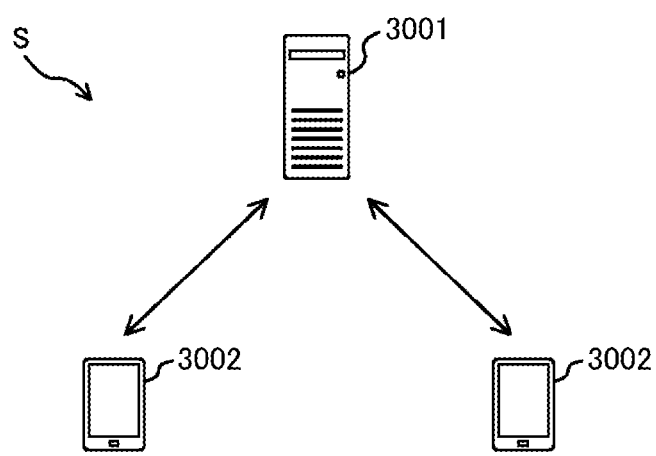
FIG. 13 is a schematic diagram of a communication system according to a third embodiment.

FIG. 13 is a schematic view of a communication system S according to the third embodiment. The communication system S includes a communication device 3001 and multiple user terminals 3002. The number of user terminals 3002 included in the communication system S is not limited. The communication system S may include devices such as other servers and other terminals.

The communication device 3001 is a computer managed by a carrier (for example, a telecommunications carrier or the like). The communication device 3001 provides, to the multiple user terminals 3002, a messaging service (also called a message service or a messenger service) for exchanging messages by communication. The messaging service is, for example, an RCS (Rich Communication Service).

The user terminals 3002 are communication terminals owned by users. The user terminals 3002 are mobile terminals such as, for example, personal computers, smartphones, or tablet terminals. The users are people to whom messaging services are provided. The user terminals 3002 can communicate with the communication device 3001. The multiple user terminals 302 exchange messages with each other via the communication device 3001.

The respective users of the multiple user terminals 3002 are subscribed to telecommunications services or the like from the carrier managing the communication device 3001. The carrier registers registered information (subscription information) on the basis of the subscription with the user. The name included in the registered information is the real name of the user (if the user is a corporation, then the name of the corporation). In other words, the registered information is information that was confirmed at the time the subscription between the carrier and the user was entered, and is correct information that has been verified by the carrier.

The user sets profile information for the communication device 3001 in the messaging service provided by the carrier. The name included in the profile information is arbitrarily set by the user, and thus may be the real name of the user, or may be a pseudonym such as a nickname.

When a certain user has set the registered information so as to be permitted to be communicated to another user, the communication device 3001 replaces at least some (for example, the name) of the profile information set by the user with the registered information, and notifies the user terminal 3002 of the other user. At this time, the communication device 3001 notifies the user terminal 3002 of the other user of verified-status information indicating that the registered information is verified.

On the other hand, if the user has used the user terminal 3002 to set the registered information so that other users are not permitted to be notified thereof, the communication device 3001 notifies the user terminal 3002 of the other user of profile information set by the user without any changes thereto.

Each of the multiple user terminals 3002 display profile information replaced by registered information together with a verification mark when verified-status information has been received from the communication device 3001. On the other hand, if each of the multiple user terminals 3002 has not received verified-status information from the communication device 3001, a verification mark is not displayed together with the profile information.

As a result thereof, other users can easily discriminate whether or not the displayed profile information of the user has been replaced with registered information (i.e., whether or not the information is correct) by seeing whether or not there is a verification mark.

[Configuration of Communication System S]

Figure 14:
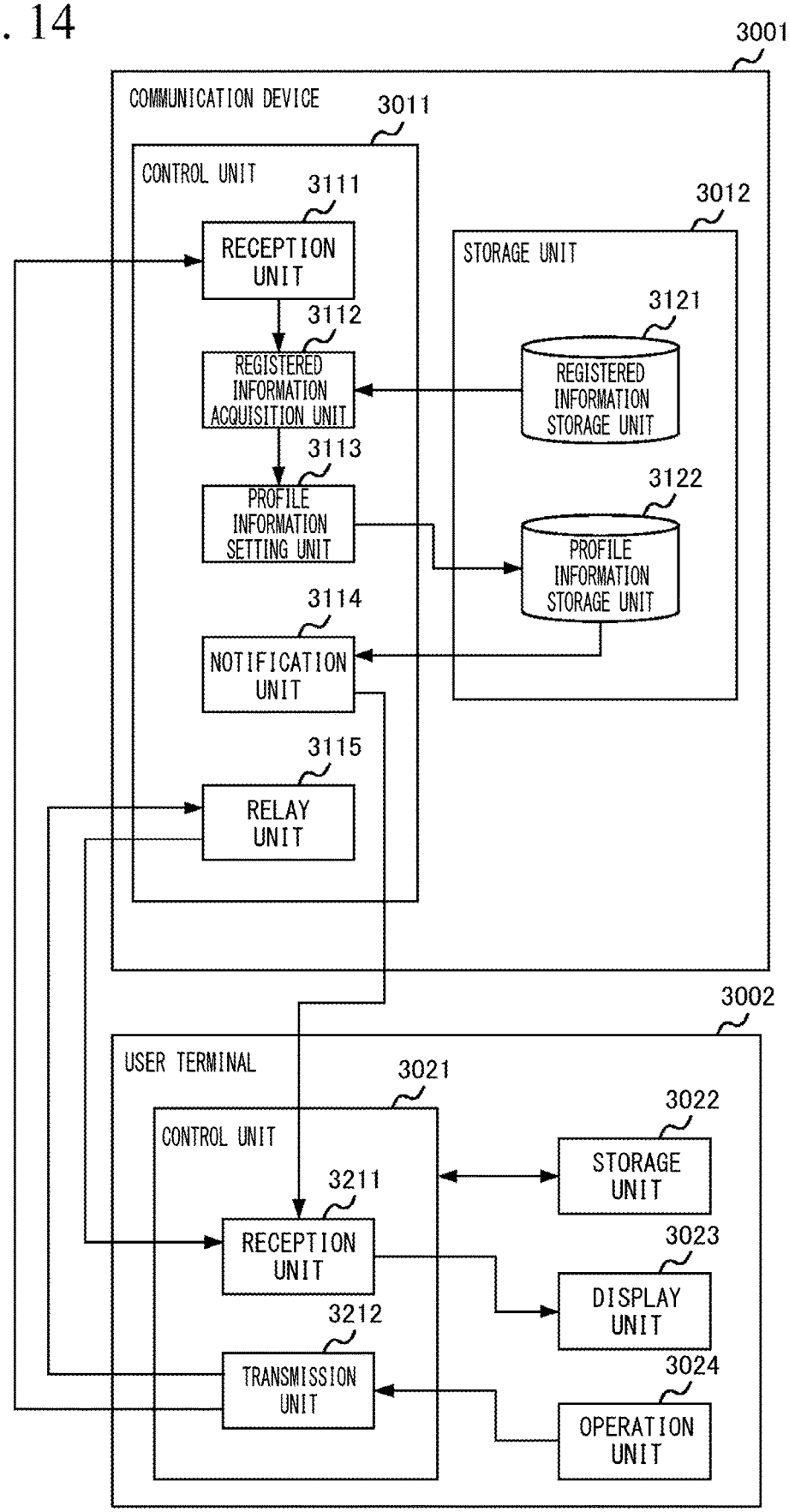
FIG. 14 is a block diagram of the communication system according to the third embodiment.

FIG. 14 is a block diagram of the communication system S according to the third embodiment. In FIG. 14, the arrows indicate the main flow of data, though there may be data flow not indicated in FIG. 14. In FIG. 14, each block indicates a functional unit configuration rather than a hardware (device) unit configuration. For this reason, the blocks illustrated in FIG. 14 may be installed in a single device, or may be installed so as to be divided between multiple devices. The exchange of data between blocks may be performed by arbitrary means such as a data bus, a network, a portable storage medium, or the like.

The communication device 3001 has a control unit 3011 and a storage unit 3012. The control unit 3011 has a reception unit 3111, a registered information acquisition unit 3112, a profile information setting unit 3113, a notification unit 3114, and a relay unit 3115. The storage unit 3012 has a registered information storage unit 3121 and a profile information storage unit 3122.

The storage unit 3012 is a storage medium including a ROM (Read-Only Memory), a RAM (Random Access Memory), a hard disk drive, and the like. A program to be executed by the control unit 3011 is pre-stored in the storage unit 3012. The storage unit 3012 may be provided outside the communication device 3001 and in that case, may exchange data with the control unit 3011 via a network.

The registered information storage unit 3121 stores registered information for the user registered by the carrier. The profile information storage unit 3122 stores profile information of the user, which is set by the user. The registered information storage unit 3121 and the profile information storage unit 3122 may respectively be storage areas in the storage unit 3012, or may be databases formed in the storage unit 3012.

The control unit 3011 is, for example, a processor such as a CPU (Central Processing Unit), which functions as the reception unit 3111, the registered information acquisition unit 3112, the profile information setting unit 3113, the notification unit 3114, and the relay unit 3115 by executing a program stored in the storage unit 3012. At least some of the functions of the control unit 3011 may be performed by an electric circuit. Additionally, at least some of the functions of the control unit 3011 may be performed by a program executed via a network.

The user terminal 3002 has a control unit 3021, a storage unit 3022, a display unit 3023, and an operation unit 3024. The control unit 3021 has a reception unit 3211 and a transmission unit 3212.

The display unit 3023 includes a display device that can display information, such as a liquid crystal display. The operation unit 3024 includes an operation device that can input information by means of a user operation, such as a keyboard or a mouse. The display unit 3023 and the operation unit 3024 may be formed integrally by using, as the display unit 3023, a touch screen that can detect a location touched by the user.

The storage unit 3022 is a storage medium including a ROM, a RAM, a hard disk drive, or the like. A program to be executed by the control unit 3021 is pre-stored in the storage unit 3022. The storage unit 3022 may be provided outside the user terminal 3002, and in that case, may exchange data with the control unit 3021 via a network.

The control unit 3021 is a processor such as, for example, a CPU, which functions as the reception unit 3211 and the transmission unit 3212 by executing a program stored in the storage unit 3022. At least some of the functions of the control unit 3021 may be performed by an electric circuit. Additionally, at least some of the functions of the control unit 3021 may be performed by a program executed via a network.

The communication device 3001 and the user terminal 3002 according to the present embodiment are not limited to the specific configurations illustrated in FIG. 14. The communication device 3001 and the user terminal 3002 are each not limited to being a single device, and may be formed by two or more physically separated devices being connected by cable or wirelessly.

[Description of Communication Method]

Figure 15:
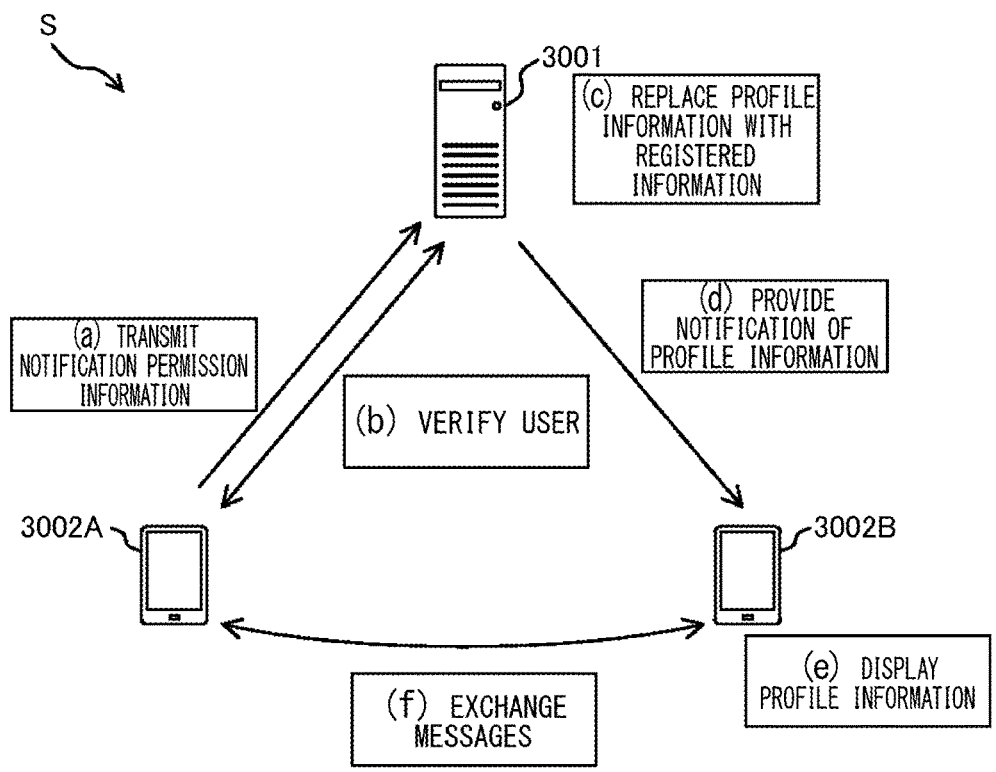
FIG. 15 is a schematic diagram of a communication method performed by the communication system according to the third embodiment.

FIG. 15 is a schematic diagram of the communication method performed by the communication system S according to the third embodiment. In the example in FIG. 15, the communication system S includes, as user terminals 3002, a first user terminal 3002A (first terminal) owned by a first user, and a second user terminal 3002B (second terminal) owned by a second user.

In the communication device 3001, registered information of each user registered by the carrier is pre-stored in the registered information storage unit 3121. Additionally, profile information of the respective users set by the respective users themselves is pre-stored in the profile information storage unit 3122. The registered information and the profile information each include a terminal ID and information relating to the user, such as a name, a telephone number, an email address, a residential address, and the like. The terminal ID is, for example, an IMSI (International Mobile Subscriber Identity), an IMEI (International Mobile Equipment Identity), a telephone number, a user ID, or the like associated with the user terminal 3002 owned by the user.

When the first user performs a prescribed operation (for example, an operation on an application for receiving messaging services) on the first user terminal 3002A, the first user terminal 3002A displays, on the display unit 3023, a settings screen for setting whether or not to notify other users of registered information.

Figure 16:
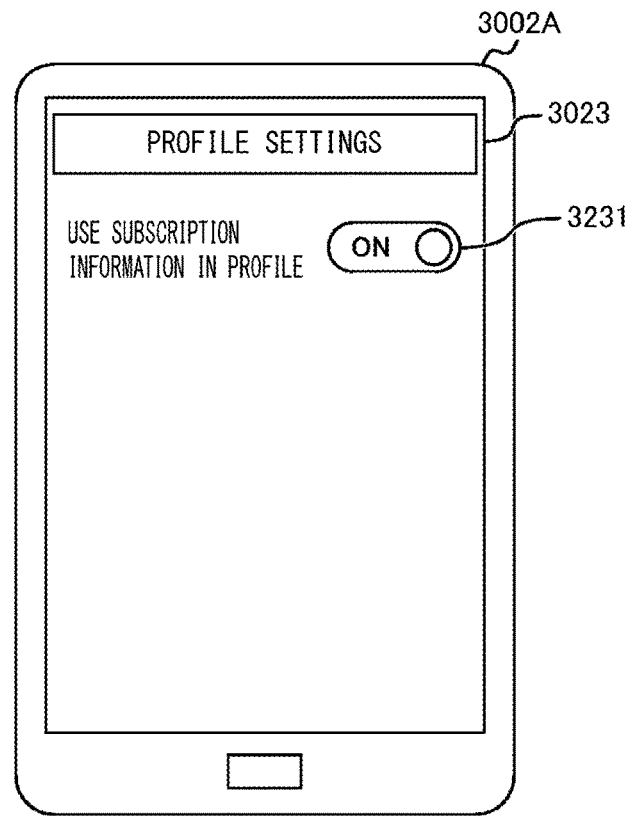
FIG. 16 is a front view of a first user terminal displaying a settings screen for setting whether or not to notify other users of registered information.

FIG. 16 is a front view of a first user terminal 3002A displaying a settings screen for setting whether or not to notify other users of registered information. The settings screen includes a button 3231 for selecting whether or not to notify other users of the registered information. The button 3231 is a virtual button (icon) that can be pressed by the user. The first user uses the operation unit 3024 in the first user terminal 3002A to press the button 3231 in accordance with whether or not other users are to be notified of the registered information.

Returning to FIG. 15, the transmission unit 3212 in the first user terminal 3002A, based on an operation performed on the operation unit 3024, transmits notification permission information indicating whether or not other users are to be notified of the registered information to the communication device 300I together with identification information (terminal ID) of the first user terminal 3002A (a).

The reception unit 3111 in the communication device 3001 verifies the first user terminal 3002A, and receives the notification permission information and the terminal ID transmitted by the first user terminal 3002A (b). In order to verify the first user terminal 3002A, the reception unit 3111 performs, for example, a known method of line verification or password verification. Thus, the communication device 3001 can confirm the intention of the user to disclose registered information to other users or not by receiving notification permission information from the user.

When the notification permission information received by the reception unit 3111 indicates that other users (i.e., the second user terminal 3002B) are permitted to be notified of the registered information, the registered information acquisition unit 3112 acquires, from the registered information storage unit 3121, the registered information associated with the terminal ID received by the reception unit 3111.

The profile information setting unit 3113 replaces at least some of the profile information associated with the terminal ID received by the reception unit 3111 in the profile information storage unit 3122 with the registered information acquired by the registered information acquisition unit 3112 (c). The profile information setting unit 3113 may overwrite at least some of the profile information stored in the profile information storage unit 3122 with the registered information, or may temporarily replace at least some of the profile information read out from the profile information storage unit 3122 with the registered information.

FIG. 17A and FIG. 17B is a schematic diagram of profile information stored in the profile information storage unit 3122. FIG. 17A represents exemplary profile information P1 that is not replaced with registered information, and FIG. 17B represents exemplary profile information P2 that is replaced with registered information.

The profile information P1 is information relating to a user that is set by the user and associated with the terminal ID. In the example in FIG. 17A, the profile information P1 includes a name, a telephone number, an email address, and a residential address. Furthermore, in the profile information P1, as a verification flag indicating whether or not information has been replaced with registered information, a "no" is set to indicate that no information has been replaced with registered information.

The profile information P2 is generated by replacing some of the profile information P1 with registered information set by the carrier. In the example in FIG. 17B, only the name, which is underlined, is replaced by registered information. However, other profile information relating to the user, such as the telephone number, the email address, the residential address, and the like may also be replaced with registered information. Furthermore, in the profile information P2, as a verification flag indicating whether or not information has been replaced with registered information, a "yes" is set to indicate that information has been replaced with registered information.

The profile information P1 and P2 in FIG. 17A and FIG. 17B is represented in tables by text strings for the purpose of visibility. However, the data may be recorded in any form, and may, for example, be any of text string data, numerical data, and binary data. The profile information P1 and P2 may be recorded as databases, or may be recorded as lists in which the data is listed.

Returning to FIG. 15, when a second user has performed an operation to display the profile information of the first user on the second user terminal 3002B (an application for receiving messaging services), the second user terminal 3002B requests the communication device 3001 for the profile information of the first user. The notification unit 3114 of the communication device 3001 acquires profile information associated with the terminal ID of the first user terminal 3002A owned by the first user, and notifies the second user terminal 3002B thereof (d). At this time, if the profile information is indicated as having been replaced with registered information (i.e., the verification flag indicates "yes"), then the notification unit 3114 notifies the second user terminal 3002B of verified-status information, indicating that the registered information has been verified, together with the profile information.

The reception unit 3211 in the second user terminal 3002B receives the profile information and the verified-status information transmitted by the communication device 3001. The reception unit 3211 displays the received profile information and verified-status information on the display unit 3023 (e).

Figure 18A:
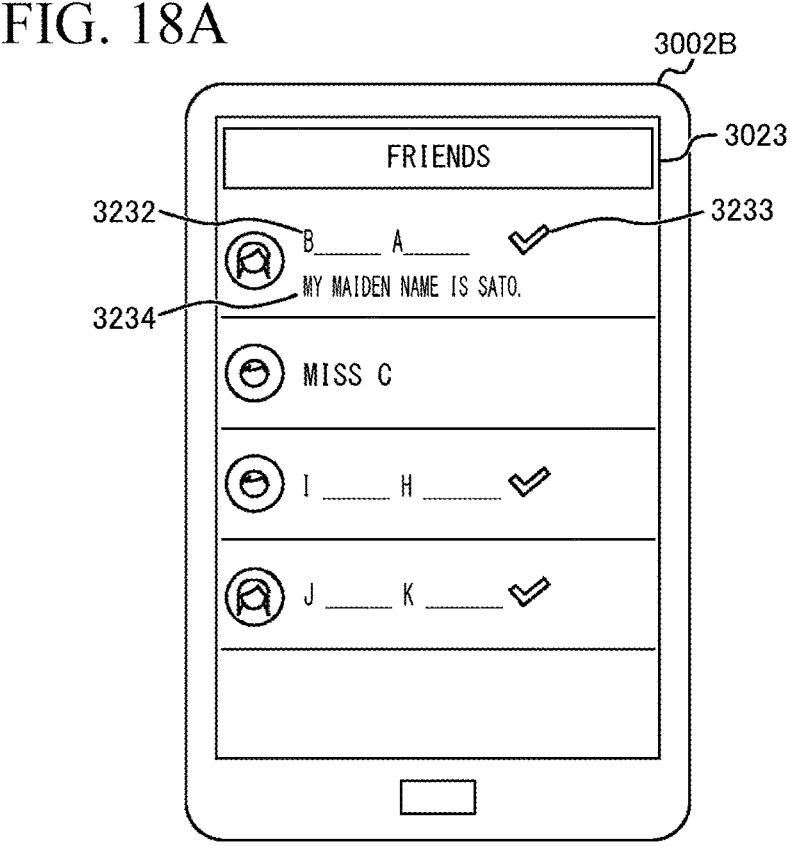
FIG. 18A is a first front view of a second user terminal displaying profile information and verified-status information.

FIG. 18A and FIG. 18I are front views of the second user terminal 3002B displaying the profile information and the verified-status information. In the example in FIG. 18A, the second user terminal 3002B displays a friends list screen indicating a list of one or more first users whom the second user has registered as friends.

In the friends list screen, the second user terminal 3002B displays profiles 3232 and verification marks 3233 on the display unit 3023 for each of the one or more first users based on profile information and verified-status information received from the communication device 3001. As the profiles 3232, the second user terminal 3002B displays the names indicated in the profile information. However, there is no such limitation, and the second user terminal 3002B may also display telephone numbers, email addresses, residential addresses, or the like indicated by the profile information.

Figure 18B:
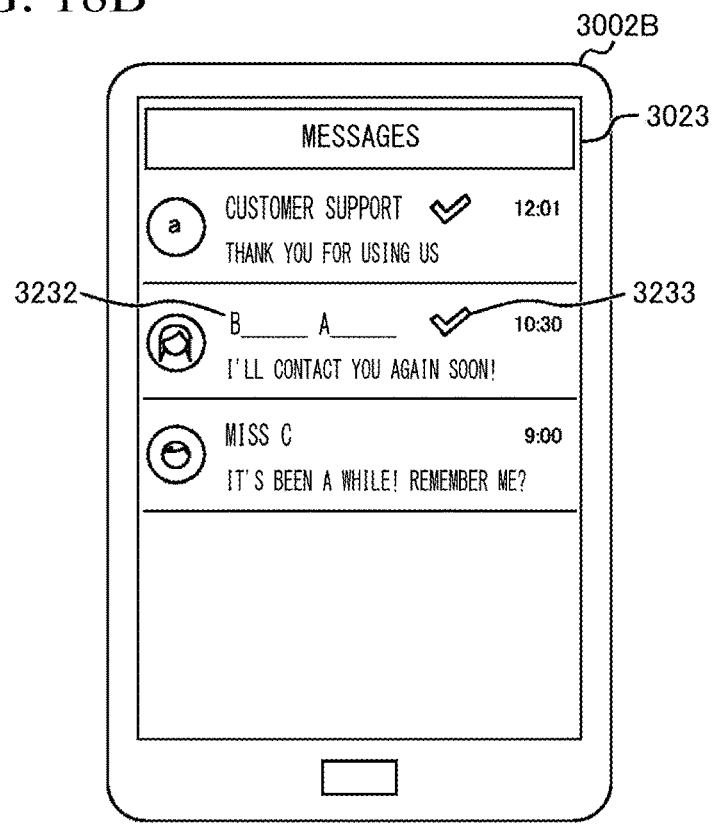
FIG. 18B is a second front view of the second user terminal displaying profile information and verified-status information.

In the example in FIG. 18B, the second user terminal 3002B displays a message list screen indicating a list of one or more first users with whom the second user has exchanged messages in the past. In the message list screen, the second user terminal 3002B displays, on the display unit 3023, a profile 3232 and a verification mark 3233 for each of the one or more first users based on the profile information and the verified-status information received from the communication device 3001. As the profiles 3232, the second user terminal 3002B displays the names indicated in the profile information. However, there is no such limitation, and the second user terminal 3002B may also display telephone numbers, email addresses, residential addresses, or the like indicated by the profile information.

The second user terminal 3002B displays verification marks 3233 near the profiles 3232 of the first users for whom verified-status information has been received together with the profile information. On the other hand, the second user terminal 3002B does not display verification marks 3233 near the profiles 3232 of first users for whom verified-status information was not received together with the profile information.

The verification marks 3233 may be a certain shape or may be certain text, as long as they can indicate that a profile 3232 has been registered (verified) by the carrier. Alternatively, the second user terminal 3002B may indicate that a profile 3232 has been registered by the carrier by changing the appearance (color or text type) of the profile 3232. As a result thereof, a second user can easily know whether or not the profile 3232 of a first user displayed on the screen is information that has been registered by the carrier.

Furthermore, the second user terminal 3002B may display additional information 3234 near the profiles 3232. The additional information 3234 consists of text strings set by the first users, representing, for example, maiden names or nicknames of the first users. As a result thereof, even if profile information is automatically replaced with registered information, the first user can provide arbitrary information to the second user.

Returning to FIG. 15, the second user references the profile of a first user displayed on the screens indicated in FIG. 18A and FIG. 18B, and exchanges messages with the first user (f). Specifically, when the second user transmits a message to the first user, the second user terminal 3002B transmits the message to the communication device 3001 with the terminal ID of the first user terminal 3002A owned by the first user as the transmission destination.

The relay unit 3115 in the communication device 3001 forwards the message transmitted by the second user terminal 3002B to the first user terminal 3002A that is the transmission destination of said message. Similarly, the relay unit 3115 forwards a message transmitted by the first user terminal 3002A to the second user terminal 3002B that is the transmission destination of said message. The first user terminal 3002A and the second user terminal 3002B respectively display the exchanged messages on display units 3023.

The relay unit 3115 may also forward a message on the condition that the user notifies another user of registered information. In this case, in the case in which the first user has not permitted a second user to be notified of registered information in the screen indicated in FIG. 16, if the first user is trying to transmit or has transmitted a message to the second user, the notification unit 3114 provides the first user terminal 3002A with a settings request to permit the second user (second user terminal 3002B) to be notified of registered information. The relay unit 3115 does not forward the message from the first user terminal 3002A to the second user terminal 3002B until the first user permits the second user to be notified of the registered information.

Figure 19:
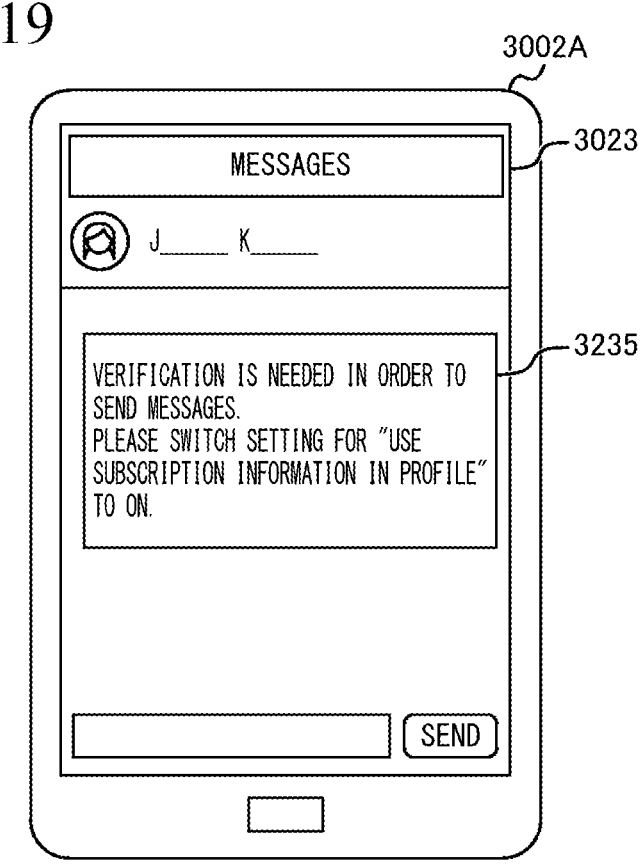
FIG. 19 is a front view of the first user terminal displaying a setting request for permitting notification of registered information.

The first user terminal 3002A displays the settings request received from the communication device 3001 on the display unit 3023. FIG. 19 is a front view of the first user terminal 3002A displaying a settings request for permitting notification of registered information. The first user terminal 3002A displays a message 235 representing a settings request. Thereafter, the first user terminal 3002A may transition to the settings screen in FIG. 16. As a result thereof, registered information must be disclosed in order to transmit messages to other users, and thus, non-verified users can be kept from transmitting unwanted messages and the like to other users.

[Sequence of Communication Method]

Figure 20:
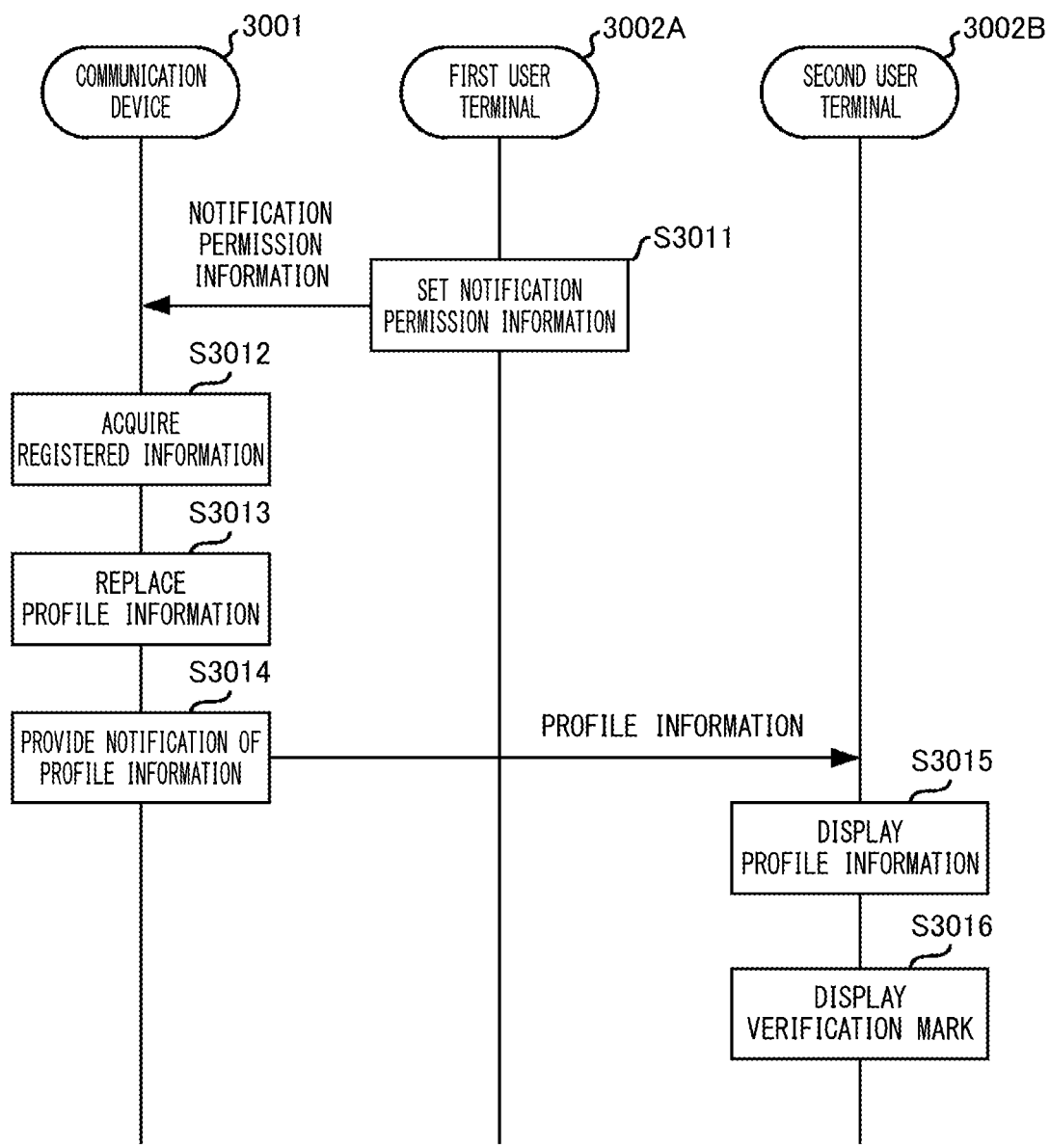
FIG. 20 is a sequence diagram of the communication method performed by the communication system according to the third embodiment.

FIG. 20 is a sequence diagram of the communication method performed by the communication system S according to the third embodiment. A first user sets whether or not other users are to be notified of registered information on the settings screen displayed on the display unit 3023 of the first user terminal 3002A (S3011). Based on an operation performed on the operation unit 3024, the transmission unit 3212 of the first user terminal 3002A transmits, to the communication device 3001, together with identification information (terminal ID) of the first user terminal 3002A, notification permission information indicating whether or not other users are to be notified of registered information.

The reception unit 3111 of the communication device 3001 verifies the first user terminal 3002A and receives the terminal ID and the notification permission information transmitted by the first user terminal 3002A. When the notification permission information received by the reception unit 3111 indicates that other users (i.e., the second user terminal 3002B) are permitted to be notified of registered information, the registered information acquisition unit 3112 acquires, from the registered information storage unit 3121, registered information associated with the terminal ID received by the reception unit 3111 (S3012).

The profile information setting unit 3113 replaces at least some of the profile information associated with the terminal ID received by the reception unit 3111 in the profile information storage unit 3122 with registered information acquired by the registered information acquisition unit 3112 (S3013). If the notification permission information received by the reception unit 3111 does not indicate that other users are permitted to be notified of the registered information, then steps S12 and S13 are skipped.

When the second user displays profile information of the first user on the second user terminal 3002B, the second user terminal 3002B requests the communication device 3001 for profile information of the first user. The notification unit 3114 of the communication device 3001 acquires, from the profile information storage unit 3122, profile information associated with the terminal ID of the first user terminal 3002A owned by the first user, and notifies the second user terminal 3002B thereof (S3014). At this time, when the notification permission information received by the reception unit 3111 indicates that other users are permitted to be notified of registered information, the notification unit 3114 notifies the second user terminal 3002B of the profile information replaced with registered information, and verified-status information indicating that the registered information has been verified.

The reception unit 3211 in the second user terminal 3002B receives the profile information and the verified-status information transmitted by the communication device 3001. The reception unit 3211 displays the received profile information on the display unit 3023 (S3015). Additionally, when verified-status information has been received together with the profile information, the notification unit 3211 displays a verification mark near the profile information (S3016).

Effects of Third Embodiment

In the communication system S according to the third embodiment, when a user has set to allow notification of registration information registered by a carrier to other users, the communication device 3001 replaces profile information with registered information and transmits the replaced information to the user terminals 3002 of other users. As a result thereof, the communication device 3001 can provide information indicating whether or not the profile information of a user is correct. Users can easily discriminate whether or not displayed profile information of other users has been replaced with registered information (i.e., whether or not the information is correct) by observing the presence or absence of a verification mark.

Additionally, the communication device 3001 replaces the profile information with registered information based on a subscription between the carrier and the user. For this reason, there is no need for a user to newly present proof documentation, such as a license, to receive verification in a messaging service, thereby reducing the burden on both the user and the carrier.

First Modified Example of Third Embodiment

In the present modified example, when multiple items of registered information are registered for a single user, the communication system S receives, from the user, a selection regarding which registered information may be provided in a notification. One or more items of registered information of the respective users registered by a carrier are pre-stored in the registration information storage unit 3121.

For example, if the name of a user has changed due to marriage or the like, the registered information storage unit 3121 stores registered information indicating both the current name and the maiden name of the user. Additionally, for example, if a user being provided with a messaging service (i.e., the service user) is different from the user subscribed to the carrier (i.e., the subscriber), then the registered information storage unit 3121 stores the registered information of the service user in association with the registered information of the subscriber. The multiple items of registered information are not limited to the examples indicated here, and may include other information such as an old address and a new address, an old telephone number and a new telephone number, or the like.

The communication device 3001 transmits the multiple items of registered information associated with the first user in the registered information storage unit 3121 to the first user terminal 3002A. The first user terminal 3002A uses the multiple items of registered information received from the communication device 3001 to display a settings screen for setting whether or not other users are to be notified of registered information.

Figure 21A:
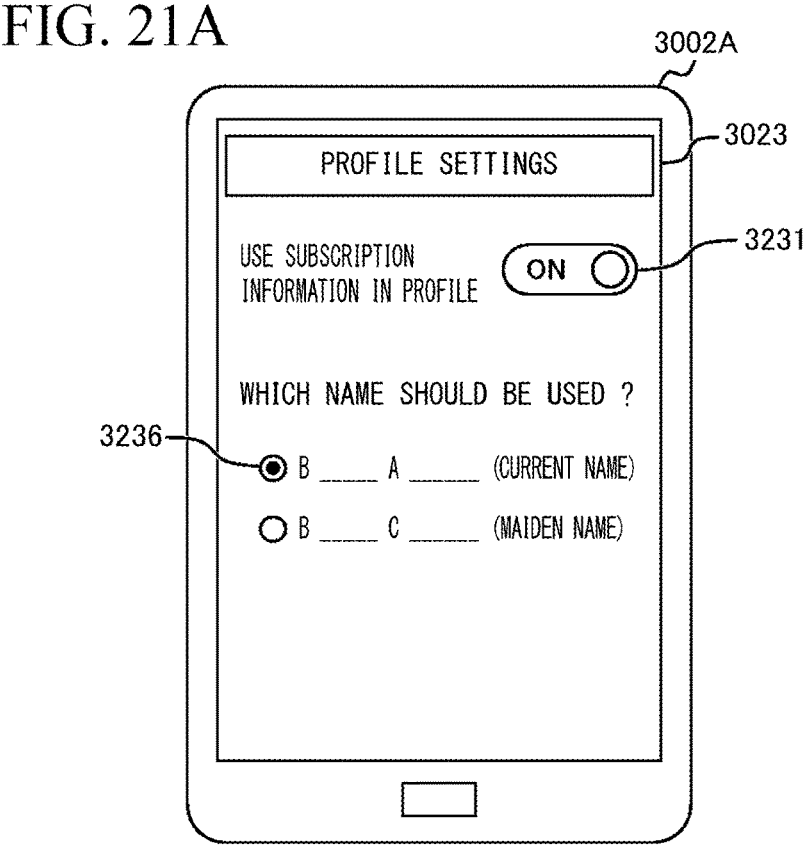
FIG. 21A is a first front view of the first user terminal displaying a settings screen for setting whether or not to notify other users of registered information.
Figure 21B:
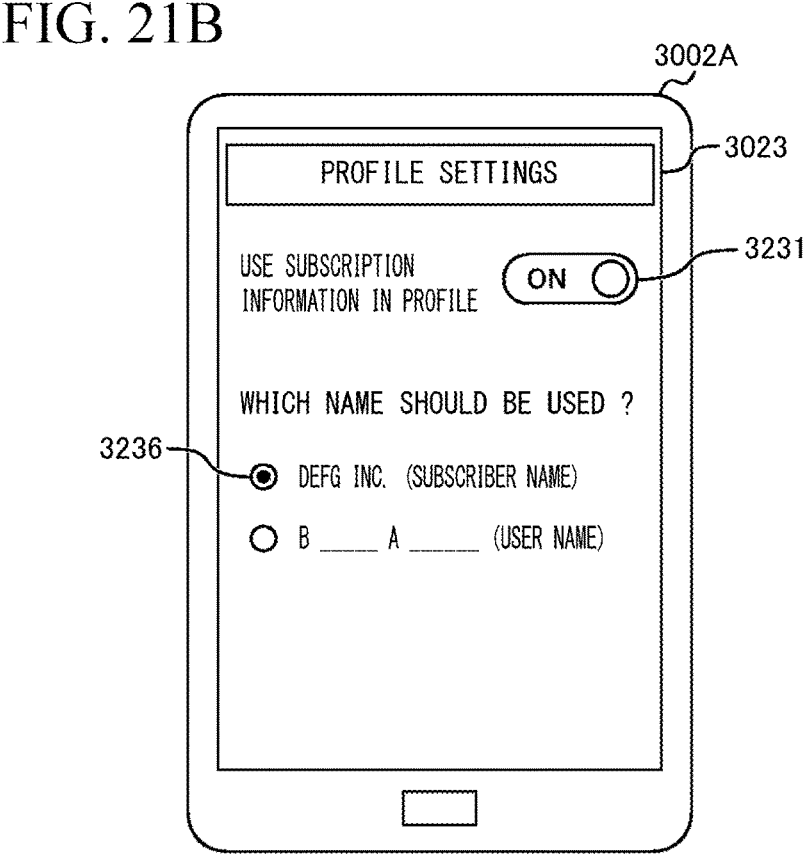
FIG. 21B is a second front view of the first user terminal displaying a settings screen for setting whether or not to notify other users of registered information.

FIG. 21A and FIG. 21B are front views of a first user terminal 3002A displaying settings screens for setting whether or not other users are to be notified of registered information. The settings screens include a button 3231 for selecting whether or not other users are to be notified of registered information, and multiple items of registered information 3236 from which those that may be included in notifications can be selected. In the example in FIG. 21A, the current name and the maiden name of a user are displayed as the multiple items of registered information 3236. In the example in FIG. 21B, a subscriber name and a service user name are displayed as the multiple items of registered information 3236.

After using the operation unit 3024 of the first user terminal 3002A to press the button 3231 in accordance with whether or not other users are to be notified of the registered information, the first user selects one of the items of registered information 3236. Based on an operation performed on the operation unit 3024, the transmission unit 3212 of the first user terminal 3002A transmits, to the communication device 3001, together with identification information (terminal ID) of the first user terminal 3002A, notification permission information indicating whether or not other users are to be notified of registered information, and selection information indicating which of the multiple items of registered information are to be used for notification.

In the communication device 3001, the profile information setting unit 3113 replaces at least some of the profile information associated with the terminal ID received by the reception unit 3111 in the profile information storage unit 3122 with registered information, among the multiple items of registered information, indicated by the selection information received by the reception unit 3111.

Due to this configuration, the communication device 3001 can notify other users of registered information selected by the user when there are multiple potential items of registered information for a single user.

Second Modified Example of Third Embodiment

Figure 22:
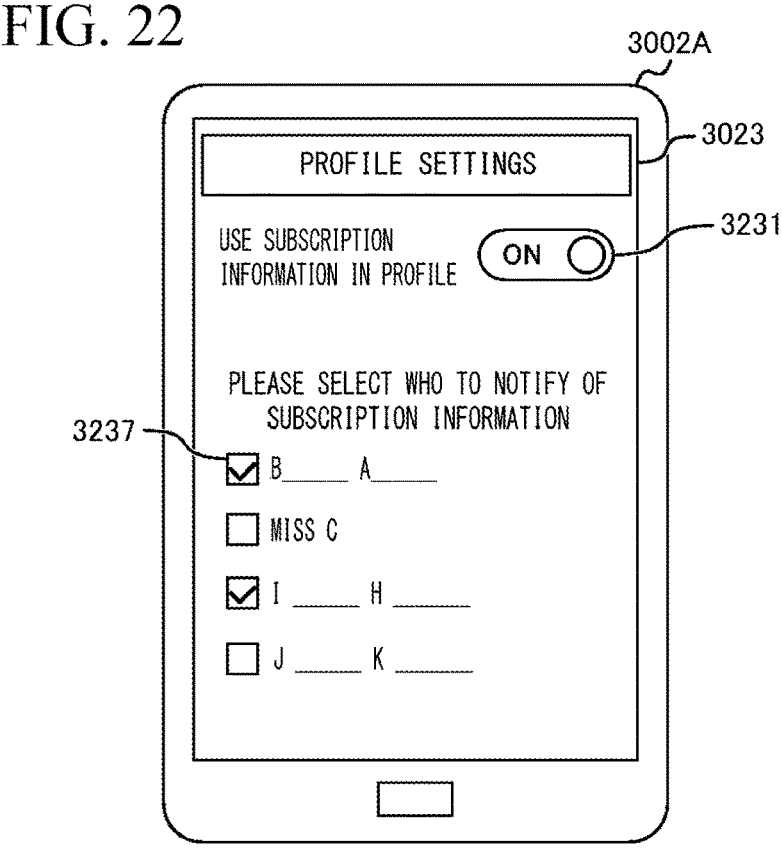
FIG. 22 is a front view of the first user terminal displaying a selection screen for selecting people who are to be notified of registered information.

In the present modified example, the communication system S receives, from the user, a selection of people permitted to be notified of registered information. FIG. 22 is a front view of a first user terminal 3002A displaying a selection screen for selecting people who are to be notified of registered information. The selection screen includes, in addition to the button 3231 indicated in FIG. 16, a selection section 3237 indicating users who are to be notified of registered information. The selection section 3237 is composed, for example, of checkboxes that can be selectively switched between whether or not each user is to be notified of registered information.

After using the operation unit 3024 in the first user terminal 3002A to press the button 3231 in accordance with whether or not other users are to be notified of registered information, the first user selects users who are to be notified of the registered information in the selection section 3237.

Although the selection screen illustrated in FIG. 22 is displayed as a screen that is integrated with the settings screen illustrated in FIG. 16, it may be displayed as a separate screen. For example, the first user terminal 3002A may receive a selection of people who are to be notified of registered information in a screen for transmitting messages (group messages) from a single user to multiple users.

Based on an operation performed on the operation unit 3024, the transmission unit 3212 in the first user terminal 3002A transmits, to the communication device 3001, together with identification information (terminal ID) of the first user terminal 3002A, notification permission information indicating identification information (terminal ID) for the second user terminals 3002B of users who are permitted to be notified of the registered information.

The reception unit 3111 in the communication device 3001 receives the notification permission information and the terminal IDs transmitted by the first user terminal 3002A. The profile information storage unit 3122 holds both profile information replaced with registered information and profile information not replaced with registered information.

When a second user displays profile information of the first user on a second user terminal 3002B (an application for receiving messaging services), the second user terminal 3002B requests the communication device 3001 for the profile information of the first user. If the second user terminal 3002B requesting the profile information is a second user terminal 3002B corresponding to a terminal ID indicated by the notification permission information, then the notification unit 3114 of the communication device 3001 acquires the profile information replaced with registered information from the profile information storage unit 3122, and notifies the second user terminal 3002B thereof. On the other hand, if the second user terminal 3002B requesting the profile information is not a second user terminal 3002B corresponding to a terminal ID indicated by the notification permission information, then the notification unit 3114 of the communication device 3001 acquires the profile information not replaced with registered information from the profile information storage unit 3122, and notifies the second user terminal 3002B thereof.

With the communication system S according to the present modified example, the user can select people who are permitted to be notified of the registered information, thereby preventing unknown people from gaining knowledge of the registered information.

Third Modified Example of Third Embodiment

In the present modified example, the communication system S changes the appearance of the verification mark in accordance with the degree of reliability (reliability level) of the registered information registered by a user. For example, the reliability level becomes higher as the period of the subscription with the carrier becomes longer. In this case, the registered information stored in the registered information storage unit 3121 indicates the subscription period (i.e., the period for which the subscription has been maintained) between the user and the carrier in addition to the terminal ID, the name, the telephone number, the email address, and the residential address. The longer the subscription period, the higher the reliability of the registered information can be considered to be.

The notification unit 3114 in the communication device 3001, for example, determines a three-level ("low", "medium", "high") reliability in accordance with the length of the subscription period indicated by the registered information of the user of the first user terminal 3002A. The notification unit 3114 transmits verified-status information indicating the determined reliability level in addition to the profile information replaced with registered information.

The reception unit 3211 of the second user terminal 3002B receives the profile information and the verified-status information transmitted by the communication device 3001. The reception unit 3211 displays the received profile information and verified-status information on the display unit 3023.

Figure 23:
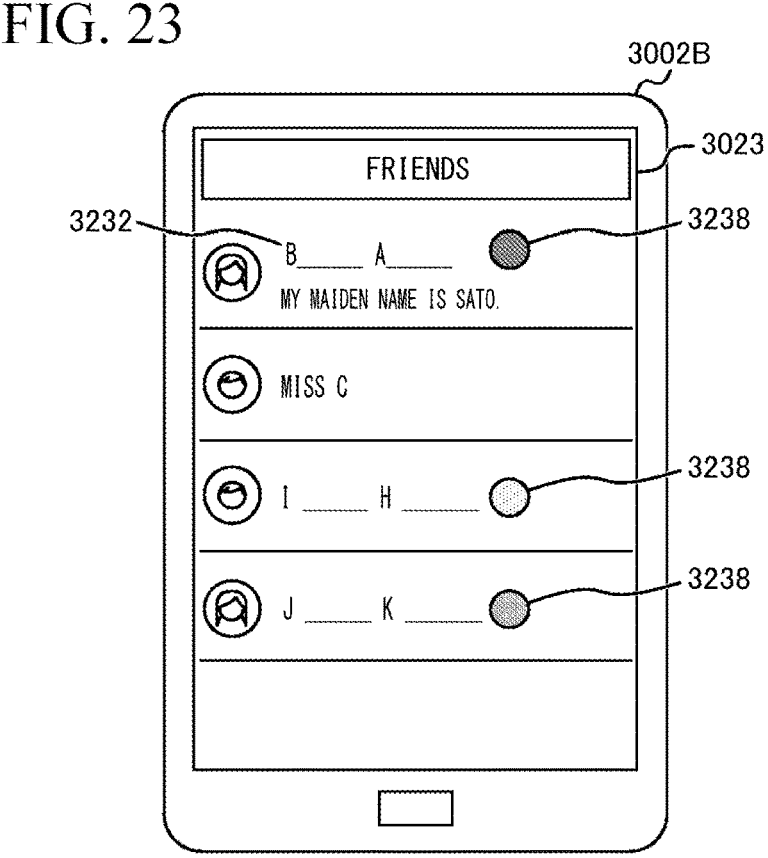
FIG. 23 is a front view of the second user terminal displaying profile information and verified-status information.

FIG. 23 is a front view of a second user terminal 3002B displaying profile information and verified-status information. In the example in FIG. 23, the second user terminal 3002B displays a friend list screen indicating a list of one or more first users registered as friends by the second user.

In the friends list screen, the second user terminal 3002B displays, on the display unit 3023, a profile 3232 and a verification mark 3238 for each of the one or more first users based on the profile information and the verified-status information received from the communication device 3001.

In the present modified example, the second user terminal 3002B changes the appearance (i.e., the display mode) of the verification mark 3238 based on the reliability level indicated by the verified-status information. For example, the second user terminal 3002B changes the color, shape, or pattern of the verification mark 3238 in accordance with the reliability. Additionally, the second user terminal 3002B may change the text type or the background color of the profile 3232 in accordance with the reliability level.

As a result thereof, the user can easily know the degree of reliability of registered information of other users by looking at the verification marks 3238 displayed on the screen.

The processors in the communication device 3001 and the user terminals 3002 perform the steps (processes) included in the communication method indicated in FIG. 20. In other words, processors in the communication device 3001 and the user terminals 3002 perform the communication method indicated in FIG. 20 by reading out programs for executing the communication method indicated in FIG. 20 from the storage units, and executing the programs to control the respective units in the communication device 3001 and the user terminals 3002. Some of the steps included in the communication method indicated in FIG. 20 may be skipped, the order of the steps may be changed, or multiple steps may be performed in parallel.

Fourth Embodiment

Systems in which a user is able to receive various services from a company by performing user registration (for example, by setting a friend relationship, transmitting personal information, or the like) with the company on a user terminal in a messaging service for exchanging messages are known.

There are cases in which the same messaging service is provided on multiple carriers. Conventionally, in the case in which a user transferred a subscription for telecommunications services or the like from one carrier to another carrier (in other words, when a user changed a subscription for telecommunications services or the like from one carrier to another carrier), if the user wished to continue to use the messaging service with the transfer destination carrier, then the user needed to perform user registration with the company again through the transfer destination carrier, because user registration was independent for each carrier. For this reason, when a user transferred a subscription between carriers, there was a large burden to perform user registration with companies in the messaging service.

According to the fourth embodiment, the burden of performing user registration with companies in a messaging service can be reduced.

[Summary of Communication System S]

Figure 24:
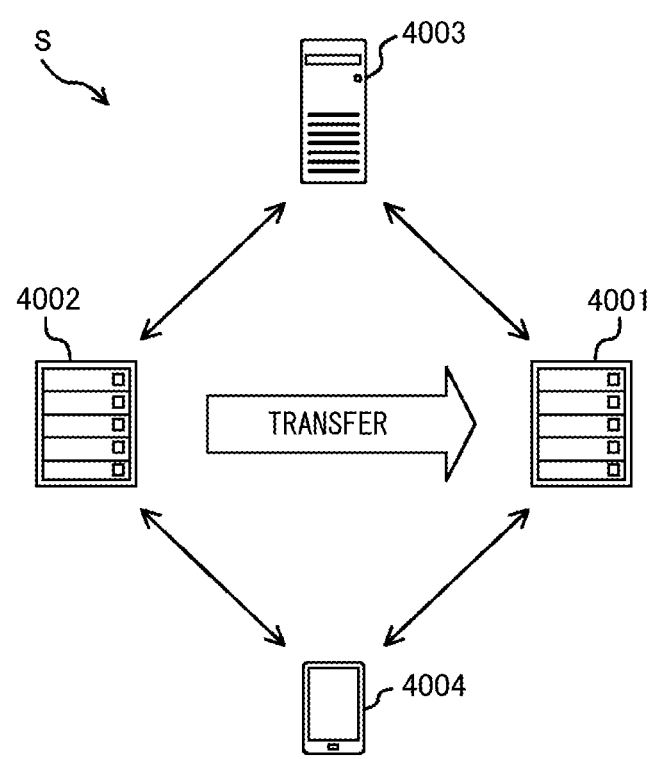
FIG. 24 is a schematic diagram of a communication system according to a fourth embodiment.

FIG. 24 is a schematic view of a communication system S according to the fourth embodiment. The communication system S includes a transfer destination server 4001, a transfer source server 4002, a company server 4003, and a user terminal 4004. The number of company servers 4003 and user terminals 4004 included in the communication system S is not limited. The communication system S may include devices such as other servers and other terminals.

The transfer destination server 4001 and the transfer source server 4002 are computers managed by respectively different carriers (for example, telecommunications carriers or the like). The transfer destination server 4001 and the transfer source server 4002 respectively provide, to the company server 4003 and the user terminal 4004, a messaging service (also called a message service or a messenger service) for exchanging messages by communication. The messaging service is, for example, an RCS (Rich Communication Service). The transfer destination server 4001 may be called a communication device, and the transfer source server 4002 may be called an external communication device.

The company server 4003 is a computer managed by a company. The company is an organization that is provided with messaging services. The company server 4003 communicates with the transfer destination server 4001 and the transfer source server 4002. The company server 4003 exchanges messages with the user terminal 4004 via the transfer destination server 4001 or the transfer source server 4002.

The user terminal 4004 is a communication terminal owned by a user. The user terminal 4004 is a mobile terminal such as, for example, a personal computer, a smartphone, or a tablet terminal. The user is a person to whom messaging services are provided. The user terminal 4004 communicates with the transfer destination server 4001 and the transfer source server 4002. The user terminal 4004 exchanges messages with the company server 4003 via the transfer destination server 4001 or the transfer source server 4002.

First, the user is subscribed to telecommunications services and the like with the first carrier managing the transfer source server 4002. The user performs user registration with the company managing the company server 4003 in a messaging service provided by the first carrier. The user registration may be performed for each company, or for each service provided by the company. The company server 4003 records identification information of the user who performed user registration in association with identification information of the transfer source server 4002. As a result thereof, the company server 4003 can use the identification information of the user and the identification information of the transfer source server 4002 to transmit messages to the user terminal 4004 via the transfer source server 4002.

In this situation, the user transfers (changes) the subscription to telecommunications services and the like from the first carrier to a second carrier managing the transfer destination server 4001. The subscription is transferred, for example, by using MNP (Mobile Number Portability). As a result thereof, the user can no longer be provided with the messaging service in the transfer source server 4002, but instead, can be provided with the messaging service in the transfer destination server 4001.

At this time, the transfer destination server 4001 receives the information associating the user with the company from the transfer source server 4002, and information for newly performing user registration in the transfer destination server 4001 is transmitted to the company server 4003. The company server 4003 records the identification information of the user who performed user registration in association with the identification information of the transfer destination server 4001. As a result thereof, the company server 4003 becomes capable of transmitting messages to the user terminal 4004 via the transfer destination server 4001.

In this communication system S, even if the user has transferred a subscription from the first carrier owning the transfer source server 4002 to the second carrier owning the transfer destination server 4001, the company server 4003 can continue to transmit messages to the user terminal 4004 without performing user registration with the company in the messaging service again. For this reason, the communication system S can reduce the burden of performing user registration with the company in the messaging service.

[Configuration of Communication System S]

Figure 25:
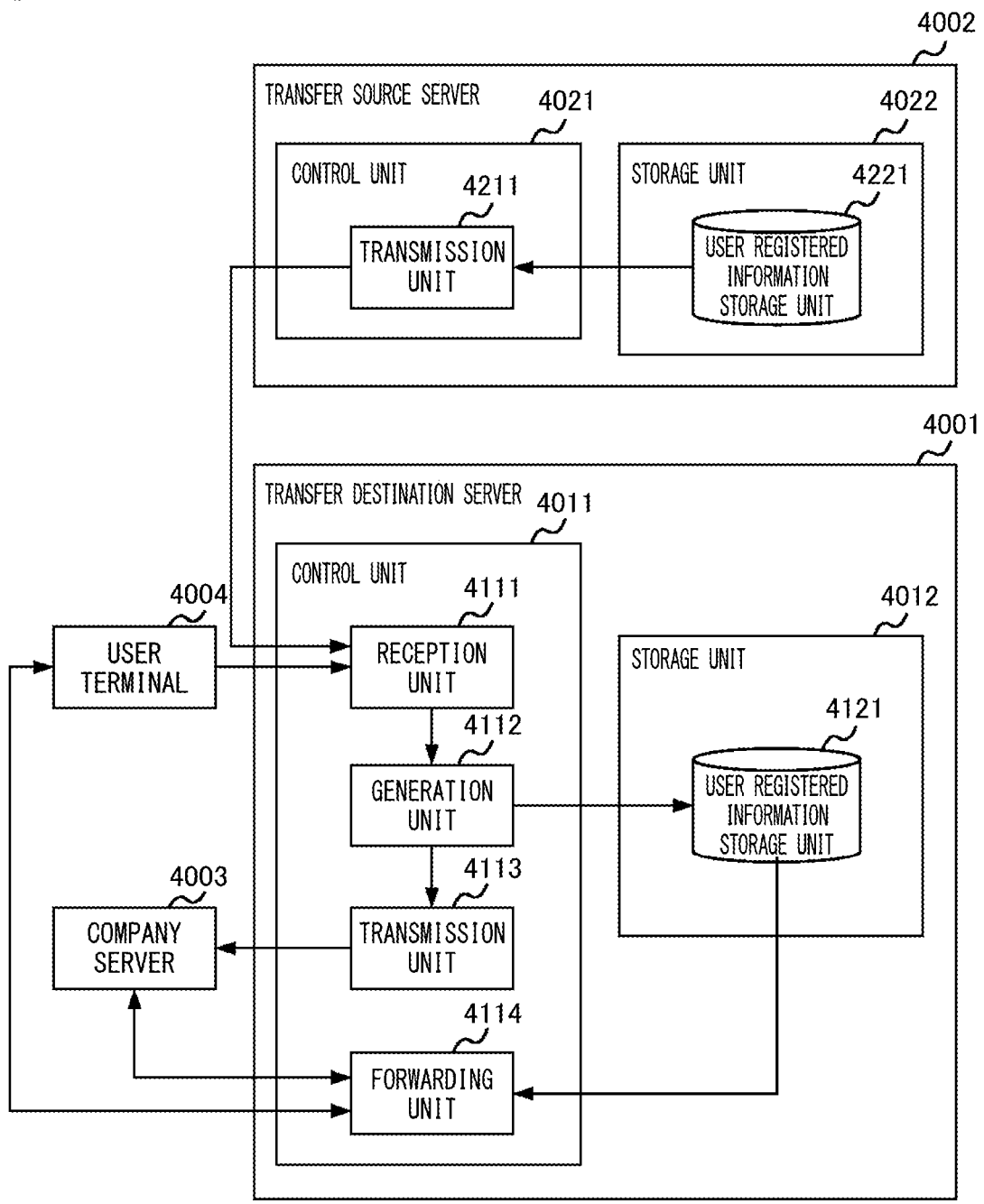
FIG. 25 is a block diagram of a transfer destination server and a transfer source server according to the fourth embodiment.

FIG. 25 is a block diagram of the transfer destination server 4001 and the transfer source server 4002 according to the fourth embodiment. In FIG. 25, the arrows indicate the main flow of data, though there may be data flow not indicated in FIG. 25. In FIG. 25, each block indicates a functional unit configuration rather than a hardware (device) unit configuration. For this reason, the blocks illustrated in FIG. 25 may be installed in a single device, or may be installed so as to be divided between multiple devices. The exchange of data between blocks may be performed by arbitrary means such as a data bus, a network, a portable storage medium, or the like.

The transfer destination server 4001 has a control unit 4011 and a storage unit 4012. The control unit 4011 has a reception unit 4111, a generation unit 4112, a transmission unit 4113, and a forwarding unit 4114. The storage unit 4012 has a user registration information storage unit 4121.

The storage unit 4012 is a storage medium including a ROM (Read-Only Memory), a RAM (Random Access Memory), a hard disk drive, and the like. A program to be executed by the control unit 4011 is pre-stored in the storage unit 4012. The storage unit 4012 may be provided outside the transfer destination server 4001, and in that case, may exchange data with the control unit 4011 via a network.

The user registration information storage unit 4121 stores user registration information indicating which company the users have registered with. The user registration information includes, for example, user IDs, company IDs, non-anonymous IDs, and anonymous IDs. Furthermore, the storage unit 4012 may store personal information of the users, such as telephone numbers, names, sex, residential addresses, and the like. The user registration information storage unit 4121 may be a storage area in the storage unit 4012, or may be a database formed in the storage unit 4012.

The control unit 4011 is, for example, a processor such as a CPU (Central Processing Unit), which functions as the reception unit 4111, the generation unit 4112, the transmission unit 4113, and the forwarding unit 4114 by executing a program stored in the storage unit 4012. At least some of the functions of the control unit 4011 may be performed by an electric circuit. Additionally, at least some of the functions of the control unit 4011 may be performed by a program executed via a network.

The transfer source server 4002 has a control unit 4021 and a storage unit 4022. The control unit 4021 has a transmission unit 211. The storage unit 4022 has a user registration information storage unit 4221.

The storage unit 4022 is a storage medium including a ROM, a RAM, a hard disk drive, or the like. A program to be executed by the control unit 4021 is pre-stored in the storage unit 4022. The storage unit 4022 may be provided outside the user terminal 4002, and in that case, may exchange data with the control unit 4021 via a network.

The user registration information storage unit 4221 stores user registration information indicating which company the users have registered with. The configuration of the user registration information stored by the user registration information storage unit 4221 is similar to that of the user registration information stored in the user registration information storage unit 4121 in the transfer destination server 4001. The user registration information storage unit 4221 may be a storage area in the storage unit 4022, or may be a database formed in the storage unit 4022.

The control unit 4021 is a processor such as, for example, a CPU, which functions as the transmission unit 211 by executing a program stored in the storage unit 4022. At least some of the functions of the control unit 4021 may be performed by an electric circuit. Additionally, at least some of the functions of the control unit 4021 may be performed by a program executed via a network.

Figure 26:
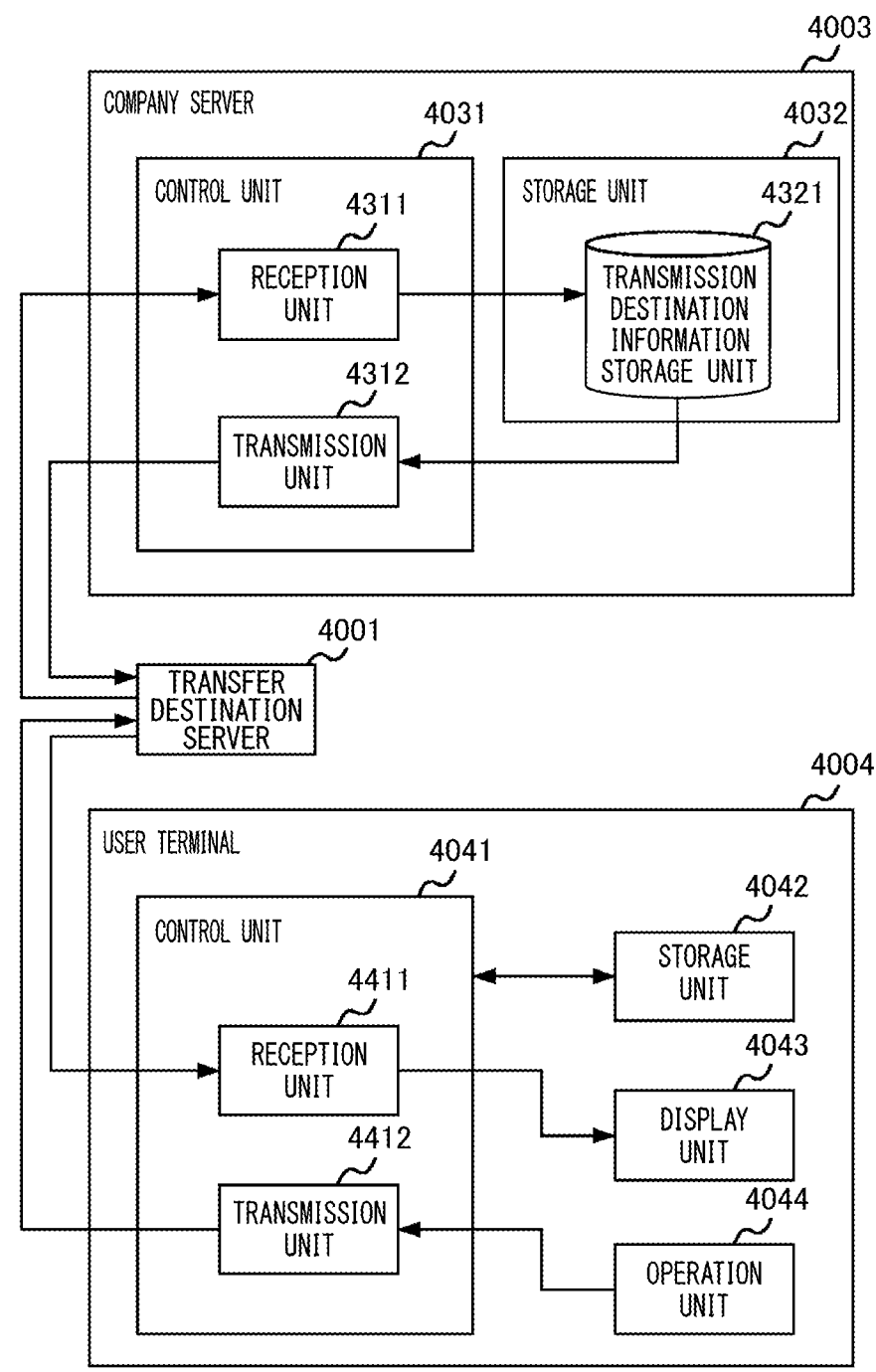
FIG. 26 is a block diagram of a company server and a user terminal according to the fourth embodiment.

FIG. 26 is a block diagram of a company server 4003 and a user terminal 4004 according to the fourth embodiment. In FIG. 26, the arrows indicate the main flow of data, though there may be data flow not indicated in FIG. 26. In FIG. 26, each block indicates a functional unit configuration rather than a hardware (device) unit configuration. For this reason, the blocks illustrated in FIG. 26 may be installed in a single device, or may be installed so as to be divided between multiple devices. The exchange of data between blocks may be performed by arbitrary means such as a data bus, a network, a portable storage medium, or the like.

The company server 4003 has a control unit 4031 and a storage unit 4032. The control unit 4031 has a reception unit 4311 and a transmission unit 4312. The storage unit 4032 has a transmission destination information storage unit 4321.

The storage unit 4032 is a storage medium including a ROM (Read-Only Memory), a RAM (Random Access Memory), a hard disk drive, and the like. A program to be executed by the control unit 4031 is pre-stored in the storage unit 4032. The storage unit 4032 may be provided outside the company server 4003, and in that case, may exchange data with the control unit 4031 via a network.

The transmission destination information storage unit 4321 stores transmission destination information indicating the transmission destinations of messages to users. The transmission destination information includes, for example, communication device IDs, non-anonymous IDs and anonymous IDs. The transmission destination information storage unit 4321 may be a storage area in the storage unit 4032, or may be a database formed in the storage unit 4032.

The control unit 4031 is, for example, a processor such as a CPU (Central Processing Unit), which functions as the reception unit 4311 and the transmission unit 4312 by executing a program stored in the storage unit 4032. At least some of the functions of the control unit 4031 may be performed by an electric circuit. Additionally, at least some of the functions of the control unit 4031 may be performed by a program executed via a network.

The user terminal 4004 has a control unit 4041, a storage unit 4042, a display unit 4043, and an operation unit 4044. The control unit 4041 has a reception unit 4411 and a transmission unit 4412.

The display unit 4043 includes a display device that can display information, such as a liquid crystal display. The operation unit 4044 includes an operation device, such as a keyboard or a mouse, which can input information by means of user operations. The display unit 4043 and the operation unit 4044 may be formed integrally by using, as the display unit 4043, a touch screen that can detect a location touched by the user.

The storage unit 4042 is a storage medium including a ROM, a RAM, a hard disk drive, or the like. A program to be executed by the control unit 4041 is pre-stored in the storage unit 4042. The storage unit 4042 may be provided outside the user terminal 4004, and in that case, may exchange data with the control unit 4041 via a network.

The control unit 4041 is a processor such as, for example, a CPU, which functions as the reception unit 4411 and the transmission unit 4412 by executing a program stored in the storage unit 4042. At least some of the functions of the control unit 4041 may be performed by an electric circuit. Additionally, at least some of the functions of the control unit 4041 may be performed by a program executed via a network.

The transfer destination server 4001, the transfer source server 4002, the company server 4003, and the user terminal 4004 according to the present embodiment are not limited to the specific configurations illustrated in FIG. 25 and FIG. 26. The transfer destination server 4001, the transfer source server 4002, the company server 4003, and the user terminal 4004 are each not limited to being a single device, and may be formed by two or more physically separated devices being connected by cable or wirelessly.

[Description of Communication Method]

Figure 27:
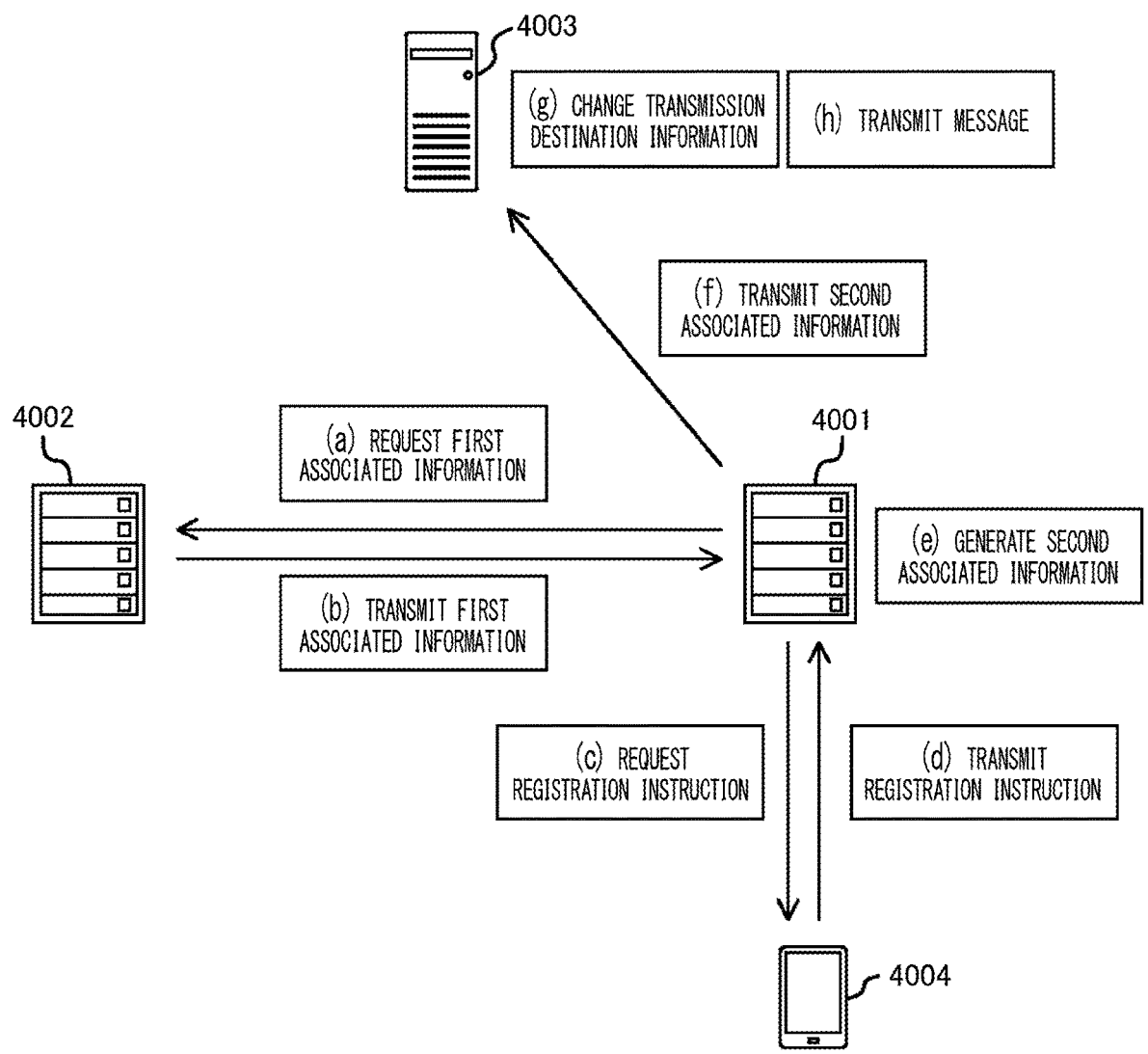
FIG. 27 is a schematic diagram of a communication method performed by the communication system according to the fourth embodiment.

FIG. 27 is a schematic diagram of the communication method performed by the communication system S according to the fourth embodiment. User registration information indicating which company a user has registered with is pre-stored in a registration information storage unit 4221 in the transfer source server 4002.

Figures 28A, 28B, 28C, 29:
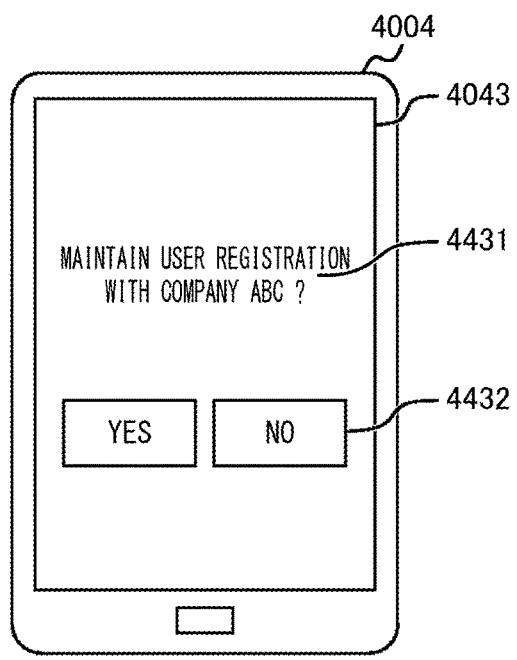
FIG. 28A is a first schematic diagram of user registration information and first associated information.
FIG. 28B is a second schematic diagram of user registration information and first associated information.
FIG. 28C is a third schematic diagram of user registration information and first associated information.
FIG. 29 is a front view of a user terminal displaying a screen for receiving an input regarding whether or not to maintain user registration.

FIG. 28A is a schematic diagram of user registration information D1. The user registration information D1 includes, associated with each other, user IDs, which are user identification information managed in a carrier, a company ID, which is company identification information, and a non-anonymous ID or an anonymous ID, which is user identification information of which the company is notified. The user ID is identification information that is assigned to each user in order to manage the users subscribed with the carrier, represented by arbitrary text. The user IDs are different for each carrier managing a user. The company ID is identification information that is assigned to the company, represented by arbitrary text. The company ID may be assigned to each company, or may be assigned to each service provided by the company. The company ID may be the same across multiple carriers providing messaging services to the company. Alternatively, the transfer destination server 4001 and the transfer source server 2 may identify a company indicated by the company ID by pre-storing a database in which the company Is that are different for each carrier are linked.

The non-anonymous ID (non-anonymous identification information) is identification information that is assigned to a user, represented by arbitrary text. The non-anonymous ID is, for example, the telephone number of the user. A user ID may be used as the non-anonymous ID. The non-anonymous ID is identification information that is unique to the user (user ID). In other words, the non-anonymous ID can, by itself, be used to uniquely identify a user.

The anonymous ID (anonymous identification information) is identification information that is assigned to a user, represented by arbitrary text. The anonymous ID is identification information that is unique to the combination of the user (user ID) and the company (company ID). For this reason, even if a non-anonymous ID of which a company is notified is acquired by another company, the other company cannot identify the user to which the non-anonymous ID corresponds. For this reason, the anonymity of the user is raised by using a non-anonymous ID as the user identification information.

The user performs user registration with the company by using either one of the non-anonymous ID and the anonymous ID. Which of the non-anonymous ID and the anonymous ID is to be used at the time of user registration may be selected by the user, or may be designated by the company.

In FIG. 28A, the user registration information D1 is represented by a table with text strings for the purpose of visibility. However, the data may be recorded in any form, and may, for example, be any of text string data, numerical data, and binary data. The user registration information D1 may be recorded as a database, or may be recorded as a list in which the data is listed.

Returning to FIG. 27, in the case in which a user has transferred a subscription from the first carrier owning the transfer source server 4002 to the second carrier owning the transfer destination server 4001, the transfer destination server 4001 transmits a request for first associated data to the transfer source server 4002 (a). The first associated information is information in which user identification information is associated with company identification information.

Specifically, the first associated information includes the company IDs of companies with which the user who transferred the subscription performed user registration in the transfer source server 4002, and a non-anonymous ID or an anonymous ID as identification information for the user. Furthermore, if a company provides users with multiple services (for example, services for providing various types of insurance, membership services of multiple types such as premium memberships and standard memberships, and the like), the first associated information may include identification information for identifying the services.

If the transfer source server 4002 has received a request for first associated information from the transfer destination server 4001, then the transmission unit 211 in the transmission source server 4002 transmits, to the transfer destination server 4001, the first associated information in which one of the non-anonymous ID and the anonymous ID is associated with company IDs in accordance with which of the non-anonymous ID and the anonymous ID the user used to perform user registration in the transfer source server 4002 (b).

If the user used an anonymous ID in the transfer source server 4002, then the transfer source server 4002 may query the user terminal 4004 regarding whether or not a non-anonymous ID may be transmitted to the transfer destination server 4001. The user terminal 4004 transmits information indicating whether or not the non-anonymous ID may be transmitted to the transfer source server 4002 based on an operation (pressing a button or the like) by the user. If the transfer source server 4002 receives, from the user terminal 4004, information indicating that the non-anonymous ID may be transmitted, then the transmission unit 211 transmits the non-anonymous ID, together with the first associated information, to the transfer destination server 4001. Alternatively, the user terminal 4004 may transmit its own non-anonymous ID to the transfer destination server 4001. As a result thereof, the user can, by operations of the user, select whether or not to disclose the non-anonymous ID to the transfer destination server 4001.

Additionally, in the case in which the user has performed user registration with multiple companies in the transfer source server 4002, if the user has performed user registration using a non-anonymous ID for at least one company, then the transfer destination server 4001 does not need to query the transfer source server 4002 or the user terminal 4004 regarding the non-anonymous ID.

FIG. 28B is a schematic diagram of first associated information D2 including a non-anonymous ID. FIG. 28C is a schematic diagram of first associated information D2 including an anonymous ID. The first associated information D2 shown in FIG. 28B includes a company ID and the non-anonymous ID, which are associated with each other. The first associated information D2 show in FIG. 28C includes a company ID and the anonymous ID, which are associated with each other. It is possible to determine which of the non-anonymous or the anonymous ID was used for user registration by the user in the transfer source server 4002 based on which of the non-anonymous ID and the anonymous ID is set in the first associated information D2.

In FIG. 28B and FIG. 28C, the first associated information D2 is represented by a table with text strings for the purpose of visibility. However, the data may be recorded in any form, and may, for example, be any of text string data, numerical data, and binary data. The first associated information D2 may be recorded as a database, or may be recorded as a list in which the data is listed.

Returning to FIG. 27, the reception unit 4111 in the transfer destination server 4001 receives the first associated information transmitted by the transfer source server 4002. If the reception unit 4111 has received the first associated information from the transfer source server 4002, then the transfer destination server 4001 transmits a registration instruction request to the user terminal 4004 (c). At this time, the transfer destination server 4001 may transmit the registration instruction request with the non-anonymous ID indicated by the first associated information as the address, or may transmit the registration instruction request with the non-anonymous ID received together with the first associated information as the address. The registration instruction is information indicating whether or not the user will maintain user registration with the company having the company ID indicated by the first associated information. The registration instruction request includes the company ID indicated by the first associated information.

The reception unit 4411 in the user terminal 4004 receives the registration instruction request transmitted by the transfer destination server 4001. If the reception unit 4411 has received a registration instruction request, then the user terminal 4004 displays, on the display unit 4043, a screen for receiving an input regarding whether or not to maintain user registration. FIG. 29 is a front view of the user terminal 4004 displaying a screen for receiving an input regarding whether or not to maintain user registration.

The screen for receiving the input regarding whether or not to maintain user registration includes information 431 representing the company having the company ID indicated by the registration instruction request, and a button 432 for inputting the registration instruction. The button 432 is a virtual button (icon) that can be pressed by the user. The user uses the operation unit 4044 of the user terminal 4004 to press the button 432 in accordance with whether or not to maintain user registration.

The screen for receiving the input regarding whether or not to maintain user registration is not limited to being used for maintaining user registration, and may receive inputs regarding instruction types such as those for changing, cancelling, or temporarily suspending user registration. In this case, buttons 432 are provided for each instruction type, such as to maintain, change, cancel, and temporarily suspend. Each button 432 is associated with an access destination such as a URL (Uniform Resource Locator), and when a user presses one of the buttons 432, the user terminal 4004 may display a prescribed website that is the access destination associated with the pressed button 432.

There is no limitation to a separate screen as in FIG. 29, and the user terminal 4004 may receive the input regarding whether or not to maintain user registration within a screen for exchanging messages between the user and the company within the messaging service.

Returning to FIG. 27, based on an operation performed on the operation unit 4044, the transmission unit 4412 of the user terminal 4004 transmits, to the transfer destination server 4001, a registration instruction indicating whether or not the user is to maintain user registration (or an instruction type) with the company having the company ID indicated by the registration instruction request (d). The reception unit 4111 of the transfer destination server 4001 receives the registration instruction transmitted by the user terminal 4004. Thus, by receiving a registration instruction from the user, the transfer destination server 4001 can confirm whether or not the user has the intention to maintain user registration with the company.

With the condition that the registration instruction received by the reception unit 4111 indicates that user registration with the company is to be maintained, the generation unit 4112 of the transfer destination server 4001 generates second associated information based on the first associated information received by the reception unit 4111 (e). The second associated information is information in which user identification information is associated with identification information for the transfer destination server 4001. Specifically, the second associated information includes a communication device ID, which is identification information for the transfer destination server 4001 to which the user has transferred the subscription, and a non-anonymous ID or an anonymous ID as identification information for the user. Furthermore, the second associated information may include an instruction type, such as to maintain, change, cancel, or temporarily suspend, indicated by the registration instruction received by the reception unit 4111.

The communication device ID is identification information for identifying the transfer destination server 4001, represented by arbitrary text. The communication device ID may be identification information assigned to each communication device (server), or may be identification information assigned to each carrier managing the transfer destination server 4001. Anonymous Is include an old anonymous ID that was previously assigned to the user by the transfer source server 4002, and a new anonymous ID newly assigned to the user by the transfer destination server 4001.

The generation unit 4112 determines, based on the first associated information received by the reception unit 4111, which of a non-anonymous ID and an anonymous ID the user used to perform user registration in the transfer source server 4002. If the user used a non-anonymous ID in the transfer source server 4002, then the generation unit 4112 generates second associated information in which a non-anonymous ID is associated with the communication device ID. If the user used an anonymous ID in the transfer source server 4002, then the generation unit 4112 assigns the user a new anonymous ID to be newly used in the transfer destination server 4001, and generates second associated information in which the new anonymous ID and the old anonymous ID that was previously assigned to the user in the transfer source server 4002 are associated with the communication device ID.

FIG. 30A is a schematic diagram of second associated information D3 including a non-anonymous ID. FIG. 30B is a schematic diagram of second associated information D3 including an anonymous ID. The second associated information D3 indicated in FIG. 30A includes a communication device ID and a non-anonymous ID, which are associated with each other. The second associated information D3 indicated in FIG. 30B includes a company ID, an old anonymous ID, and a new anonymous ID, which are associated with each other. The old anonymous ID is used by the company to identify the user for whom the transmission destination information is to be changed. It is possible to determine which of the non-anonymous ID and the anonymous ID was used to perform user registration in the transfer destination server 4001 based on which of the non-anonymous ID and the anonymous ID is set in the second associated information D3.

In FIG. 30A and FIG. 30B, the second associated information D3 is represented by a table with text strings for the purpose of visibility. However, the data may be recorded in any form, and may, for example, be any of text string data, numerical data, and binary data. The second associated information D3 may be recorded as a database, or may be recorded as a list in which the data is listed.

Furthermore, based on the first associated information received by the reception unit 4111, the generation unit 4112 makes the user registration information storage unit 4121 store user registration information in which a user ID, which is used by the carrier owning the transfer destination server 4001 to manage the user, is associated with a company ID and a non-anonymous ID or an anonymous ID. The configuration of the user registration information stored by the user registration information storage unit 4121 is similar to the user registration information in the transfer source server 4002 indicated in FIG. 28A.

Returning to FIG. 27, the transmission unit 4113 in the transfer destination server 4001 transmits the second associated information generated by the generation unit 4112 to the company server 4003 (f). In this case, the transfer destination server 4001 may also query the user terminal 404 regarding whether or not the user registration information stored in the transfer source server 4002 should be deleted. Based on an operation (such as pressing a button) by the user, the user terminal 4004 transmits, to the transfer destination server 4001, information indicating whether or not to delete the user registration information. If the transfer destination server 4001 has received information from the user terminal 4004 indicating that the user registration information is to be deleted, then the transmission unit 4113 transmits, to the transfer source server 4002, a deletion request indicating the identification information of the user. The transfer source server 4002 deletes the user registration information stored in the user registration information storage unit 4221 in accordance with the deletion request. The transfer destination server 4001 may also transmit, to the user terminal 4004, a deletion result of the user registration information in the transfer source server 4002. As a result thereof, the user can select whether or not to delete the user registration information in the transfer source server 4002.

The reception unit 4311 in the company server 4003 receives the second associated information transmitted by the transfer destination server 4001. Based on the received second associated information, the reception unit 4311 changes the transmission destination information stored in the transmission destination information storage unit 4321 (g). The transmission destination information is information indicating the transmission destination when the company server 4003 is to transmit messages to the user terminal 4004.

Specifically, based on the received second associated information, the reception unit 4311 determines which of the non-anonymous ID and the anonymous ID the user is to use to perform user registration in the transfer destination server 4001. If the user is to use the non-anonymous ID in the transfer destination server 4001, then the reception unit 4311 extracts the transmission destination information associated with the non-anonymous ID indicated by the second associated information in the transmission destination information storage unit 4321, and changes the communication device ID of the extracted transmission destination information to the communication device ID indicated by the second associated information. Alternatively, the reception unit 4311 may delete, from the transmission destination information storage unit 4321, the transmission destination information associated with the non-anonymous ID indicated by the second associated information, and newly add, to the transmission destination information storage unit 4321, transmission destination information indicating the non-anonymous ID and the communication device ID indicated by the second associated information.

If the user is to use the anonymous ID in the transfer destination server 4001, then the reception unit 4311 extracts the transmission destination information associated with the old anonymous ID indicated by the second associated information in the transmission destination information storage unit 4321 and changes the communication device ID and the anonymous ID in the extracted transmission destination information to the communication device ID and the new anonymous ID indicated by the second associated information. Alternatively, the reception unit 4311 may delete, from the transmission destination information storage unit 4321, the transmission destination information associated with the old anonymous ID indicated by the second associated information, and newly add, to the transmission destination information storage unit 4321, transmission destination information indicating the new anonymous ID and the communication device ID indicated by the second associated information.

As a result thereof, the company server 4003 changes the transmission destination of messages to the user from the transfer source server 4002 to the transfer destination server 4001, and can transmit messages to the user, who has transferred from the first carrier owning the transfer source server 4002 to the second carrier owning the transfer destination server 4001.

If the second associated information received by the reception unit 4311 includes an instruction type, such as to maintain, change, cancel, or temporarily suspend, the company server 4003 may query the user terminal 4004 regarding whether or not the process indicated by the instruction type is to be executed. Based on an operation (such as pressing a button) by the user, the user terminal 4004 transmits, to the company server 4003, information indicating whether or not the process indicated by the instruction type is to be executed. If information indicating that the process indicated by the instruction type is to be executed is received from the user terminal 4004, then the company server 4003 executes the process, such as to maintain, change, cancel, or temporarily suspend, indicated by the instruction type. As a result thereof, the company can reconfirm the intentions of the user.

FIG. 31 is a schematic diagram of transmission destination information D4. The transmission destination information D4 includes a communication device ID, and a non-anonymous ID or an anonymous ID, which are associated with each other. Based on the transmission destination information stored in the transmission destination information storage unit 4321, messages are transmitted, via the communication device (server) corresponding to the communication device ID, with the non-anonymous ID or the anonymous ID as the address of the user.

In FIG. 31, the transmission destination information D4 is represented by a table with text strings for the purpose of visibility. However, the data may be recorded in any form, and may, for example, be any of text string data, numerical data, and binary data. The transmission destination information D4 may be recorded as a database, or may be recorded as a list in which the data is listed.

Returning to FIG. 27, when a company sends messages to a user, the transmission unit 4312 in the company server 4003 acquires, from the transmission destination information storage unit 4321, transmission destination information for the user to whom the messages are to be transmitted. The transmission unit 4312 transmits, to the communication device (in this case, the transfer destination server 4001)

corresponding to the communication device ID indicated by the acquired transmission destination information, messages addressed to the non-anonymous ID or the anonymous ID indicated by the acquired transmission destination information (h).

After the transmission unit 4113 has transmitted the second associated information to the company server 4003, the forwarding unit 4114 in the transfer destination server 4001 forwards messages transmitted by the company server 4003 to the user terminal 4004 corresponding to the non-anonymous ID or the anonymous ID indicated by the messages. At this time, the non-anonymous ID or the anonymous ID of the user is preset in the user terminal 4004, and the transfer destination server 4001 can identify the user terminal 4004 corresponding to the non-anonymous ID or the anonymous ID. The reception unit 4411 of the user terminal 4004 receives the messages forwarded by the transfer destination server 4001, and displays the messages on the display unit 4043. The forwarding unit 4114 may transfer messages transmitted by the user terminal 4004 to company servers corresponding to the company IDs indicated by the messages.

[Sequence of Communication Method]

Figure 32:
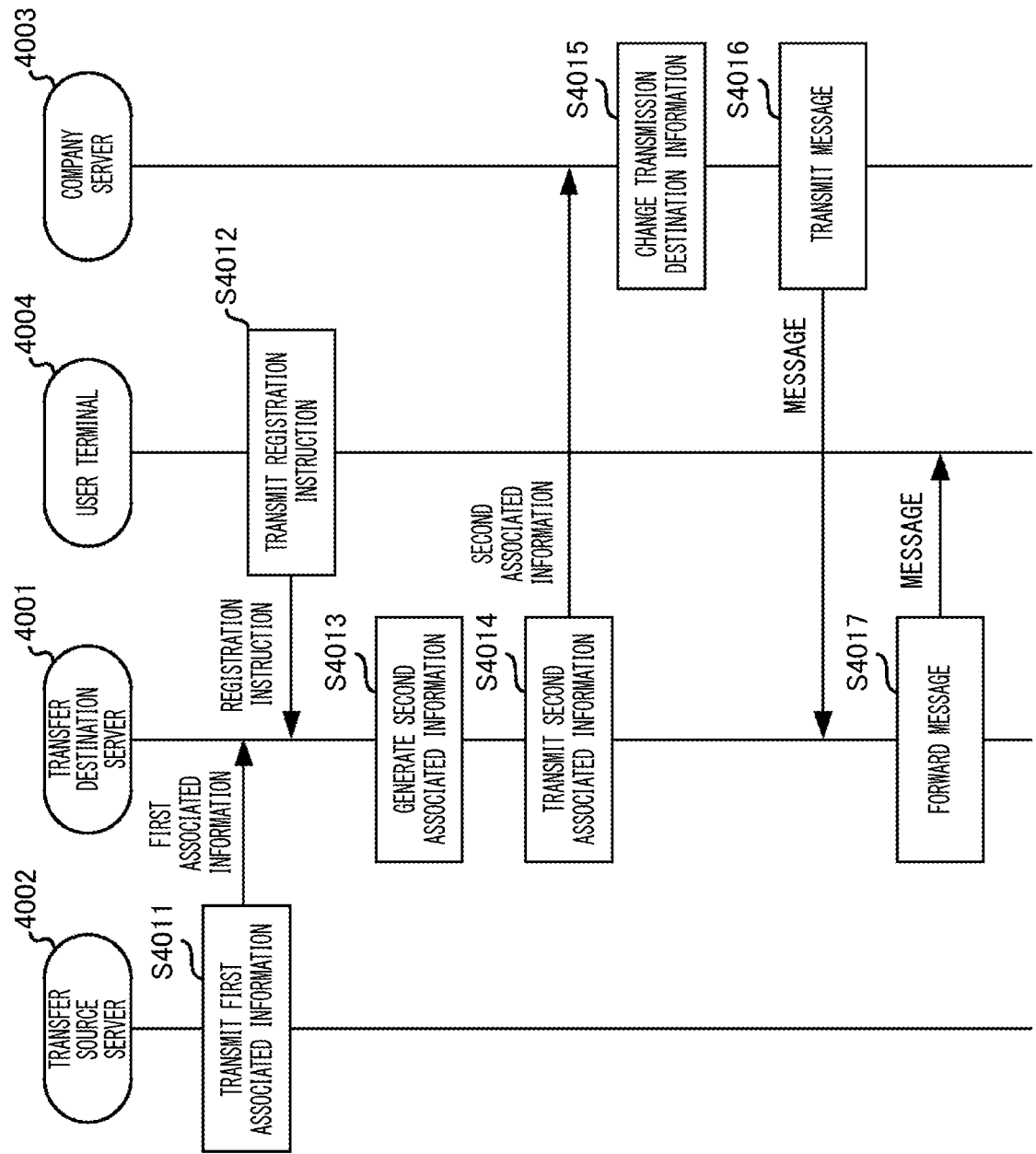
FIG. 32 is a sequence diagram of the communication method performed by the communication system according to the fourth embodiment.

FIG. 32 is a sequence diagram of the communication method performed by the communication system S according to the fourth embodiment. If the user has transferred a subscription for telecommunications services or the like from a first carrier owning the transfer source server 4002 to a second carrier owning the transfer destination server 4001, the transfer destination server 4001 transmits a request for first associated information to the transfer source server 4002. If the transfer source server 4002 has received a request for first associated information from the transfer destination server 4001, then the transmission unit 211 in the transfer source server 4002 transmits, to the transfer destination server 4001, first associated information in which user identification information is associated with company identification information (S4011). The reception unit 411 in the transfer destination server 4001 receives the first associated information transmitted by the transfer source server 4002.

If the reception unit 4111 has received the first associated information from the transfer source server 4002, then the transfer destination server 4001 transmits a request for a registration instruction to the user terminal 4004. The reception unit 4411 in the user terminal 4004 receives the request for a registration instruction transmitted by the transfer destination server 4001. If the reception unit 4411 has received the request for a registration instruction, then the user terminal 4004 receives an input regarding whether or not to maintain user registration.

Based on an operation performed on the operation unit 4044, the transmission unit 4412 in the user terminal 4004 transmits, to the transfer destination server 4001, a registration instruction indicating whether or not the user is to maintain user registration with the company having the company ID indicated in the request for the registration instruction (S4012). The reception unit 4111 in the transfer destination server 4001 receives the registration instruction transmitted by the user terminal 4004.

If the registration instruction received by the reception unit 4111 indicates that user registration with the company is to be maintained, then the generation unit 4112 in the transfer destination server 4001 generates second associated information based on the first associated information received by the reception unit 4111 (S4013). At this time, the generation unit 4112 stores user registration information in the user registration information storage unit 4121 based on the first associated information received by the reception unit 4111.

The reception unit 4113 in the transfer destination server 4001 transmits, to the company server 4003, the second associated information generated by the generation unit 4112 (S4014). The reception unit 4311 in the company server 4003 receives the second associated information transmitted by the transfer destination server 4001.

The reception unit 4311 changes the transmission destination information stored in the transmission destination information storage unit 4321 based on the received second associated information (S4015). As a result thereof, the company server 4003 changes the transmission destination of messages to the user from the transfer source server 4002 to the transfer destination server 4001.

When the company is to send a message to the user, the transmission unit 4312 in the company server 4003 acquires the transmission destination information of the user to whom the message is to be transmitted tom the transmission destination information storage unit 4321. The transmission unit 4312 transmits the message, addressed to the non-anonymous ID or the anonymous ID indicated by the acquired transmission destination information, to the communication device (in this case, the transfer destination server 4001) corresponding to the communication device ID indicated by the acquired transmission destination information (S4016).

The forwarding unit 4114 in the transfer destination server 4001 forwards the message transmitted by the company server 4003 to the user terminal 4004 corresponding to the non-anonymous ID or the anonymous ID indicated by the message (S4017). The reception unit 4411 in the user terminal 4004 receives the message forwarded by the transfer destination server 4001 and displays the message on the display unit 4043.

First Modified Example of Fourth Embodiment

In the present modified example, the transfer destination server 4001 receives, from the user, a selection regarding which of the non-anonymous ID and the anonymous ID is to be used. In the transfer destination server 4001 according to the present modified example, the generation unit 4112 determines, based on the first associated information received by the reception unit 4111, which of the non-anonymous ID and the anonymous ID the user used to perform user registration in the transfer source server 4002. The transfer destination server 4001 transmits, to the user terminal 4004, a request to select which of the non-anonymous ID and the anonymous ID is to be used.

The reception unit 4411 in the user terminal 4004 receives the request for selection transmitted by the transfer destination server 4001. If the reception unit 4411 has received the request for selection, then the user terminal 4004 displays, on the display unit 4043, a screen for receiving an input regarding which of the non-anonymous ID and the anonymous ID is to be used.

Figure 33:
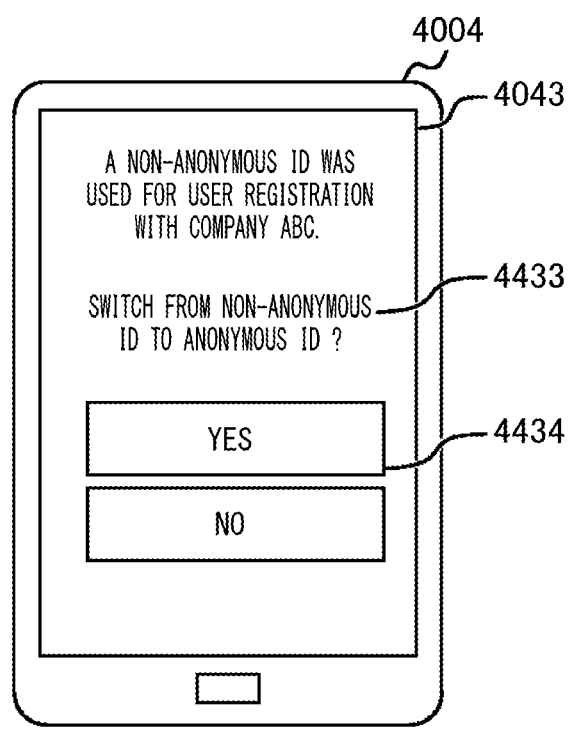
FIG. 33 is a front view of a user terminal displaying a screen for receiving an input regarding which of a non-anonymous ID and an anonymous ID is to be used.

FIG. 33 is a front view of a user terminal 4004 displaying a screen for receiving an input regarding which of the non-anonymous ID and the anonymous ID is to be used. The screen for receiving the input regarding which of the non-anonymous ID and the anonymous ID is to be used includes information 433 representing whether to switch between the non-anonymous ID and the anonymous ID, and buttons 4434 for inputting the selection. The buttons 4434 are virtual buttons (icons) that can be pressed by the user. The user uses the operation unit 4044 of the user terminal 4004 to press one of the buttons 4434 in accordance with the selection regarding which of the non-anonymous ID and the anonymous ID is to be used.

If the user used the non-anonymous ID in the transfer source server 4002, then for example, the information 433 represents a switch from the non-anonymous ID to the anonymous ID, and the buttons 4434 receive a selection as to whether to switch from the non-anonymous ID to the anonymous ID. If the user used the anonymous ID in the transfer source server 4002, then for example, the information 433 represents a switch from the anonymous ID to the non-anonymous ID, and the buttons 4434 receive a selection as to whether to switch from the anonymous ID to the non-anonymous ID.

Based on an operation performed on the operation unit 4044, the transmission unit 4412 in the user terminal 4004 transmits, to the transfer destination server 4001, the selection regarding which of the non-anonymous D and the anonymous ID is to be used. The reception unit 4111 in the transfer destination server 4001 receives, from the user terminal 4004, the selection regarding which of the non-anonymous ID and the anonymous ID is to be used. If the selection received by the reception unit 4111 indicates that the non-anonymous ID is to be used, then the generation unit 4112 generates second associated information in which the non-anonymous ID is associated with the communication device ID. If the selection received by the reception unit 4111 indicates that the anonymous ID is to be used, then the generation unit 4112 assigns the user a new anonymous ID to be newly used in the transfer destination server 4001, and generates second associated information in which the new anonymous ID and the old anonymous ID that was assigned to the user in the transfer source server 4002 are associated with the communication device ID.

In the screen in FIG. 33, the user terminal 4004 receives an input regarding which of the non-anonymous ID and the anonymous ID is to be used, separately for a single company. However, the names of multiple companies may be displayed in a list, and inputs regarding which of the non-anonymous ID and the anonymous ID is to be used may be received together for multiple companies. Furthermore, the user terminal 4004 may receive inputs regarding whether or not to maintain user registration and inputs regarding which of the non-anonymous ID and the anonymous ID is to be used together for multiple companies. Additionally, the user terminal 4004 may receive a single input regarding which of the non-anonymous ID and the anonymous ID is to be used for all companies with which the user is to perform user registration in the transfer destination server 4001.

There is no limitation to a separate screen as in FIG. 33, and the user terminal 4004 may receive the input regarding which of the non-anonymous ID and the anonymous ID is to be used within a screen for exchanging messages between the user and the company within the messaging service.

Thus, the communication system S according to the present modified example can switch between which of the non-anonymous ID and the anonymous ID is to be used in the transfer destination server 4001 in accordance with selection by the user.

Second Modified Example of Fourth Embodiment

In the present modified example, the transfer destination server 4001 suggests, to the user, companies or services different from the companies or services for which the user performed user registration in the transfer source server 4002. In the transfer destination server 4001, the generation unit 4112 acquires, based on the first associated information received by the reception unit 4111, the companies with which the user performed user registration in the transfer source server 4002. Additionally, the generation unit 4112 acquires one or more companies for which messaging services are provided in the transfer destination server 4001.

Furthermore, if there is a company with which the user performed user registration in the transfer source server 4002 (i.e., a company indicated by the first associated information) but for which the transfer destination server 4001 does not provide a messaging service, then the generation unit 4112 identifies, as a suggested company, another company in the same field of business as said company and for which a messaging service is provided by the transfer destination server 4001. The transfer destination server 4001 transmits, to the user terminal 4004, a request for registration instructions to the suggested company.

Figure 34A:
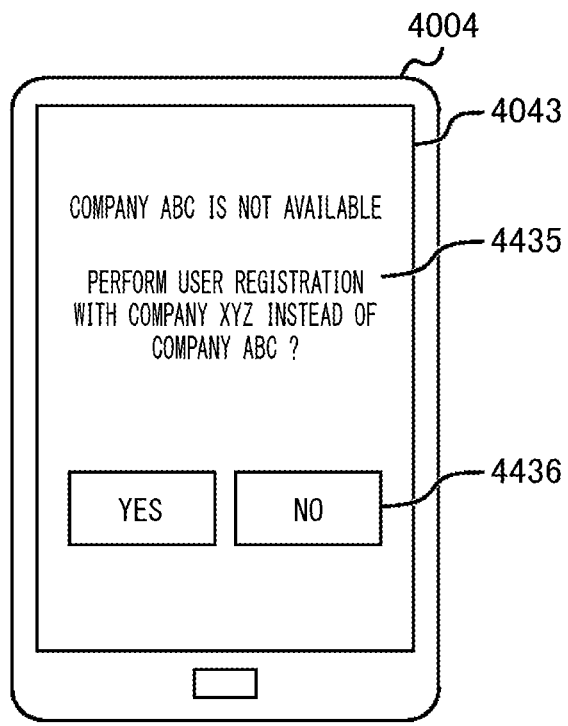
FIG. 34A is a first front view of the user terminal displaying a screen for receiving an input regarding whether or not to perform user registration for a suggested company or a suggested service.

The reception unit 4411 in the user terminal 4004 receives the registration instruction request transmitted by the transfer destination server 4001. If the reception unit 4411 has received a registration instruction request, then the user terminal 4004 displays, on the display unit 4043, a screen for receiving an input regarding whether or not to perform user registration with the suggested company. FIG. 34A is a front view of a user terminal 4004 displaying a screen for receiving an input regarding whether or not to perform user registration with the suggested company.

The screen for receiving the input regarding whether or not to perform user registration with the suggested company includes information 4435 representing the suggested company indicated by the registration instruction request, and buttons 4436 for inputting registration instructions. The buttons 4436 are virtual buttons (icons) that can be pressed by the user. The user uses the operation unit 4044 of the user terminal 4004 to press one of the buttons 4436 in accordance with whether or not user registration is to be performed with the suggested company.

Based on an operation performed on the operation unit 4044, the transmission unit 4412 in the user terminal 4004 transmits, to the transfer destination server 4001, the registration instruction regarding whether or not the user is to perform user registration with the suggested company indicated by the registration instruction request. The reception unit 4111 in the transfer destination server 4001 receives the registration request transmitted by the user terminal 4004.

If the registration instruction received by the reception unit 4111 indicates that user registration is to be performed with the suggested company, then the generation unit 4112 in the transfer destination server 4001 generates second associated information and the transmission unit 4113 transmits the second associated information to the suggested company.

As a result thereof, even if the transfer destination server 4001 does not provide a messaging service to a company with which the user performed user registration in the transfer source server 4002, the transfer destination server 4001 can suggest another company in the same field of business to the user, thereby increasing the convenience for the user.

Additionally, if the transfer destination server 4001 does not provide a messaging service to a company with which the user performed user registration in the transfer source server 4002, the transfer destination server 4001 may also transmit, to the user terminal 4004, a message to that effect together with information relating to said company. The information relating to said company includes, for example, user identification information in said company or contact information (such as a URL) for said company. Furthermore, the user terminal 4004 displays the information relating to said company on the display unit 4043.

Additionally, the generation unit 4112 identifies, as suggested companies, companies for which the transfer source server 4002 does not provide a messaging service, but for which the transfer destination server 4001 provides a messaging service. Additionally, the generation unit 4112 identifies, as suggested services, services that are not provided by companies indicated by the first associated information in the transfer source server 4002, but that are provided by said companies in the transfer destination server 4001. The transfer destination server 4001 transmits, to the user terminal 4004, requests for registration instructions for suggested companies or suggested services.

Figure 34B:
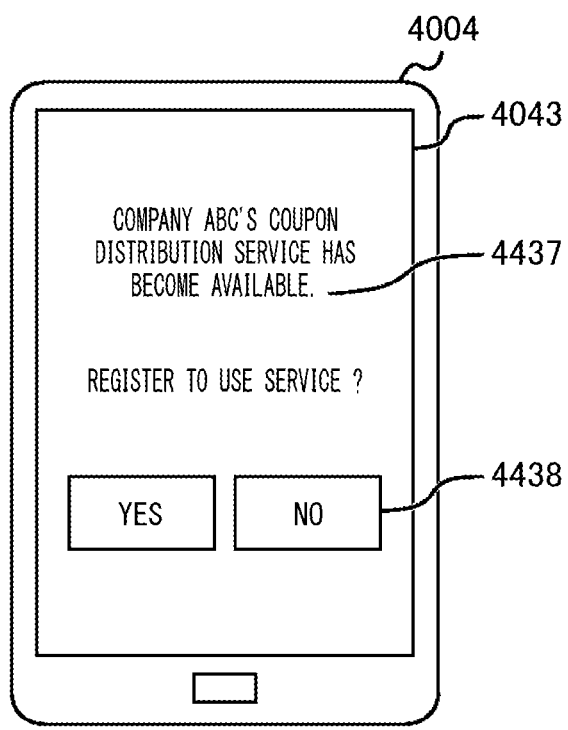
FIG. 34B is a second front view of the user terminal displaying a screen for receiving an input regarding whether or not to perform user registration for a suggested company or a suggested service.

The reception unit 4411 in the user terminal 4004 receives registration instruction requests transmitted by the transfer destination server 4001. If the reception unit 4411 has received a registration instruction request, then the user terminal 4004 displays, on the display unit 4043, a screen for receiving an input regarding whether or not user registration is to be performed for a suggested company or a suggested service. FIG. 34B is a front view of a user terminal 4004 displaying a screen for receiving an input regarding whether or not to perform user registration for a suggested company or a suggested service.

The screen for receiving an input regarding whether or not to perform user registration for a suggested company or a suggested service includes information 4437 representing the suggested company or the suggested service indicated by the registration instruction request, and buttons 4438 for inputting the registration instruction. The buttons 4438 are virtual buttons (icons) that can be pressed by the user. The user uses the operation unit 4044 in the user terminal 4004 to press one of the buttons 4438 in accordance with whether or not user registration is to be performed for the suggested company or the suggested service.

Based on an operation performed on the operation unit 4044, the transmission unit 4412 of the user terminal 4004 transmits, to the transfer destination server 4001, registration instructions indicating whether or not the user is to perform user registration with the suggested company or the suggested service indicated by the registration instruction request. The reception unit 4111 of the transfer destination server 4001 receives the registration instruction transmitted by the user terminal 4004.

If the registration instruction received by the reception unit 4111 indicates that user registration is to be performed for the suggested company or the suggested service, then the generation unit 4112 in the transfer destination server 4001 generates second associated information, and the transmission unit 4113 transmits the second associated information to the suggested company or to the company providing the suggested service.

As a result thereof, the transfer destination server 4001 can suggest, to the user, new companies or services not provided in the transfer source server 4002, thereby increasing the convenience for the user.

Additionally, in the case in which the transfer destination server 4001 does not provide a messaging service to a company for which the user performed user registration in the transfer source server 4002 at the time the user transferred the subscription from the transfer source server 4002 to the transfer destination server 4001, the transfer destination server 4001 may provide a messaging service to said company after that time. For this reason, if the transfer destination server 4001 becomes capable of providing the messaging service to said company after the time at which the user transferred the subscription from the transfer source server 4002 to the transfer destination server 4001, the generation unit 4112 may identify said company as a suggested company. The transfer destination server 4001 transmits a registration instruction request for the suggested company to the user terminal 4004. As a result thereof, the transfer destination server 4001 can newly receive user registration from the user for a company for which the user was not able to maintain user registration at the time of transfer.

Effects of Fourth Embodiment

With the communication system S according to the fourth embodiment, in the case in which the user has transferred a subscription from a first carrier owning a transfer source server 4002 to a second carrier owning a transfer destination server 4001 the transfer destination server 4001 receives, from the transfer source server 4002, first associated information in which company identification information is associated with user identification information, and furthermore transmits, to the company server 4003, second associated information in which identification information for the transfer destination server 4001 is associated with identification information for the user. As a result thereof, the company server 4003 can be notified of a new transmission destination for messages to the user, and can continue to transmit messages to the user. The user does not need to perform user registration with the company again, thereby reducing the burden of performing user registration with the company.

While embodiments of the present invention have been described above, the technical scope of the present invention is not limited to the scope described in the abovementioned embodiments, and various modifications and alterations are possible within the spirit thereof. For example, the specific embodiments by which the devices are distributed or integrated are not limited to the above embodiments, and all or some of the embodiments may be configured by being functionally or physically distributed or integrated in arbitrary units. Additionally, new embodiments formed by arbitrarily combining multiple embodiments are also included among the embodiments of the present invention. The effects of new embodiments formed by combinations are combinations of the effects of the original embodiments.

The processors in the transfer destination server 4001, the transfer source server 4002, the company server 4003, and the user terminal 4004 perform the steps (processes) included in the communication method indicated in FIG. 32. In other words, processors in the transfer destination server 4001, the transfer source server 4002, the company server 4003, and the user terminal 4004 perform the communication method indicated in FIG. 32 by reading out programs for executing the communication method indicated in FIG. 32 from the storage units, and executing the programs to control the respective units in the transfer destination server 4001, the transfer source server 4002, the company server 4003, and the user terminal 4004. Some of the steps included in the communication method indicated in FIG. 32 may be skipped, the order of the steps may be changed, or multiple steps may be performed in parallel.

Fifth Embodiment

Systems in which a user is able to receive various services from a company by performing user registration (for example, by setting a friend relationship, transmitting personal information, or the like) with the company on a user terminal in a messaging service for exchanging messages are known.

There are cases in which the same messaging service is provided on multiple carriers. In this case, the company must know the carrier with which the user is currently subscribed in order to use the messaging service to transmit messages to the user. For this reason, for companies, user management in messaging services was troublesome.

The fifth embodiment provides the effect of facilitating user management in a messaging service for exchanging messages between users and companies.

[Summary of Communication System S]

Figure 35:
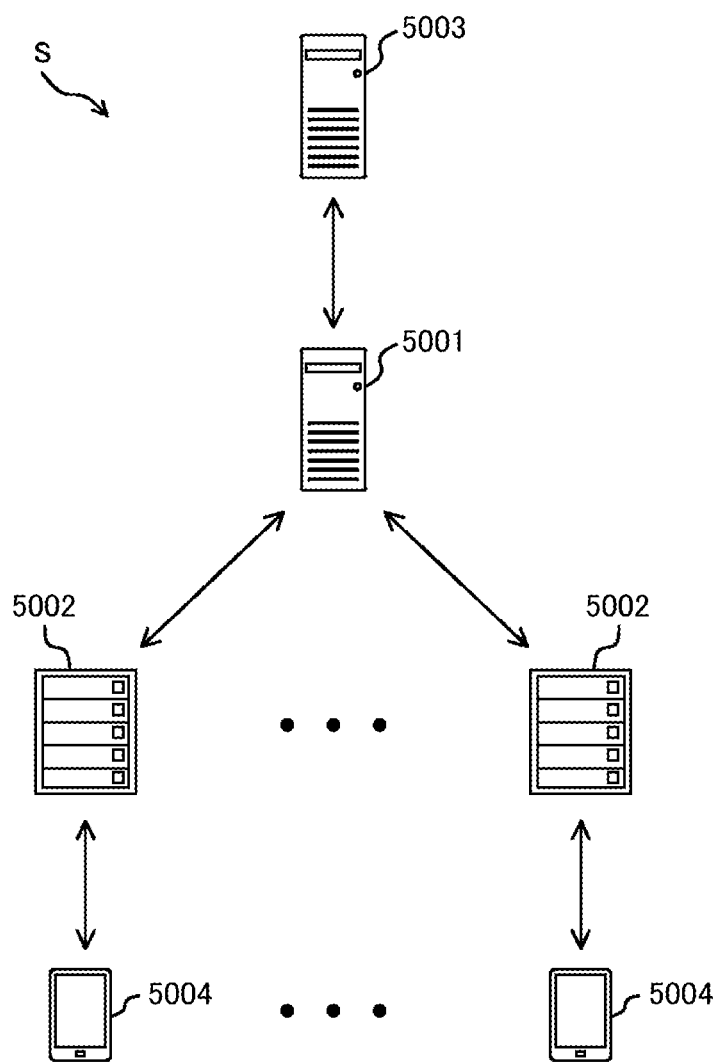
FIG. 35 is a schematic diagram of a communication system according to a fifth embodiment.

FIG. 35 is a schematic view of a communication system S according to the fifth embodiment. The communication system S includes a relay server 5001, multiple carrier servers 5002, a company server 5003, and user terminals 5004. The number of carrier servers 5002, company servers 5003, and user terminals 5004 included in the communication system S is not limited. The communication system S may include other devices such as servers and terminals.

The multiple carrier servers 5002 (communication devices) are computers managed by respectively different carriers (for example, telecommunications carriers or the like). The multiple carrier servers 5002 respectively provide, to the company server 5003 and the user terminals 5004, a messaging service (also called a message service or a messenger service) for exchanging messages by communication. The messaging service is, for example, an RCS (Rich Communication Service).

The company server 5003 is a computer managed by a company. The company is an organization that is provided with messaging services. The company server 5003 communicates with the relay server 5001. The company server 5003 exchanges messages with the user terminals 5004 via the relay server 5001 and the carrier servers 5002.

The user terminals 5004 are communication terminals owned by users. The user terminals 5004 are mobile terminals such as, for example, personal computers, smartphones, or tablet terminals. The users are people to whom messaging services are provided. The user terminals 5004 communicate with one of the multiple carrier servers 5002. The user terminals 5004 exchange messages with the company server 5003 via one of the multiple carrier servers 5002 and the relay server 5001.

The relay server 5001 (relay device) is a computer for relaying messages exchanged between the company server 5003 and the user terminals 5004. The relay sever 5001 performs communication between the company server 5003 and the multiple carrier servers 5002.

First, a user is subscribed to telecommunications services and the like with a carrier managing one of the multiple carrier servers 5002. The user performs user registration with the company managing the company server 5003 in a messaging service provided by the carrier. The user registration may be performed for each company, or for each service provided by the company.

When user registration is performed, the relay server 5001 records, in association with, identification information for the user performing user registration with the company, identification information for the company server 5003, and identification information for the carrier server 5002. As a result thereof, the relay server 5001 can use the identification information of the user, the identification information of the company server 5003, and the identification information of the carrier server 5002 to relay messages transmitted from the company server 5003 to the carrier server 5002 of the carrier with which the user is subscribed. Furthermore, the relay server 5001 records personal information of the user who performed user registration with the company. As a result thereof, the relay server 5001 can use the personal information of users to relay messages received from the company server 5003 to users satisfying user attributes designated by the company.

Thus, in the communication system S, the relay server 5001 can relay messages transmitted by the company server 5003 to the carrier servers 5002 of carriers with which users are subscribed, so that the messages reach the user terminals 5004. Due to the relay server 5001 integrally managing the user registration information for multiple carriers, the company server 5003 does not need to know the carriers with which users are currently subscribed, thereby facilitating user management in messaging services.

[Configuration of Communication System S]

Figure 36:
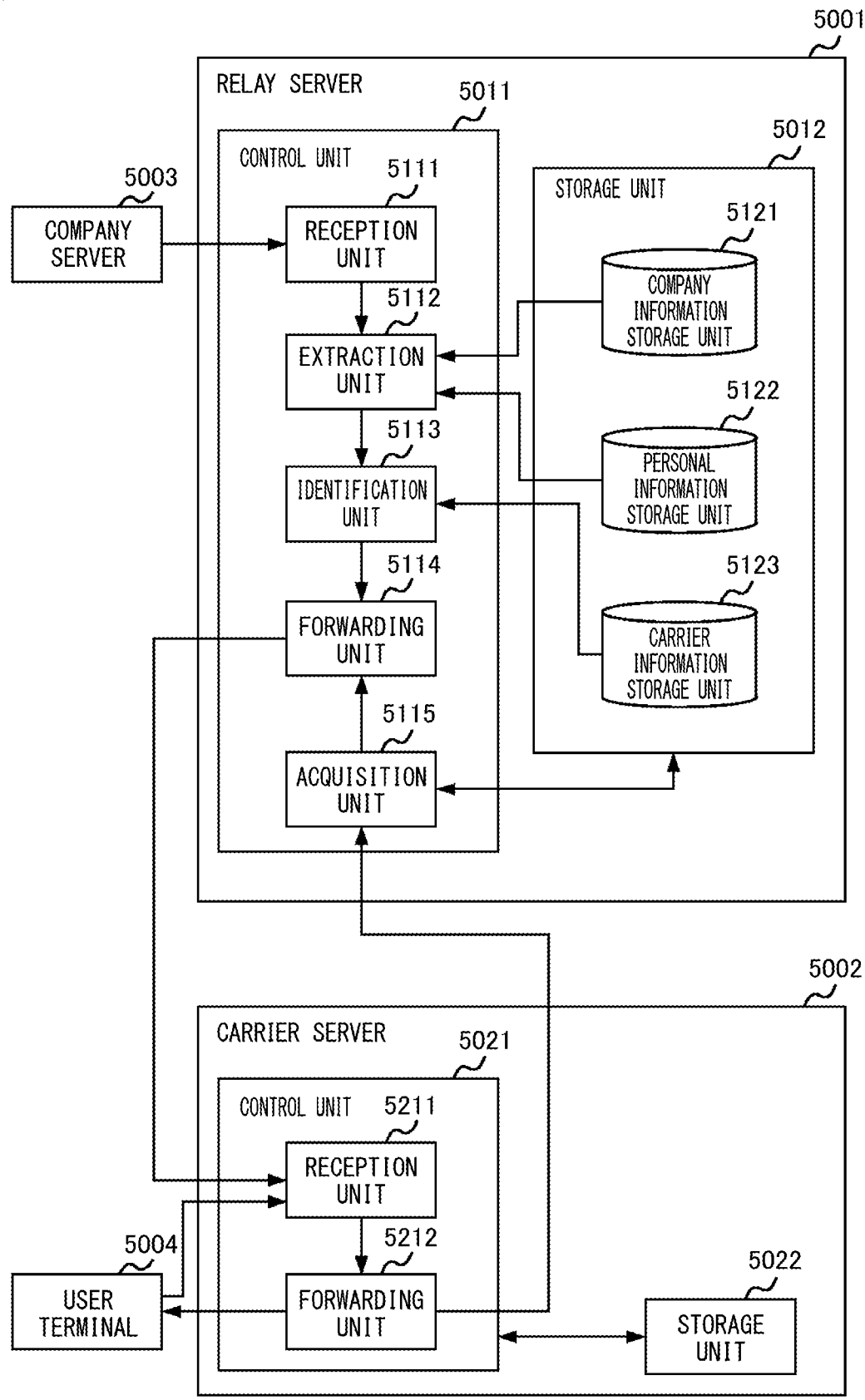
FIG. 36 is a block diagram of a relay server and a carrier server according to the fifth embodiment.

FIG. 36 is a block diagram of the relay server 5001 and the carrier server 5002 according to the fifth embodiment. In FIG. 36, the arrows indicate the main flow of data, though there may be data flow not indicated in FIG. 36. In FIG. 36, each block indicates a functional unit configuration rather than a hardware (device) unit configuration. For this reason, the blocks illustrated in FIG. 36 may be installed in a single device, or may be installed so as to be divided between multiple devices. The exchange of data between blocks may be performed by arbitrary means such as a data bus, a network, a portable storage medium, or the like.

The relay server 5001 has a control unit 5011 and a storage unit 5012. The control unit 5011 has a reception unit 5111, an extraction unit 5112, an identification unit 5113, a forwarding unit 5114, and an acquisition unit 5115. The storage unit 5012 has a company information storage unit 5121, a personal information storage unit 5122, and a carrier information storage unit 5123.

The storage unit 5012 is a storage medium including a ROM (Read-Only Memory), a RAM (Random Access Memory), a hard disk drive, and the like. A program to be executed by the control unit 5011 is pre-stored in the storage unit 5012. The storage unit 5012 may be provided outside the relay server 5001, and in that case, may exchange data with the control unit 5011 via a network.

The company information storage unit 5121 stores company information indicating which company the users have performed user registration for. The company information includes, for example, user IDs and company IDs. The personal information storage unit 5122 stores personal information of users. The personal information includes, for example, user IDs, telephone numbers, names, sex, ages, residential addresses, occupations, and the like. The carrier information storage unit 5123 stores carrier information indicating which carrier the users are subscribed with for telecommunications services and the like. The carrier information includes, for example, user IDs and communication device IDs. The company information storage unit 5121, the personal information storage unit 5122, and the carrier information storage unit 5123 may respectively be storage areas in the storage unit 5012, or may be databases formed in the storage unit 5012.

The control unit 5011 is, for example, a processor such as a CPU (Central Processing Unit), which functions as the reception unit 5111, the extraction unit 5112, the identification unit 5113, the forwarding unit 5114, and the acquisition unit 5115 by executing a program stored in the storage unit 5012. At least some of the functions of the control unit 5011 may be performed by an electric circuit. Additionally, at least some of the functions of the control unit 5011 may be performed by a program executed via a network.

The carrier server 5002 has a control unit 5021 and a storage unit 5022. The control unit 5021 has a reception unit 5211 and a forwarding unit 5212. The storage unit 5022 is a storage medium including a ROM, a RAM, a hard disk drive, or the like. A program to be executed by the control unit 5021 is pre-stored in the storage unit 5022. The storage unit 5022 may be provided outside the carrier server 5002, and in that case, may exchange data with the control unit 5021 via a network.

The control unit 5021 is a processor such as, for example, a CPU, which functions as the reception unit 5211 and the forwarding unit 5212 by executing a program stored in the storage unit 5022. At least some of the functions of the control unit 5021 may be performed by an electric circuit. Additionally, at least some of the functions of the control unit 5021 may be performed by a program executed via a network.

Figure 37:
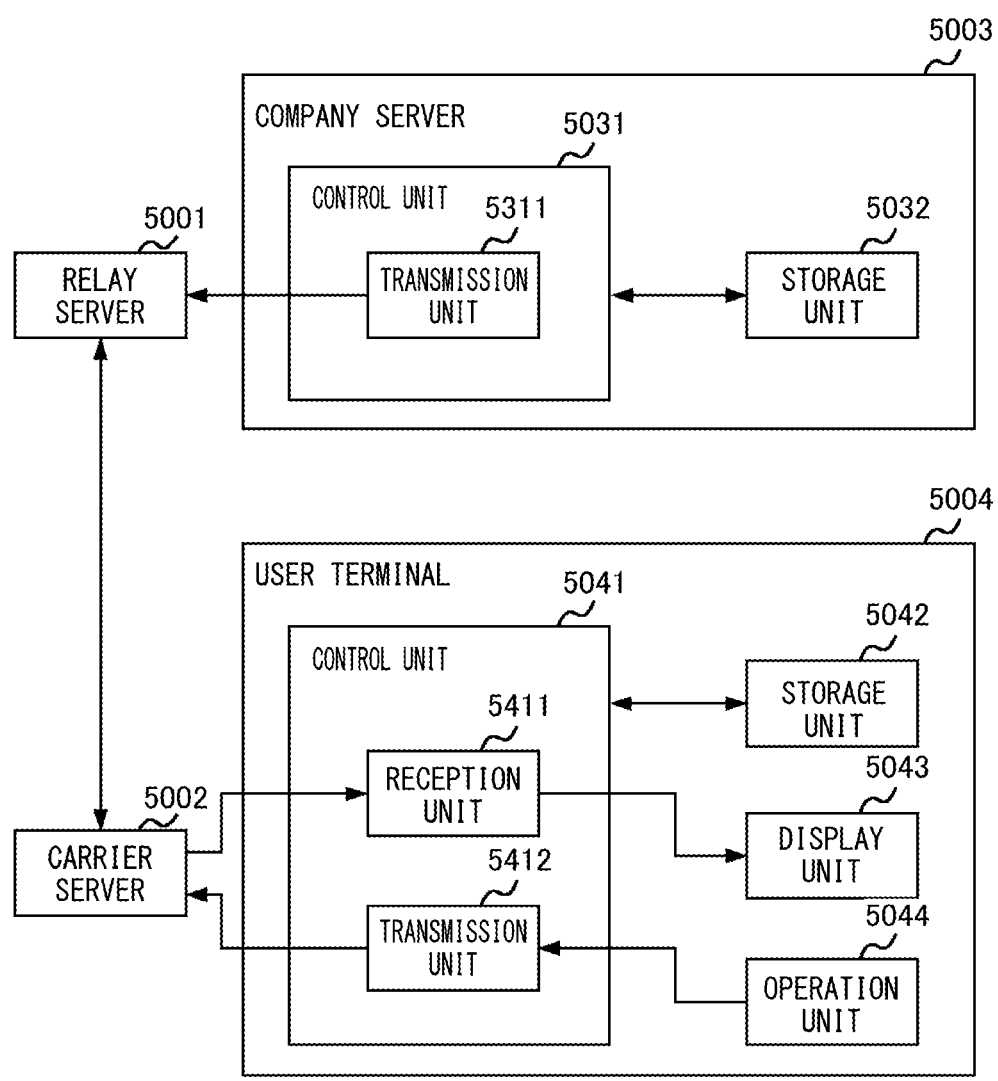
FIG. 37 is a block diagram of a company server and a user terminal according to the fifth embodiment.

FIG. 37 is a block diagram of a company server 5003 and a user terminal 5004 according to the fifth embodiment. In FIG. 37, the arrows indicate the main flow of data, though there may be data flow not indicated in FIG. 37. In FIG. 37, each block indicates a functional unit configuration rather than a hardware (device) unit configuration. For this reason, the blocks illustrated in FIG. 37 may be installed in a single device, or may be installed so as to be divided between multiple devices. The exchange of data between blocks may be performed by arbitrary means such as a data bus, a network, a portable storage medium, or the like.

The company server 5003 has a control unit 5031 and a storage unit 5032. The control unit 5031 has a transmission unit 5311. The storage unit 5032 is a storage medium including a ROM, a RAM, a hard disk drive, or the like. A program to be executed by the control unit 5031 is pre-stored in the storage unit 5032. The storage unit 5032 may be provided outside the carrier server 5003, and in that case, may exchange data with the control unit 5031 via a network.

The control unit 5031 is, for example, a processor such as a CPU (Central Processing Unit), which functions as the transmission unit 5311 by executing a program stored in the storage unit 5032. At least some of the functions of the control unit 5031 may be performed by an electric circuit. Additionally, at least some of the functions of the control unit 5031 may be performed by a program executed via a network.

The user terminals 5004 have a control unit 5041, a storage unit 5042, a display unit 5043, and an operation unit 5044. The control unit 5041 has a reception unit 5411 and a transmission unit 5412.

The display unit 5043 includes a display device that can display information, such as a liquid crystal display. The operation unit 5044 includes an operation device, such as a keyboard or a mouse, which can input information by means of a user operation. The display unit 5043 and the operation unit 5044 may be formed integrally by using, as the display unit 5043, a touch screen that can detect a location touched by the user.

The storage unit 5042 is a storage medium including a ROM, a RAM, a hard disk drive, or the like. A program to be executed by the control unit 5041 is pre-stored in the storage unit 5042. The storage unit 5042 may be provided outside the user terminal 5004, and in that case, may exchange data with the control unit 5041 via a network.

The control unit 5041 is a processor such as, for example, a CPU, which functions as the reception unit 5411 and the transmission unit 5412 by executing a program stored in the storage unit 5042. At least some of the functions of the control unit 5041 may be performed by an electric circuit. Additionally, at least some of the functions of the control unit 5041 may be performed by a program executed via a network.

The relay server 5001, the carrier servers 5002, the company server 5003, and the user terminals 5004 according to the fifth embodiment are not limited to the specific configurations illustrated in FIG. 36 and FIG. 37. The relay server 5001, the carrier servers 5002, the company server 5003, and the user terminals 5004 are each not limited to being a single device, and may be formed by two or more physically separated devices being connected by cable or wirelessly.

[Description of Communication Method]

First, the information recorded by the relay server 5001 will be explained. FIG. 38A is a schematic diagram of company information D1 stored by the company information storage unit 5121. The company information D1 includes, associated with each other, user IDs, which are identification information for users, and company IDs, which are identification information for companies with which the users have performed user registration. The user IDs are identification information that is assigned to each user in order to manage the users, represented by arbitrary text. A user ID may be identification information (for example, a telephone number) that can, by itself, uniquely identify the user, or may be identification information that is unique in combination with a company ID. Furthermore, if a company provides users with multiple services (for example, services for providing various types of insurance, membership services of multiple types such as premium memberships and standard memberships, and the like), the company information D1 may include identification information for identifying the services.

The company IDs are identification information that is assigned to companies, represented by arbitrary text. The company IDs may be assigned to each company, or may be assigned to each service provided by the companies. The company IDs may be the same across multiple carriers providing messaging services to the companies, FIG. 38B is a schematic diagram of carrier information D2 stored by the carrier information storage unit 5123. The carrier information D2 includes, associated with each other, user IDs, which are identification information for users, and communication device IDs, which are identification information for communication devices managed by carries which the users are subscribed. The user IDs are defined in the same manner as those in the company information D1.

The communication device IDs are identification information for identifying carrier servers 5002, represented by arbitrary text. The communication device IDs may be identification information assigned to each communication device (server), or may be identification information assigned to each carrier managing the carrier servers 5002.

FIG. 38C is a schematic diagram of personal information D3 stored by the personal information storage unit 5122. The personal information D3 includes, associated with each other, user IDs, which are identification information for users, and telephone numbers, names, sex, ages, residential addresses, and occupations, which are user attributes of users. The user IDs are defined in the same manner as those in the company information D1. The user attributes may include other information relating to the users.

In FIG. 38A to FIG. 38C, the company information DL, the carrier information D2, and the personal information D3 are represented by tables with text strings for the purpose of visibility. However, the data may be recorded in any form, and may, for example, be any of text string data, numerical data, and binary data. The company information D1, the carrier information D2, and the personal information D3 may be recorded respectively as databases, or may be recorded as lists in which the data is listed.

Figure 39:
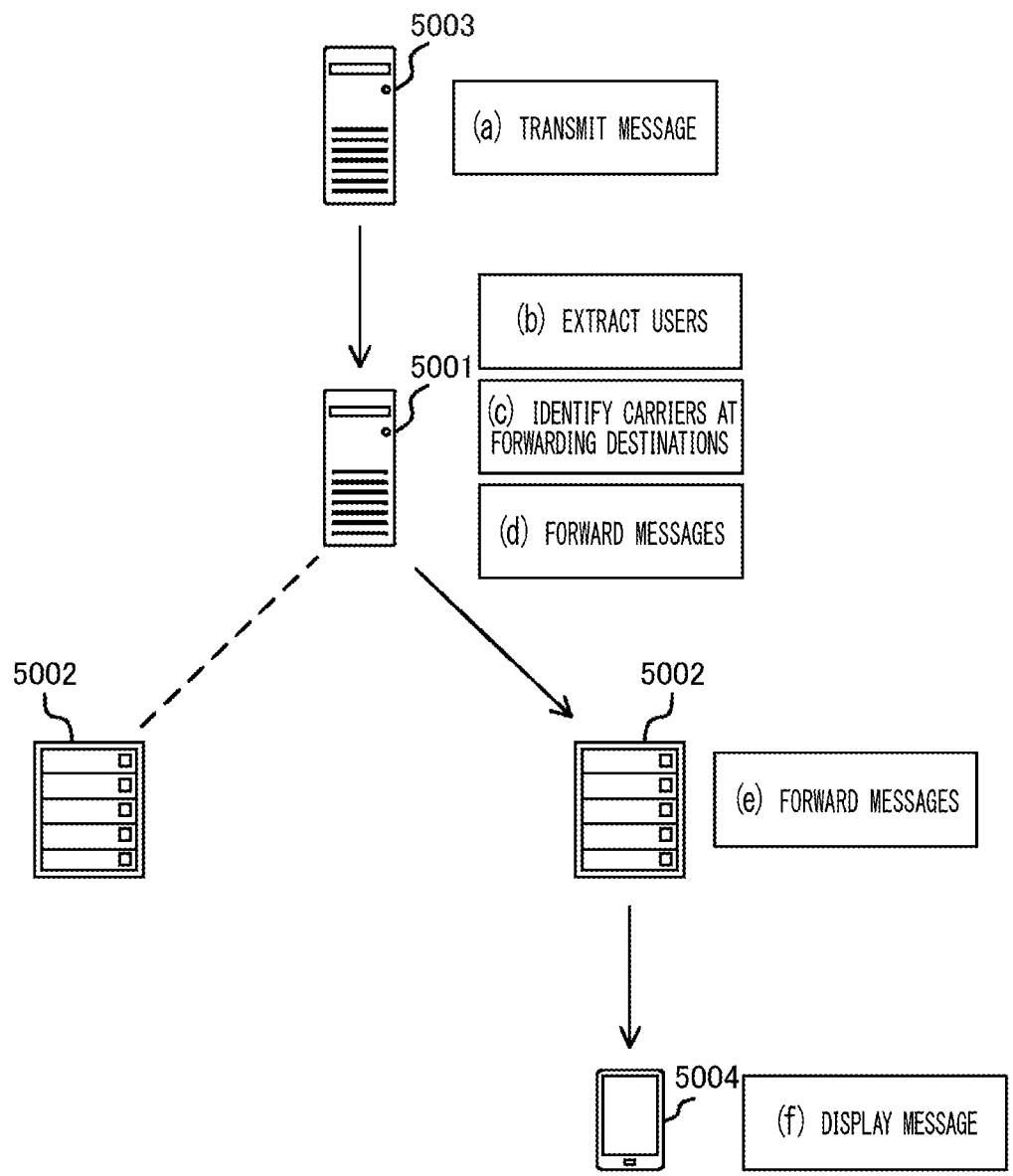
FIG. 39 is a schematic diagram of the first half of a communication method performed by the communication system according to the fifth embodiment.

FIG. 39 is a schematic diagram of the first half of a communication method (relay method) performed by the communication system S according to the fifth embodiment. When a company is to send messages to users, in the company server 5003, the transmission unit 5311 transmits the messages intended for the users to the relay server 5001 (a). The messages transmitted by the transmission unit 5311 are one of messages designating specific users, messages designating all users that have performed user registration with the company, and messages designating user attributes. In the case in which the company provides multiple services to users, the messages may designate identification information of one or more services for the purpose of designating users who are utilizing specific services.

Messages designating specific users are data indicating, as transmission destinations, the user IDs of one or more users, and content (i.e., text strings, images, moving images, and the like) to be displayed on user terminals 5004. In this case, the company server 5003 stores, in the storage unit 5032, the user IDs of users who have performed user registration with the company. The transmission unit 5311 acquires the user IDs that are to be the transmission destinations from the storage unit 5032, and transmits messages indicating the acquired user IDs to the relay server 5001. Messages designating all users are data indicating information (flags and the like) designating all users as transmission destinations, and content to be displayed on the user terminals 5004. The transmission unit 5311 transmits, to the relay server 5001, the messages providing information designating all users as transmission destinations.

The messages designating user attributes are data indicating user attributes of users who are to be transmission destinations, and content to be displayed on the user terminals 5004. User attributes are, for example, at least one of the sex, the age (for example, the age group), the residential address (for example, the residential area), and the occupation (for example, the occupation type) of users. In this case, the transmission unit 5311 determines the user attributes of the user who are to be the transmission destinations, and transmits messages indicating the determined user attributes to the relay server 5001.

Additionally, the transmission unit 5311 may transmit, to the relay server 5001, instructions indicating at least one of transmission methods for the messages and the hours of the day at which the messages are to be transmitted. The transmission methods are technical infrastructures for transmitting messages from the carrier servers 5002 to the user terminals 5004, and are one or more of an RCS, an SMS (Short Message Service), an SNS (Social Networking Service), and electronic mail. The hour of the day is a time period used as a condition for transmitting messages from the carrier servers 5002 to the user terminals 5004.

In the relay server 5001, the reception unit 5111 receives messages transmitted by the company server 5003. Additionally, the reception unit 5111 receives instructions, transmitted by the company server 5003, indicating at least one of the transmission methods of the messages and the hours of the day at which the messages are to be transmitted.

The extraction unit 5112 extracts the user IDs of users who have performed user registration with a company based on a message received by the reception unit 5111 (b). Specifically, the extraction unit 5112 extracts user IDs associated, in the company information storage unit 5121, with the company ID of the company managing the company server 5003 that is the transmission source of the message received by the reception unit S111. The company server 5003 has a preset company ID, and the relay server 5001 can identify the company server 5003 corresponding to the company ID. Additionally, if a message received by the reception unit 5111 designates identification information for a service, then the extraction unit 5112 extracts user IDs associated, in the company information storage unit 5121, with the company ID of the company managing the company server 5003 that is the transmission source of the message received by the reception unit 5111, and with the identification information of the service designated by the message.

Furthermore, if a message received by the reception unit 5111 designates a specific user, then the extraction unit 5112 extracts, as the user ID of the transmission destination, the user ID indicated by the message received by the reception unit 5111 among the user IDs extracted from the company information storage unit 5121. As a result thereof, the company can transmit messages to specific users among the users who have performed user registration with the company.

Additionally, if a message received by the reception unit 5111 designates all users, then the extraction unit 5112 extracts, as the user IDs of the transmission destinations, all user IDs extracted from the company information storage unit 5121. As a result thereof, the company can transmit messages at once to all users who have performed user registration with the company.

Additionally, if a message received by the reception unit 5111 designates user attributes, then the extraction unit 5112 extracts, from among the user IDs extracted from the company information storage unit 5121, as the user IDs of the transmission destinations, user IDs associated, in the personal information storage unit 5122, with the user attributes indicated by the message received by the reception unit 5111. As a result thereof, the company can transmit messages to unspecified users satisfying the designated user attributes among the users who have performed user registration with the company.

Next, the identification unit 5113 identifies the carrier servers 5002 of the carriers that are the forwarding destinations of the message based on the user IDs of the transmission destinations extracted by the extraction unit 5112 (c). Specifically, the identification unit 5113 acquires communication device IDs associated, in the carrier information storage unit 5123, with the user IDs of transmission destinations extracted by the extraction unit 5112. Furthermore, the identification unit 5113 identifies, as the forwarding destinations, the carrier servers 5002 corresponding to the acquired communication device IDs (i.e., the carrier servers 5002 managed by the carriers with which the users are subscribed). The carrier servers 5002 have preset communication device IDs, and the relay server 5001 can identify the carrier servers 5002 corresponding to the communication device IDs. As a result thereof, regardless of which carrier a user is subscribed with, the identification unit 5113 can identify the carrier server 5002 of the carrier with which the user is subscribed, and forward the message thereto.

If multiple communication device IDs are associated with the user ID of a transmission destination (i.e., the user is subscribed with multiple carriers), then the identification unit 5113 may identify all of the communication device IDs as transmission destinations, or may identify some of the communication device IDs satisfying certain conditions (for example, the communication device ID of a carrier with which the user has a main subscription) as the forwarding destinations. At this time, even if a single message is forwarded to multiple carrier servers 5002 corresponding to multiple communication device IDs, the transmitted number and opened number of messages are respectively counted once.

At this time, the identification unit 5113 may determine fees for a company server 5003 to transmit messages to user terminals 5004 corresponding to the user IDs of transmission destinations extracted by the extraction unit 5112 based on instructions, indicating at least one of the transmission methods of the messages received by the reception unit 5111 and the hours of day at which the messages are to be transmitted. In this case, a fee schedule indicating fees corresponding to transmission methods of messages and the hours of the day at which messages are to be transmitted is pre-stored in the storage unit 5012. The identification unit 5113 uses the fee schedule stored in the storage unit 5012 to determine fees for designated transmission methods and hours of day, outputs fee information indicating the determined fees, and has the storage unit 5012 store the fees information. The fee information is utilized for billing the company managing the company server 5003.

Additionally, the identification unit 5113 may automatically determine a fee based on the number of past messages transmitted and opened, acquired by an acquisition unit 5115 to be described below. For example, for the designated transmission methods and hours of day, the identification unit 5113 sets the fee to be higher if the rate at which past messages have been opened is higher, and sets the fee to be lower if the rate at which past messages have been opened is lower.

As a result thereof, the relay server 5001 can set different fees in accordance with the transmission methods of messages and the hours of day at which the messages are to be transmitted, designated by the company, thereby keeping the messages transmitted to the users from being concentrated in some transmission methods and hours of the day. Additionally, the identification unit 5113 may set different fees for the case in which a message has been transmitted and the case in which a message has been transmitted and thereafter opened.

Furthermore, the forwarding unit 5114 forwards messages received by the reception unit 5111, together with the user IDs of the transmission destinations extracted by the extraction unit 5112, to the carrier servers 5002 of forwarding destinations identified by the identification unit 5113 (d). Additionally, if the reception unit 5111 has received instructions, from the company server 5003, indicating at least one of transmission methods for the messages and hours of day at which the messages are to be transmitted, then the forwarding unit 5114 transmits said instructions to the carrier servers 5002 of the forwarding destinations identified by the identification unit 5113.

Additionally, if the reception unit 5111 has received instructions indicating the hour of day at which a message is to be transmitted from the company server 5003, then the forwarding unit 5114 may transfer the message to the carrier server 5002 that is the forwarding destination at that hour of day. In other words, the relay server 5001 may control the hour of day at which the message is transmitted. In this case, the carrier server 5002 immediately forwards the message received from the relay server 5001 to the user terminal 5004.

Additionally, if a message received by the reception unit 5111 designates a specific user, then the forwarding unit 5114 may withhold other messages from being forwarded to the carrier server 5002 that is the forwarding destination for a prescribed time period (for example, a prescribed time period before or ater the scheduled transmission time) including the scheduled transmission time (the current time or the designated hour of day) of the message. As a result thereof, the probability that a message designating a specific user will be opened by the user can be increased Additionally, the forwarding unit 5114 may determine the transmission method for each user based on the past usage status of transmission methods recorded for each user. At this time, the company server 5003 transmits to the relay server 5001, together with a message, transmission method selection conditions that are one of (1) transmission by a transmission method designated by the company, (2) transmission by the transmission method having the highest usage frequency for the user, (3) transmission such that, if the message is not seen after using a first designated method, the message is transmitted a second time by a different transmission method, (4) simultaneous transmission by multiple transmission methods, and (5) monitoring of the message arrival status or opening status, and retransmission after a prescribed period of time.

The reception unit 5111 receives the selection conditions of the transmission method that the company server 5003 transmitted together with the message. The forwarding unit 5114 uses the selection conditions received from the company to determine a transmission method based on the past usage status recorded for each user, and transmits the determined transmission method to the carrier server 5002 that is the forwarding destination. In this way, the company can select various transmission methods in accordance with the message to be transmitted.

Additionally, the relay server 5001 may determine whether or not to forward a message from a company to a user by receiving bids from companies in accordance with the message transmission method and the hour of day at which the message is to be transmitted. In this case, the number of messages that can be transmitted is limited for each message transmission method and hour of day at which the messages are to be transmitted. The reception unit 5111 receives, from multiple company servers 5003, instructions indicating bid monetary amounts together with at least one of message transmission methods and hours of day at which the messages are to be transmitted. The bid monetary amounts may be a fee for each message, or may be a fee not relating to the number of messages.

The forwarding unit 5114 selects one or more company servers 5003 in response to the bid monetary amounts received from the multiple company servers 5003 (for example, in the order of higher bids). Furthermore, the forwarding unit 5114 forwards, to the carrier server 5002 that is the forwarding destination identified by the identification 5113, a message received by the reception unit 51111 from the one or more company servers 5003 that have been selected. The forwarding unit 5114 outputs fee information indicating fees in accordance with the bid monetary amount to the one or more company servers 5003 that have been selected, and has the storage unit 5012 store the fee information.

Alternatively, the relay server 5001 may receive, in advance, bids from companies regarding message transmission methods and hours of day at which messages are to be transmitted, and award, to the companies that entered successful bids, successful bid IDs with which transmission methods and hours of day are associated. In this case, the company servers 5003 transmit, to the relay server 5001, the messages to the users together with the successful bid IDs that have been awarded. The forwarding unit 5114 determines transmission methods and hours of day based on the successful bid IDs received from the company servers 5003, and transmits to the carrier servers 5002 that are the forwarding destinations, together with the messages, instructions indicating the transmission methods and the hours of day that have been determined.

As a result thereof, the relay server 5001 forwards messages transmitted from a limited number of companies by receiving bids from companies in accordance with message transmission methods and hours of day at which messages are to be transmitted, designated by the companies. For this reason, the messages transmitted to users can be kept from being concentrated in some transmission methods and hours of day.

In the carrier server 5002 that is the forwarding destination, the reception unit 5211 receives messages and user IDs of transmission destinations transmitted by the relay server 5001. Additionally, the reception unit 5211 receives instructions, transmitted by the relay server 5001, indicating at least one of the message transmission method and the hours of day at which the messages are to be transmitted.

The forwarding unit 5212 forwards the messages received by the reception unit 5211 to the user terminals 5004 corresponding to the user IDs of the transmission destinations received by the reception unit 5211 (e). User IDs are preset in the user terminals 5004, and the carrier server 5002 can identify user terminals 5004 corresponding to the user IDs.

At this time, if the reception unit 5211 has received instructions indicating the message transmission method, then the forwarding unit 5212 forwards the messages to the user terminals 5004 by one or more transmission methods indicated by said instructions. If the reception unit 5211 has not received instructions indicating the message transmission method, then the forwarding unit 5212 forwards the messages to the user terminals 5004 by prescribed transmission methods.

Additionally, if the reception unit 5211 has received instructions indicating an hour of day at which the messages are to be transmitted, then the forwarding unit 5212 forwards the messages to the user terminals 5004 at the hours of day indicated by said instructions. If the reception unit 5211 has not received instructions indicating the hours of day at which the messages are to be transmitted, then the forwarding unit 5212 forwards the messages to the user terminals 5004 immediately or at prescribed hours of day.

When the transmission of the messages to the user terminals 5004 is completed, the forwarding unit 5212 has the storage unit 5022 store the transmitted number (i.e., the number of user terminals 5004 that were the transmission destinations of the messages) in association with the messages (for example, message IDs assigned to the messages).

In each user terminal 5004, the reception unit 5411 receives messages transmitted by the carrier server 5002. The reception unit 5411 displays the received messages on the display unit 5043 in accordance with an operation (for example, an opening operation) on the operation unit 5044 by the user (f).

Figure 40:
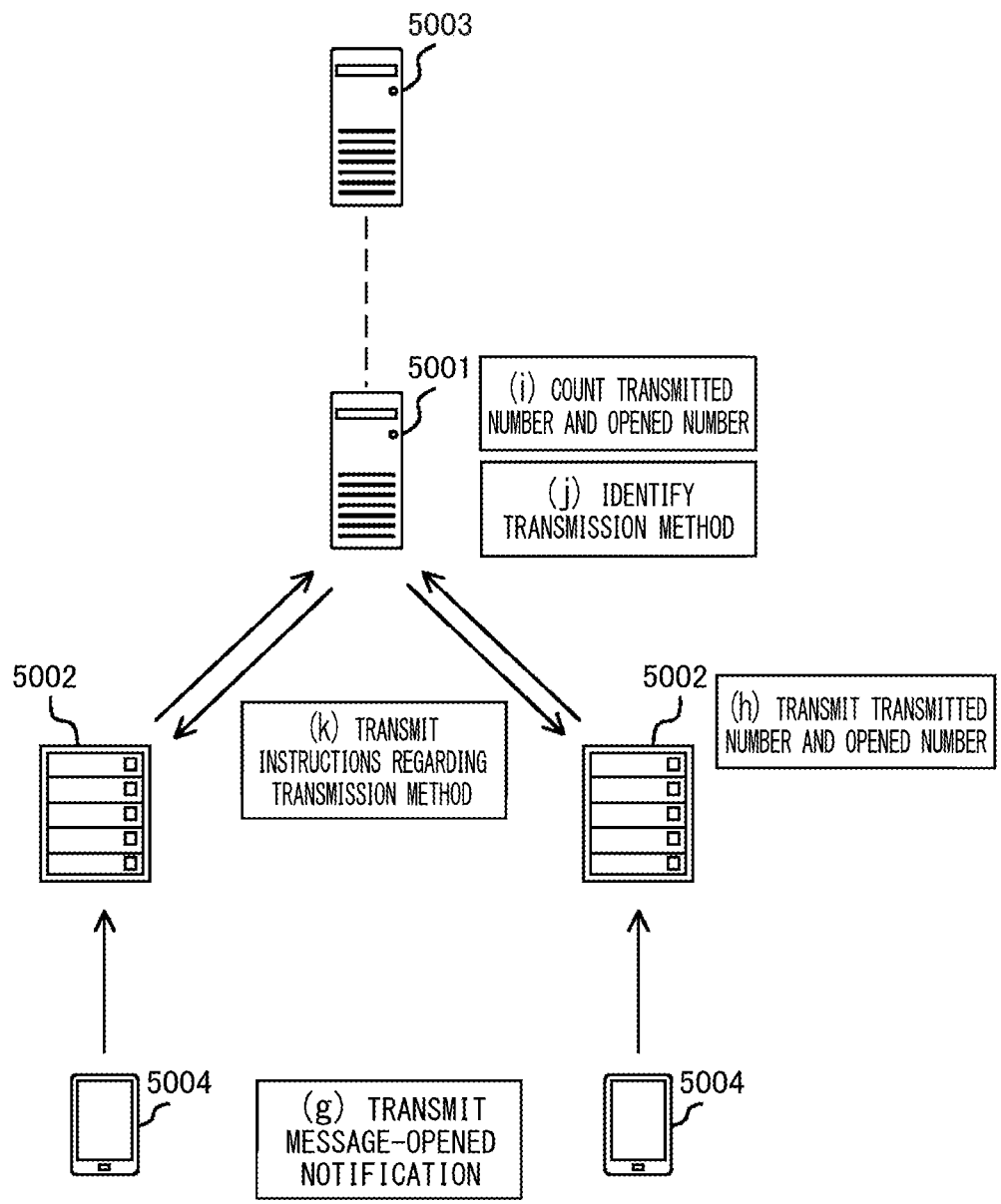
FIG. 40 is a schematic diagram of the latter half of the communication method performed by the communication system according to the fifth embodiment.

FIG. 40 is a schematic diagram of the latter half of the communication method (relay method) performed by the communication system S according to the present embodiment. When a message is displayed on a user terminal 5004 that has received the message transmitted by a carrier server 5002, the transmission unit 5412 transmits, to the carrier server 5002 that is the transmission source of said message, a message-opened notification indicating the message ID of the displayed message (g).

In each carrier server 5002, the reception unit 5211 receives the message-opened notification transmitted by the user terminal 5004. The reception unit 5211 stores, in the storage unit 5022, the number of opened messages (i.e., the number of message-opened notifications received for the same message ID), in association with the message ID indicated by the message-opened notification that has been received.

At a prescribed timing, the forwarding unit 5212 transmits the transmitted number and the opened number for each message ID to the relay server 5001 in association with the message ID (h). The timing at which the forwarding unit 5212 transmits the transmitted number and the opened number is a timing at which a prescribed time period such as, for example, one hour, one day, or one month has elapsed.

In the relay server 5001, the acquisition unit 5115 receives and acquires the transmitted number and the opened number for each message ID transmitted by the respective carrier servers 5002 (each of the multiple carrier servers 5002). Furthermore, the acquisition unit 5115 counts the transmitted number and the opened number that have been acquired in the past (i). For example, the acquisition unit 5115 counts the transmitted number and the opened number for at least one of each carrier that transmitted messages, each user that was a transmission destination, each user attribute of users that were transmission destinations, each message transmission method, and each hour of day at which the messages were transmitted. Additionally, the acquisition unit 5115 may count the transmitted number and the opened number for each location at which messages were opened and each hour of day at which messages were opened. The acquisition unit 5115 stores the count results in the storage unit 5012. Additionally, the acquisition unit 5115 may compute the opened rate on the basis of the transmitted number and the opened number.

As a result thereof, the relay server 5001 counts the number of messages transmitted and the opened number across multiple carriers, thus allowing managers or utilizers of the relay server 5001 (for example, companies utilizing the relay server 5001) to analyze, with high precision, the transmission conditions of messages that tend to be opened by users.

Furthermore, the forwarding unit 5114 identifies at least one transmission method from among multiple transmission methods (for example, RCS, SMS, SNS, and electronic mail) based on the count results (j). For example, based on the count results, the forwarding unit 5114 identifies the transmission method having the highest opened rate for each carrier that transmitted messages, each user that was a transmission destination, each user attribute of users that were transmission destinations, each message transmission method, and each hour of day at which the messages were transmitted. Furthermore, the forwarding unit 5114 transmits instructions indicating the identified transmission methods to each carrier server 5002 (k). The forwarding unit 5114 may transmit the identified transmission methods to the carrier servers 5002 together with the messages, or may transmit them to the carrier servers 5002 independent of the messages. The carrier servers 5002 transmit messages to the user terminals 5004 in accordance with the received instructions indicating the transmission methods.

The transmission methods may be the same for all carrier servers 5002, or may be different for each carrier server 5002. As a result thereof, the carrier servers 5002 can be instructed to use transmission methods that tend to be opened by users based on the number of messages that have been transmitted and opened in the past.

Additionally, the forwarding unit 5114 may select the user IDs of transmission destinations and the hours of day at which messages are to be transmitted based on the transmitted number and the opened number for each location at which counted messages were opened and for each hour of day at which messages were opened. For example, the forwarding unit 5114 selects the user IDs of transmission destinations corresponding to locations and hours of day for which the opened rate is a prescribed value or higher. The locations of user IDs of transmission destinations are identified based on the positions of user terminals 5004 or the identification information of base stations with which the user terminals 5004 are connected. As a result thereof, the relay server 5001 can transmit messages to locations and at hours of day for which the messages tend to be opened based on the count results.

Additionally, if a message has been opened by a user terminal 5004, then a subsequent message may be transmitted to the user terminal 5004, or a message related to the opened message may be transmitted to the user terminal 5004. As a result thereof, the relay server 5001 can actively transmit messages to users who have opened messages.

Additionally, the forwarding unit 5114 may monitor changes over time in the opened rates of users and control the transmitted number of messages to be decreased for users having lower opened rates, or control the transmitted number of messages to be increased for users having higher opened rates. As a result thereof, the relay server 5001 can actively transmit messages to users who frequently open messages and not transmit many messages to users who do not often open messages, thereby allowing messages to be efficiently distributed.

[Sequence of Communication Method]

Figure 41:
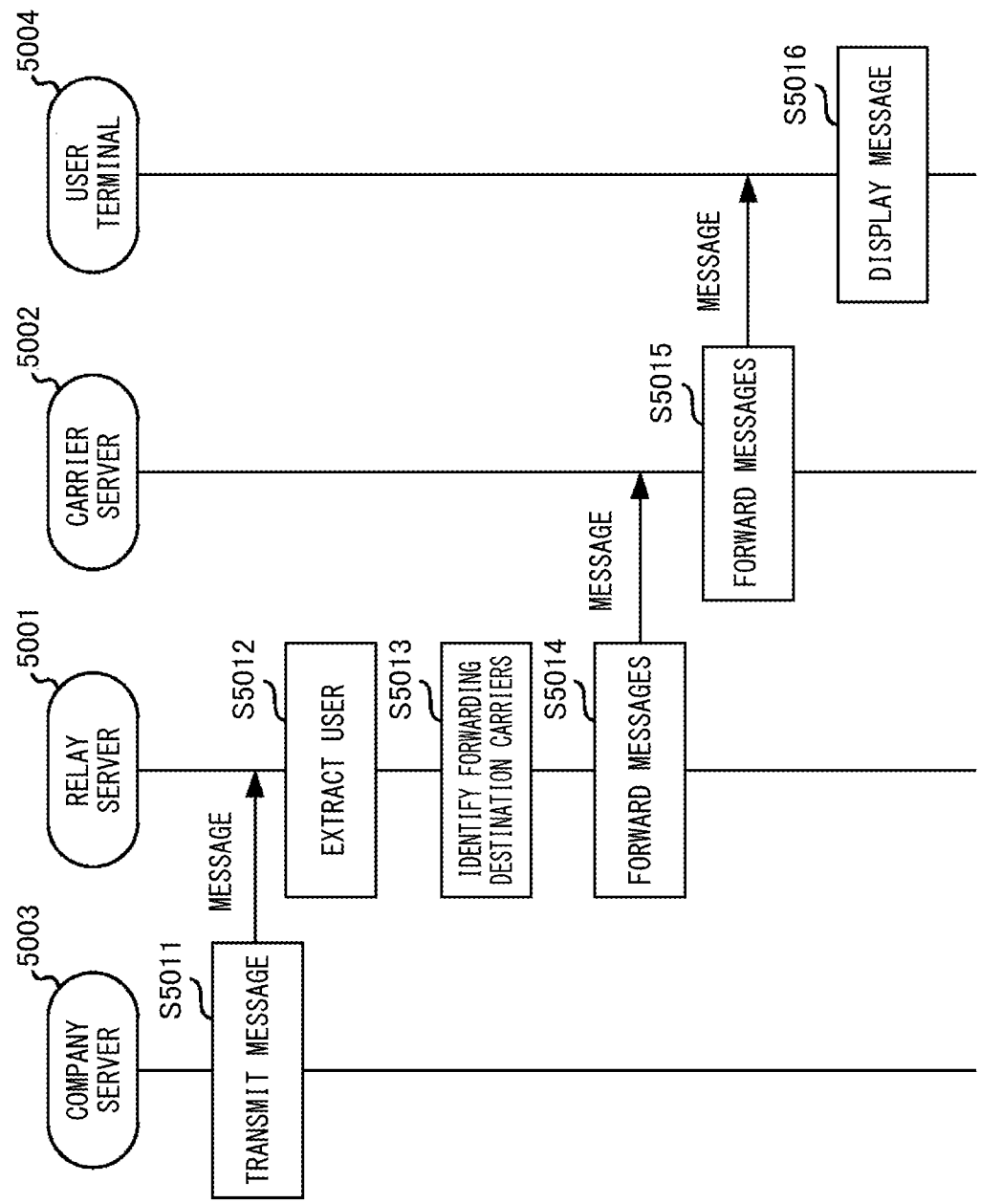
FIG. 41 is a sequence diagram of the first half of the communication method performed by the communication system according to the fifth embodiment.

FIG. 41 is a sequence diagram of the first half of the communication method (relay method) performed by the communication system S according to the fifth embodiment. When a company is to send messages to users, a transmission unit 5311 in a company server 5003 transmits the messages intended for the users to a relay server 5001 (S5011). At this time, the transmission unit 5311 may transmit, to the relay server 5001, instructions indicating at least one of the message transmission method and the hour of day at which the messages are to be transmitted.

In the relay server 5001, the reception unit 5111 receives the messages transmitted by the company server 5003. Additionally, the reception unit 5111 receives the instructions, transmitted by the company server 5003, indicating at least one of the message transmission method and the hour of day at which the messages are to be transmitted. Based on the message received by the reception unit 5111, the extraction unit 5112 extracts the user IDs of users who have performed user registration with the company (S5012).

Based on the user IDs that are the transmission destinations extracted by the extraction unit S112, the identification unit 5113 identifies the carrier servers 5002 of the carriers that are the forwarding destinations of the messages (S5013). The forwarding unit S114 forwards the messages received by the reception unit 5111, together with the user IDs that are the transmission destinations extracted by the extraction unit 5112, to the carrier servers 5002 that are the forwarding destinations identified by the identification unit 5113 (S5014). Additionally, if the reception unit S111 has received, from the company server 5003, instructions indicating at least one of the message transmission method and the hour of day at which the messages are to be transmitted, then the forwarding unit 5114 transmits said instructions to the carrier servers 5002 that are the forwarding destinations identified by the identification unit 5113.

In each carrier server 5002 that is a forwarding destination, the reception unit 5211 receives the messages and the user IDs of the transmission destinations that have been transmitted by the relay server 5001. Additionally, the reception unit 5211 receives the instructions indicating at least one of the message transmission method and the hour of day at which the messages are to be transmitted, which have been transmitted by the relay server 5001.

The forwarding unit 5212 forwards the messages received by the reception unit 5211 to the user terminals 5004 corresponding to the user IDs that are the transmission destinations received by the reception unit 5211 (S5015). At this time, if the reception unit 5211 has received instructions indicating the message transmission method, then the forwarding unit 5212 forwards the messages to the user terminals 5004 by one or more transmission methods indicated by said instructions. Additionally, if the reception unit 5211 has received instructions indicating an hour of day at which the messages are to be transmitted, then the forwarding unit 5212 forwards the messages to the user terminals 5004 at the time of day indicated by said instructions.

When the transmission of the messages to the user terminals 5004 has been completed, the forwarding unit 5212 stores, in the storage unit 5022, the transmitted number in association with the messages.

In each user terminal 5004, the reception unit 5411 receives messages transmitted by the carrier server 5002. The reception unit 5411 displays the received messages on the display unit 5043 in accordance with an operation (for example, an opening operation) of the operation unit 5044 by the user (S5016).

Figure 42:
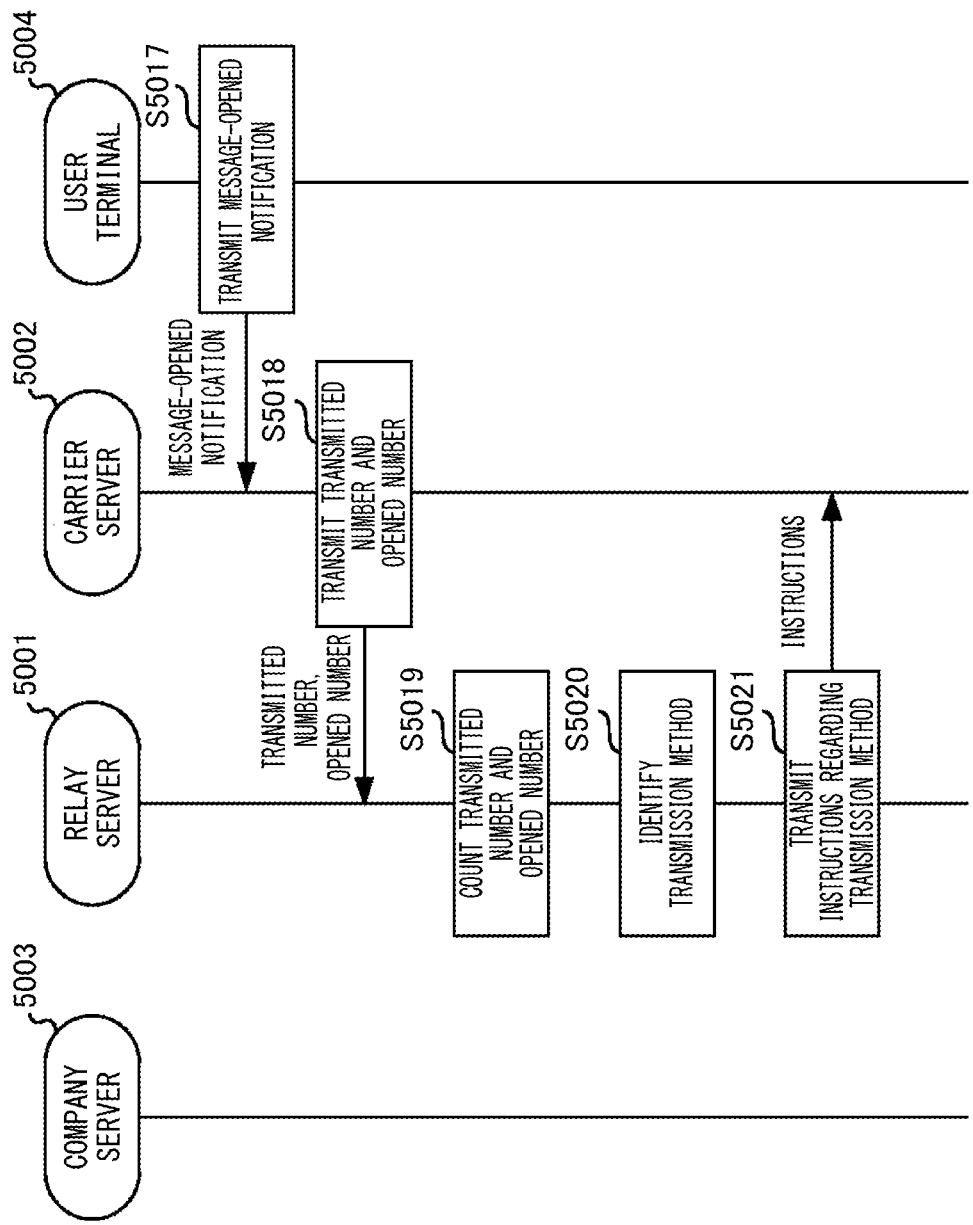
FIG. 42 is a sequence diagram of the latter half of the communication method performed by the communication system according to the fifth embodiment.

FIG. 42 is a sequence diagram of the latter half of the communication method (relay method) performed by the communication system S according to the present embodiment. In a user terminal 5004 that has received a message transmitted by a carrier server 5002, if the message has been displayed, then the transmission unit 5412 transmits, to the carrier server 5002 that is the transmission source of said message, a message-opened notification indicating the message ID of the displayed message (S5017).

In each carrier server 5002, the reception unit 5211 receives the message-opened notifications transmitted by user terminals 5004. The reception unit 5211 stores, in the storage unit 5022, the opened number in association with message IDs indicating the message-opened notifications that have been received. At a prescribed timing, the forwarding unit 5212 transmits the transmitted number and the opened number for each message ID to the relay server 5001 in association with the message ID (S5018).

In the relay server 5001, the acquisition unit 5115 receives and acquires the transmitted number and the opened number for each message ID transmitted by the respective carrier servers 5002. Furthermore, the acquisition unit 5115 counts the transmitted number and the opened number that have been acquired in the past (S5019).

The forwarding unit 5114 identifies at least one transmission method from among multiple transmission methods (for example, RCS, SMS. SNS, and electronic mail) based on the count results (S5020). The forwarding unit 5114 transmits instructions indicating the identified transmission method to each carrier server 5002 (S5021). The carrier servers 5002 transmit the messages to the user terminals 5004 in accordance with the received instructions indicating the transmission method.

Modified Example of Fifth Embodiment

In the present modified example, a selection regarding whether or not user attributes are to be registered with the relay server 5001 is received from user terminals 5004. For example, when a user performs user registration with a company, the reception unit 5411 in the user terminal 5004 displays, on the display unit 5043, a screen for receiving a selection regarding whether or not user attributes are to be registered based on information received from the relay server 5001 via the carrier server 5002. Additionally, the reception unit 5411 may receive the user attributes of users recorded in the relay server 5001.

Figure 43:
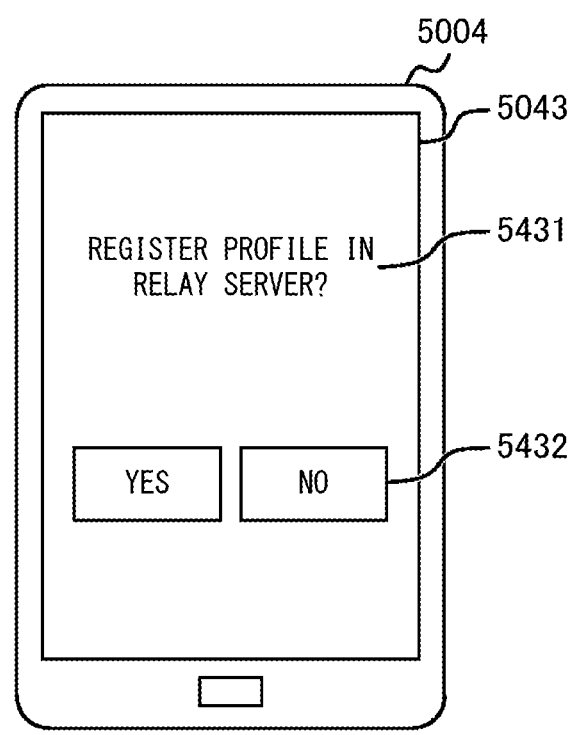
FIG. 43 is a front view of a user terminal displaying a screen for receiving a selection regarding whether or not to register user attributes.

FIG. 43 is a front view of a user terminal 5004 displaying a screen for receiving a selection regarding whether or not user attributes are to be registered. The screen for receiving the selection regarding whether or not user attributes are to be registered includes information 431 asking whether or not user attributes are to be registered with the relay server 5001, and buttons 5432 for inputting the selection. The buttons 5432 are virtual buttons (icons) that can be pressed by the user. Furthermore, the screen for receiving the selection regarding whether or not user attributes are to be registered may include the user attributes of the user received from the relay server 5001. The user uses the operation unit 5044 of the user terminal 5004 to press one of the buttons 5432 in accordance with the selection regarding whether or not user attributes are to be registered with the relay server 5001.

Based on an operation performed on the operation unit 5044, the transmission unit 5412 in the user terminal 5004 transmits to the relay server 5001, via the carrier server 5002, the selection regarding whether or not user attributes are to be registered with the relay server 5001. The reception unit 5111 in the relay server 5001 receives, from the user terminal 5004, the selection regarding whether or not user attributes are to be registered with the relay server 5001.

Additionally, the user may designate which information (i.e., at least one of a telephone number, name, sex, age, residential address, and occupation), among the user attributes displayed on the screen, is to be registered. Additionally, the user may designate the degree of abstraction (for example, whether the age should be a specific age such as 33, or an age group such as the thirties) of the user attributes to be registered. The transmission unit 5412 of the user terminal 5004 transmits, to the relay server 5001, via the carrier server 5002, the designation of user attributes to be registered based on an operation performed on the operation unit 5044.

If the received selection indicates that user attributes are to be registered in the relay server 5001, then the reception unit 5111 receives the user attributes from the carrier server 5002 of the carrier with which the user is subscribed, and has the personal information storage unit 5122 store the user attributes. If the received selection does not indicate that user attributes are to be registered in the relay server 5001, then the reception unit 5111 does not have the personal information storage unit 5122 store the user attributes. Additionally, the reception unit 5111, upon receiving designated user attributes to be registered, has the personal information storage unit 5122 store the user attributes in accordance with the designation.

Thus, in the communication system S according to the present modified example, the user can select whether or not user attributes are to be registered with the relay server 5001, and receive messages with designated user attributes from companies. For this reason, the relay server 5001 can relay messages by making use of personal information from users after obtaining the consent of the users.

Effects of Fifth Embodiment

With the communication system S according to the fifth embodiment, the relay server 5001 extracts users that are transmission destinations based on messages transmitted by a company server 5003, and furthermore identifies carriers with which the users are subscribed and forwards the messages to carrier servers 5002 of the identified carriers. In this way, by the relay server 5001 collecting and managing user registration information in multiple carriers, the company server 5003 does not need to know the carriers with which users are currently subscribed, thus facilitating user management in messaging services.

The processors in the relay server 5001, the carrier servers 5002, the company server 5003, and the user terminals 5004 perform the steps (processes) included in the communication method indicated in FIG. 41 and FIG. 42. In other words, the processors in the relay server 5001, the carrier servers 5002, the company server 50003, and the user terminals 5004 perform the communication method indicated in FIG. 41 and FIG. 42 by reading out programs for executing the communication method indicated in FIG. 41 and FIG. 42 from the storage units, and executing the programs to control the respective units in the relay server 5001, the carrier servers 5002, the company server 5003, and the user terminals 5004. Some of the steps included in the communication method indicated in FIG. 41 and FIG. 42 may be skipped, the order of the steps may be changed, or multiple steps may be performed in parallel.

While embodiments of the present invention have been described above, the technical scope of the present invention is not limited to the scope described in the abovementioned embodiments, and various modifications and alterations are possible within the spirit thereof. For example, the specific embodiments by which the devices are distributed or integrated are not limited to the above embodiments, and all or some of the embodiments may be configured by being functionally or physically distributed or integrated in arbitrary units. Additionally, new embodiments formed by arbitrarily combining multiple embodiments are also included among the embodiments of the present invention. The effects of new embodiments formed by combinations are combinations of the effects of the original embodiments.

INDUSTRIAL APPLICABILITY

According to the present invention, a messaging service can be more efficiently provided.

REFERENCE SIGNS LIST

1010 System
1110 First server unit
1112 C2C server
1114 B2C server
1116 Storage unit
1120 Second server unit
1122 C2C server
1124 B2C server 1126 Storage unit
1130 Third server unit
1132 C2C server
1134 B2C server
1136 Storage unit
1141 First user terminal
1142 Second user terminal
1143 Third user terminal
1150 Company terminal
1160 Distribution unit
1200 Mobile terminal
1210 SIM mounting unit
1220 Identification unit
1230 Input unit
1240 Display unit
1250 Storage unit
1260 Selection unit
1270 Communication unit
1280 Preparation unit
2001 Information management device
2002 Information terminal
2003 Bank server
2004 Communication carrier server
2005 Home delivery company server
2011 Communication unit
2012 Storage unit
2013 Control unit
2131 Storage control unit
2132 Information acquisition unit
2133 Information provision unit
S Communication system
3001 Communication device
3011 Control unit
3111 Reception unit
3112 Registered information acquisition unit
3114 Notification unit
3115 Relay unit
3002 User terminal
3002A First user terminal
3002B Second user terminal
3021 Control unit
3212 Transmission unit
3023 Display unit
4001 Transfer destination server
4011 Control unit
4111 Reception unit
4112 Generation unit
4113 Transmission unit
4114 Forwarding unit
4012 Storage unit
4121 User registration information storage unit
4002 Transfer source server
4003 Company server
4031 Control unit
4311 Reception unit
4312 Transmission unit
4032 Storage unit
4321 Transmission destination information storage unit
4004 User terminal
5001 Relay server
5011 Control unit
5111 Reception unit
5112 Extraction unit
5113 Identification unit
5114 Forwarding unit
5115 Acquisition unit
5012 Storage unit
5121 Company information storage unit
5122 Personal information storage unit
5123 Carrier information storage unit
5002 Carrier server
5021 Control unit
5211 Reception unit
5212 Forwarding unit
5003 Company server
5004 User terminal

The invention claimed is:

1. A mobile terminal comprising:
an identification unit configured to identify a telecommunications carrier with which the mobile terminal is subscribed;
an input unit configured to receive an input of an access request to a link destination, including information regarding multiple access destinations, selected by the user of the mobile terminal;
a selection unit configured to select, based on information regarding the telecommunications carrier identified by the identification unit, an access destination indicating, among the multiple access destinations, a destination of an access in a server corresponding to the telecommunications carrier; and
a communication unit configured to access the access destination selected by the selection unit.

2. The mobile terminal according to claim 1, wherein the identification unit identifies the telecommunications carrier in response to transmitting a Short Message Service (SMS) message to a server corresponding to the subscribed telecommunications carrier and performing line verification.

3. The mobile terminal according to claim 2, wherein:
the identification unit acquires subscription information from a Subscriber Identity Module (SIM) mounted in the mobile terminal, and identifies the subscribed telecommunications carrier corresponding to the acquired subscription information; and
the communication unit transmits the SMS message to a server corresponding to the subscribed telecommunications carrier.

4. The mobile terminal according to claim 2, wherein:
the communication unit is capable of communicating externally via a second communication line different from a first communication line used to transmit the SMS message; and
the identification unit turns off a connection between the communication unit and the second communication line before the line verification.

5. The mobile terminal according to claim 1, further comprising:
a storage unit configured to store information regarding the telecommunication carrier;
wherein the identification unit stores information regarding the identified telecommunications carrier in the storage unit.

* * * * *